(12) United States Patent
Baur et al.

(10) Patent No.: US 7,859,738 B2
(45) Date of Patent: *Dec. 28, 2010

(54) REARVIEW MIRROR SYSTEM

(75) Inventors: Michael J. Baur, Holland, MI (US); Ian A. McCabe, Holland, MI (US); Hamid Habibi, Holland, MI (US); Niall R. Lynam, Holland, MI (US)

(73) Assignee: Donnelly Corporation, Holland, MI (US)

( * ) Notice: Subject to any disclaimer, the term of this patent is extended or adjusted under 35 U.S.C. 154(b) by 0 days.

This patent is subject to a terminal disclaimer.

(21) Appl. No.: 12/617,833

(22) Filed: Nov. 13, 2009

(65) Prior Publication Data

US 2010/0066519 A1 Mar. 18, 2010

Related U.S. Application Data

(63) Continuation of application No. 12/122,102, filed on May 16, 2008, now Pat. No. 7,636,188, which is a continuation of application No. 11/912,576, filed as application No. PCT/US2006/018567 on May 16, 2006, now Pat. No. 7,626,749.

(60) Provisional application No. 60/681,250, filed on May 16, 2005, provisional application No. 60/690,400, filed on Jun. 14, 2005, provisional application No. 60/695,149, filed on Jun. 29, 2005, provisional application No. 60/730,334, filed on Oct. 26, 2005, provisional application No. 60/750,199, filed on Dec. 14, 2005, provisional application No. 60/774,449, filed on Feb. 17, 2006, provisional application No. 60/783,496, filed on Mar. 17, 2006.

(51) Int. Cl.
- *G02F 1/153* (2006.01)
- *G02F 1/15* (2006.01)
- *G02B 7/182* (2006.01)

(52) U.S. Cl. .................. 359/267; 359/265; 359/872
(58) Field of Classification Search ............... 340/435, 340/475, 815.4; 359/265, 267, 872, 876, 359/877
See application file for complete search history.

(56) References Cited

U.S. PATENT DOCUMENTS 1,114,559 A 10/1914 Wood
(Continued)

FOREIGN PATENT DOCUMENTS

DE 2550095 5/1976
(Continued)

*Primary Examiner*—David N Spector
(74) *Attorney, Agent, or Firm*—Van Dyke, Gardner, Linn & Burkhart, LLP

(57) ABSTRACT

A rearview mirror system includes an electro-optic reflective element having a specularly reflecting indicia reflector established at a second surface of a front substrate. The indicia provides a visible contrast between light incident at the mirror reflector and light incident at the indicia reflector so that when the mirror reflective element is in its high reflectance state, indicia information is subtly viewable by a person viewing the reflective element. The indicia may convey information that informs that the rearview mirror assembly is an automatic dimming type, informs of a brand logo and/or informs of a personalization logo. The mirror assembly may include a video display screen and contrast enhancement means for enhancing the viewability of the video display screen when the rearview mirror assembly is operated in high ambient lighting conditions. A control may determine a driver performance in response to a sensing device and a vehicle monitoring device.

20 Claims, 36 Drawing Sheets

U.S. PATENT DOCUMENTS

| | | |
|---|---|---|
| 1,672,559 A | 6/1928 | Doble |
| RE17,274 E | 4/1929 | Porter |
| 2,135,262 A | 11/1938 | Schumacher |
| 2,263,382 A | 11/1941 | Gotzinger |
| 2,514,989 A | 7/1950 | Buren |
| 2,580,014 A | 12/1951 | Gazda |
| 2,636,419 A | 4/1953 | Kerr |
| 2,778,273 A | 1/1957 | Fellmeth |
| 2,911,177 A | 11/1959 | West |
| 3,104,274 A | 9/1963 | King |
| 3,131,250 A | 4/1964 | Ely |
| 3,146,296 A | 8/1964 | Fischer |
| 3,170,985 A | 2/1965 | Katulich |
| 3,175,463 A | 3/1965 | Seashore |
| 3,266,016 A | 8/1966 | Maruyama et al. |
| 3,267,806 A | 8/1966 | Azegami |
| 3,280,701 A | 10/1966 | Donnelly et al. |
| 3,337,285 A | 8/1967 | Travis |
| 3,338,655 A | 8/1967 | Young |
| 3,375,053 A | 3/1968 | Ward |
| 3,389,952 A | 6/1968 | Tobin, Jr. |
| 3,404,935 A | 10/1968 | Creager |
| 3,408,136 A | 10/1968 | Travis |
| 3,424,517 A | 1/1969 | Budreck |
| 3,563,638 A | 2/1971 | Panozzo |
| 3,601,614 A | 8/1971 | Platzer, Jr. |
| 3,610,739 A | 10/1971 | Seashore |
| 3,667,833 A | 6/1972 | Baldwin, Sr. |
| 3,708,222 A | 1/1973 | Stern |
| 3,764,201 A | 10/1973 | Haile |
| 3,806,232 A | 4/1974 | Gray |
| 3,826,563 A | 7/1974 | Davis |
| 3,881,811 A | 5/1975 | French |
| 3,909,117 A | 9/1975 | Takahashi et al. |
| 4,200,359 A | 4/1980 | Lawson |
| 4,223,983 A | 9/1980 | Bloom |
| 4,258,979 A | 3/1981 | Mahin |
| 4,264,144 A | 4/1981 | McCord |
| 4,268,120 A | 5/1981 | Jitsumori |
| 4,281,899 A | 8/1981 | Oskam |
| 4,293,191 A | 10/1981 | Kim |
| 4,303,308 A | 12/1981 | Kobrin |
| 4,306,770 A | 12/1981 | Marhauer |
| 4,311,362 A | 1/1982 | LaPorte |
| 4,311,363 A | 1/1982 | Marsalka et al. |
| 4,325,609 A | 4/1982 | Alford |
| 4,331,382 A | 5/1982 | Graff |
| 4,350,412 A | 9/1982 | Steenblik et al. |
| 4,435,042 A | 3/1984 | Wood et al. |
| 4,436,371 A | 3/1984 | Wood et al. |
| 4,436,372 A | 3/1984 | Schmidt et al. |
| 4,439,013 A | 3/1984 | Hagn et al. |
| 4,449,786 A | 5/1984 | McCord |
| 4,470,665 A | 9/1984 | Blom |
| 4,499,451 A | 2/1985 | Suzuki et al. |
| 4,526,446 A | 7/1985 | Adams |
| 4,549,786 A | 10/1985 | Albers et al. |
| 4,555,166 A | 11/1985 | Enomoto |
| 4,575,202 A | 3/1986 | McGuire |
| 4,588,267 A | 5/1986 | Pastore |
| 4,609,266 A | 9/1986 | Blom |
| 4,623,222 A | 11/1986 | Itoh et al. |
| 4,629,296 A | 12/1986 | White |
| 4,630,904 A | 12/1986 | Pastore |
| 4,674,849 A | 6/1987 | Stewart |
| 4,674,850 A | 6/1987 | Blom |
| 4,678,294 A | 7/1987 | Van Nostrand |
| 4,679,906 A | 7/1987 | Brandenburg |
| 4,712,879 A | 12/1987 | Lynam et al. |
| 4,715,701 A | 12/1987 | Urban |
| 4,721,364 A | 1/1988 | Itoh et al. |
| 4,727,302 A | 2/1988 | Mizuta et al. |
| 4,733,336 A | 3/1988 | Skogler et al. |
| 4,770,522 A | 9/1988 | Alten |
| 4,773,740 A | 9/1988 | Kawakami et al. |
| D297,926 S | 10/1988 | Kesler |
| 4,793,690 A | 12/1988 | Gahan et al. |
| 4,799,768 A | 1/1989 | Gahan |
| 4,824,231 A | 4/1989 | Quintana |
| 4,826,289 A | 5/1989 | Vandenbrink et al. |
| 4,828,379 A | 5/1989 | Parsons et al. |
| 4,859,046 A | 8/1989 | Traynor et al. |
| 4,882,466 A | 11/1989 | Friel |
| 4,882,565 A | 11/1989 | Gallmeyer |
| 4,906,075 A | 3/1990 | Majsumiya |
| 4,906,085 A | 3/1990 | Sugihara et al. |
| 4,913,542 A | 4/1990 | Adolfsson |
| 4,917,485 A | 4/1990 | Baldwin, Sr. |
| 4,929,074 A | 5/1990 | Urban |
| 4,932,770 A | 6/1990 | Caravaty |
| 4,948,242 A | 8/1990 | Desmond et al. |
| 4,989,964 A | 2/1991 | Meise |
| 5,005,962 A | 4/1991 | Edelman |
| 5,014,167 A | 5/1991 | Roberts |
| 5,022,747 A | 6/1991 | Polanyi et al. |
| 5,033,835 A | 7/1991 | Platzer, Jr. |
| 5,044,739 A | 9/1991 | do Espirito Santo |
| 5,050,977 A | 9/1991 | Platzer, Jr. |
| 5,052,792 A | 10/1991 | McDonough |
| 5,066,112 A | 11/1991 | Lynam et al. |
| 5,073,012 A | 12/1991 | Lynam |
| 5,076,673 A | 12/1991 | Lynam et al. |
| 5,078,480 A | 1/1992 | Warszawski |
| 5,080,492 A | 1/1992 | Platzer, Jr. |
| 5,107,374 A | 4/1992 | Lupo et al. |
| 5,115,346 A | 5/1992 | Lynam |
| 5,115,352 A | 5/1992 | do Espirito Santo |
| 5,117,346 A | 5/1992 | Gard |
| 5,140,455 A | 8/1992 | Varaprasad et al. |
| 5,142,407 A | 8/1992 | Varaprasad et al. |
| 5,151,816 A | 9/1992 | Varaprasad et al. |
| 5,151,824 A | 9/1992 | O'Farrell |
| 5,166,833 A | 11/1992 | Shyu |
| 5,178,448 A | 1/1993 | Adams et al. |
| 5,179,471 A | 1/1993 | Caskey et al. |
| 5,183,099 A | 2/1993 | Bechu |
| 5,189,537 A | 2/1993 | O'Farrell |
| 5,193,029 A | 3/1993 | Schofield et al. |
| 5,207,492 A | 5/1993 | Roberts |
| 5,225,943 A | 7/1993 | Lupo |
| 5,233,461 A | 8/1993 | Dornan et al. |
| 5,237,458 A | 8/1993 | Polanyi et al. |
| 5,237,459 A | 8/1993 | Strauss |
| 5,239,405 A | 8/1993 | Varaprasad et al. |
| 5,253,109 A | 10/1993 | O'Farrell et al. |
| 5,285,060 A | 2/1994 | Larson et al. |
| 5,295,021 A | 3/1994 | Swanson |
| 5,296,973 A | 3/1994 | Burke |
| 5,313,335 A | 5/1994 | Gray et al. |
| 5,327,288 A | 7/1994 | Wellington et al. |
| 5,354,965 A | 10/1994 | Lee |
| 5,355,245 A | 10/1994 | Lynam |
| 5,406,414 A | 4/1995 | O'Farrell et al. |
| 5,424,875 A | 6/1995 | Davis, II |
| 5,432,643 A | 7/1995 | Huang |
| 5,437,931 A | 8/1995 | Tsai et al. |
| 5,446,576 A | 8/1995 | Lynam et al. |
| 5,481,409 A | 1/1996 | Roberts |
| 5,509,606 A | 4/1996 | Breithaupt et al. |
| 5,517,367 A | 5/1996 | Kim et al. |
| 5,523,877 A | 6/1996 | Lynam |
| 5,525,264 A | 6/1996 | Cronin et al. |
| 5,526,195 A | 6/1996 | Thomas |
| 5,535,056 A | 7/1996 | Caskey et al. |

| | | |
|---|---|---|
| 5,550,677 A | 8/1996 | Schofield et al. |
| 5,557,467 A | 9/1996 | McColgan et al. |
| 5,559,640 A | 9/1996 | Vachss et al. |
| 5,563,744 A | 10/1996 | Matsumiya |
| 5,567,360 A | 10/1996 | Varaprasad et al. |
| 5,575,552 A | 11/1996 | Faloon et al. |
| 5,579,133 A | 11/1996 | Black et al. |
| 5,587,236 A | 12/1996 | Agrawal et al. |
| 5,587,699 A | 12/1996 | Faloon et al. |
| 5,594,222 A | 1/1997 | Caldwell |
| 5,594,593 A | 1/1997 | Milner |
| 5,610,756 A | 3/1997 | Lynam et al. |
| 5,621,569 A | 4/1997 | Schlenke |
| 5,644,442 A | 7/1997 | Lemere |
| 5,649,756 A | 7/1997 | Adams et al. |
| 5,668,663 A | 9/1997 | Varaprasad et al. |
| 5,669,698 A | 9/1997 | Veldman et al. |
| 5,689,370 A | 11/1997 | Tonar et al. |
| 5,691,855 A | 11/1997 | Lupkas |
| 5,722,836 A | 3/1998 | Younker |
| 5,724,187 A | 3/1998 | Varaprasad et al. |
| 5,751,489 A | 5/1998 | Caskey et al. |
| 5,784,211 A | 7/1998 | Mingledorff |
| 5,788,357 A | 8/1998 | Muth et al. |
| 5,790,298 A | 8/1998 | Tonar |
| 5,790,327 A | 8/1998 | Lee et al. |
| 5,793,542 A | 8/1998 | Kondo et al. |
| 5,796,532 A | 8/1998 | Kanazawa |
| 5,805,367 A | 9/1998 | Kanazawa |
| 5,808,777 A | 9/1998 | Lynam et al. |
| 5,825,527 A | 10/1998 | Forgette et al. |
| 5,835,294 A | 11/1998 | Minegishi |
| 5,838,505 A | 11/1998 | Palathingal |
| 5,847,889 A | 12/1998 | Komiyama et al. |
| 5,877,897 A | 3/1999 | Schofield et al. |
| 5,910,854 A | 6/1999 | Varaprasad et al. |
| 5,922,176 A | 7/1999 | Caskey |
| 5,938,320 A | 8/1999 | Crandall |
| 5,980,050 A | 11/1999 | McCord |
| 6,001,486 A | 12/1999 | Varaprasad et al. |
| 6,002,544 A | 12/1999 | Yatsu |
| 6,005,724 A | 12/1999 | Todd |
| 6,007,207 A | 12/1999 | Liu |
| 6,030,084 A | 2/2000 | Schmidt |
| 6,032,323 A | 3/2000 | Smith et al. |
| 6,033,078 A | 3/2000 | Su et al. |
| 6,065,840 A | 5/2000 | Caskey et al. |
| 6,074,068 A | 6/2000 | Palathingal |
| 6,111,684 A | 8/2000 | Forgette et al. |
| 6,116,743 A | 9/2000 | Hoek |
| 6,154,306 A | 11/2000 | Varaprasad et al. |
| 6,164,564 A | 12/2000 | Franco et al. |
| 6,172,613 B1 | 1/2001 | DeLine et al. |
| 6,178,034 B1 | 1/2001 | Allemand et al. |
| 6,196,688 B1 | 3/2001 | Caskey et al. |
| 6,199,993 B1 | 3/2001 | Mou |
| 6,207,083 B1 | 3/2001 | Varaprased et al. |
| 6,245,262 B1 | 6/2001 | Varaprasad et al. |
| 6,257,746 B1 | 7/2001 | Todd et al. |
| 6,260,608 B1 | 7/2001 | Kim |
| 6,270,225 B1 | 8/2001 | Goolsby |
| 6,286,965 B1 | 9/2001 | Caskey et al. |
| 6,310,611 B1 | 10/2001 | Caldwell |
| 6,315,419 B1 | 11/2001 | Platzer, Jr. |
| 6,318,870 B1 | 11/2001 | Spooner et al. |
| 6,320,282 B1 | 11/2001 | Caldwell |
| 6,329,925 B1 | 12/2001 | Skiver et al. |
| 6,356,376 B1 | 3/2002 | Tonar et al. |
| 6,390,632 B1 | 5/2002 | Palathingal |
| 6,420,036 B1 | 7/2002 | Varaprasad et al. |
| 6,428,172 B1 | 8/2002 | Hutzel et al. |
| 6,441,964 B1 | 8/2002 | Chu et al. |
| 6,449,082 B1 | 9/2002 | Agrawal et al. |
| 6,501,387 B2 | 12/2002 | Skiver et al. |
| 6,512,624 B2 | 1/2003 | Tonar et al. |
| 6,522,451 B1 | 2/2003 | Lynam |
| 6,595,649 B2 | 7/2003 | Hoekstra et al. |
| 6,615,438 B1 | 9/2003 | Franco et al. |
| 6,627,918 B2 | 9/2003 | Getz et al. |
| 6,642,851 B2 | 11/2003 | DeLine et al. |
| 6,648,477 B2 | 11/2003 | Hutzel et al. |
| 6,669,109 B2 | 12/2003 | Ivanov et al. |
| 6,690,268 B2 | 2/2004 | Schofield et al. |
| 6,717,712 B2 | 4/2004 | Lynam et al. |
| 6,719,215 B2 | 4/2004 | Drouillard |
| 6,737,629 B2 | 5/2004 | Nixon et al. |
| 6,742,904 B2 | 6/2004 | Bechtel et al. |
| D493,131 S | 7/2004 | Lawlor et al. |
| D493,394 S | 7/2004 | Lawlor et al. |
| 6,824,281 B2 | 11/2004 | Schofield et al. |
| 6,831,268 B2 | 12/2004 | Bechtel et al. |
| 6,919,796 B2 | 7/2005 | Boddy et al. |
| 7,097,312 B2 | 8/2006 | Platzer, Jr. |
| 7,106,392 B2 | 9/2006 | You |
| 7,126,456 B2 | 10/2006 | Boddy et al. |
| 7,184,190 B2 | 2/2007 | McCabe et al. |
| 7,195,381 B2 | 3/2007 | Lynam et al. |
| 7,206,697 B2 * | 4/2007 | Olney et al. .................. 701/301 |
| 7,255,451 B2 | 8/2007 | McCabe et al. |
| 7,274,501 B2 | 9/2007 | McCabe et al. |
| 7,289,037 B2 | 10/2007 | Uken et al. |
| 7,579,939 B2 * | 8/2009 | Schofield et al. ......... 340/425.5 |
| 7,626,749 B2 * | 12/2009 | Baur et al. .................. 359/265 |
| 7,636,188 B2 * | 12/2009 | Baur et al. .................. 359/267 |
| 7,826,123 * | 11/2010 | McCabe et al. ............. 359/265 |
| 2002/0036828 A1 | 3/2002 | Wong |
| 2002/0105741 A1 | 8/2002 | Platzer, Jr. |
| 2002/0159270 A1 | 10/2002 | Lynam et al. |
| 2003/0043589 A1 | 3/2003 | Blank |
| 2003/0101749 A1 | 6/2003 | Lingle et al. |
| 2003/0117731 A1 | 6/2003 | Platzer, Jr. |
| 2004/0032638 A1 | 2/2004 | Tonar et al. |
| 2004/0032675 A1 | 2/2004 | Weller et al. |
| 2004/0032676 A1 | 2/2004 | Drummond et al. |
| 2004/0264011 A1 | 12/2004 | Lynam |
| 2005/0078389 A1 | 4/2005 | Kulas et al. |
| 2005/0083577 A1 | 4/2005 | Varaprasad et al. |
| 2005/0099693 A1 | 5/2005 | Schofield et al. |
| 2005/0134983 A1 | 6/2005 | Lynam |
| 2005/0248859 A1 | 11/2005 | Platzer, Jr. |
| 2006/0050018 A1 | 3/2006 | Hutzel et al. |
| 2006/0126150 A1 | 6/2006 | Tonar et al. |
| 2006/0268440 A1 | 11/2006 | Platzer, Jr. |
| 2009/0080055 A1 | 3/2009 | Baur et al. |
| 2009/0237820 A1 | 9/2009 | McCabe et al. |

FOREIGN PATENT DOCUMENTS

| | | |
|---|---|---|
| DE | 3302735 | 8/1984 |
| DE | 4026578 | 4/1992 |
| EP | 0210757 | 2/1987 |
| EP | 0310261 | 4/1989 |
| EP | 0356099 A2 | 2/1990 |
| EP | 0551802 | 7/1993 |
| EP | 0791503 | 8/1997 |
| FR | 2628042 | 9/1989 |
| GB | 1279158 | 6/1972 |
| GB | 2048189 | 12/1980 |
| GB | 2092534 | 8/1982 |
| JP | 362075619 A | 4/1987 |
| JP | 62-105103 | 5/1987 |
| JP | 1186443 | 7/1989 |
| JP | 1-208245 | 8/1989 |
| NL | 7908257 | 6/1981 |
| WO | WO 01/81956 | 11/2001 |

* cited by examiner

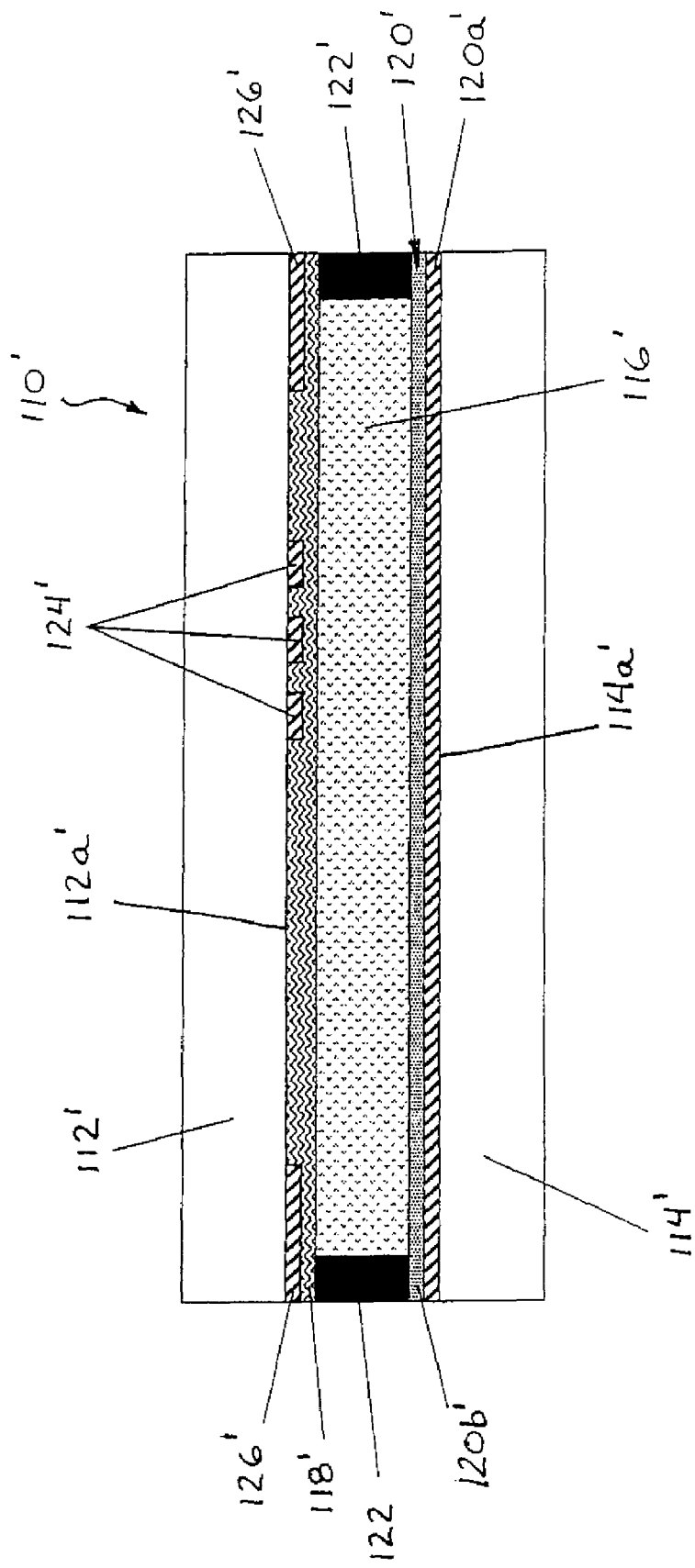

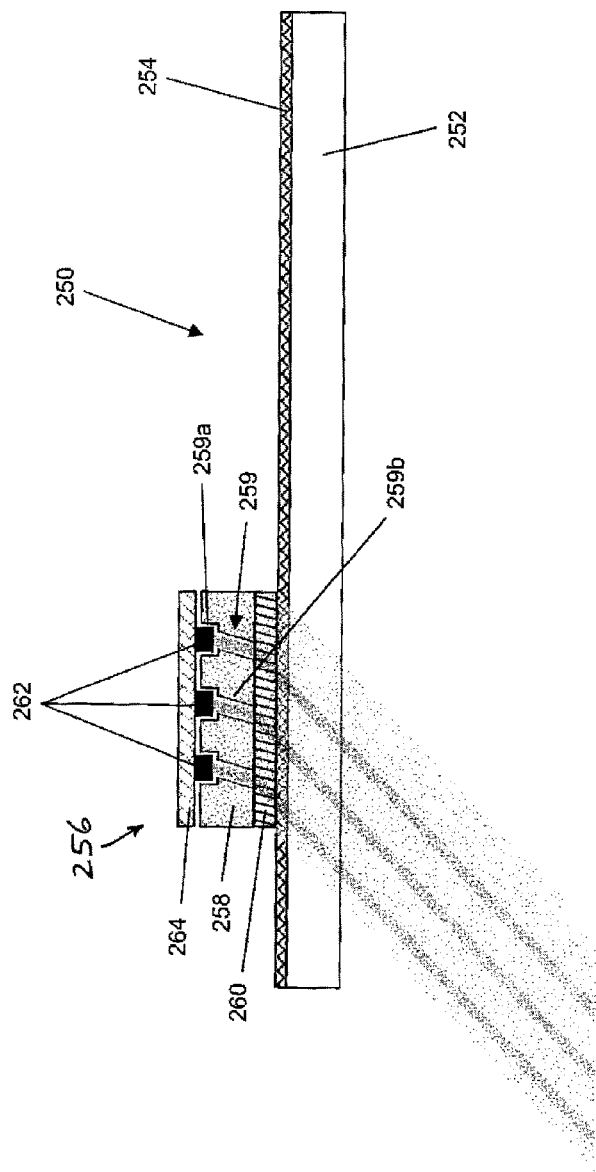
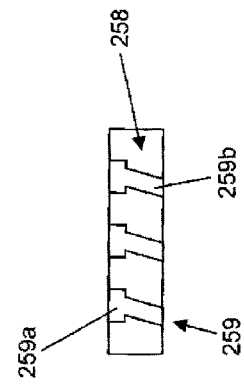
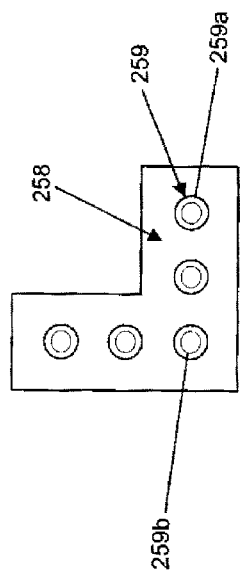
Fig. 10A
Fig. 10B
Fig. 10C

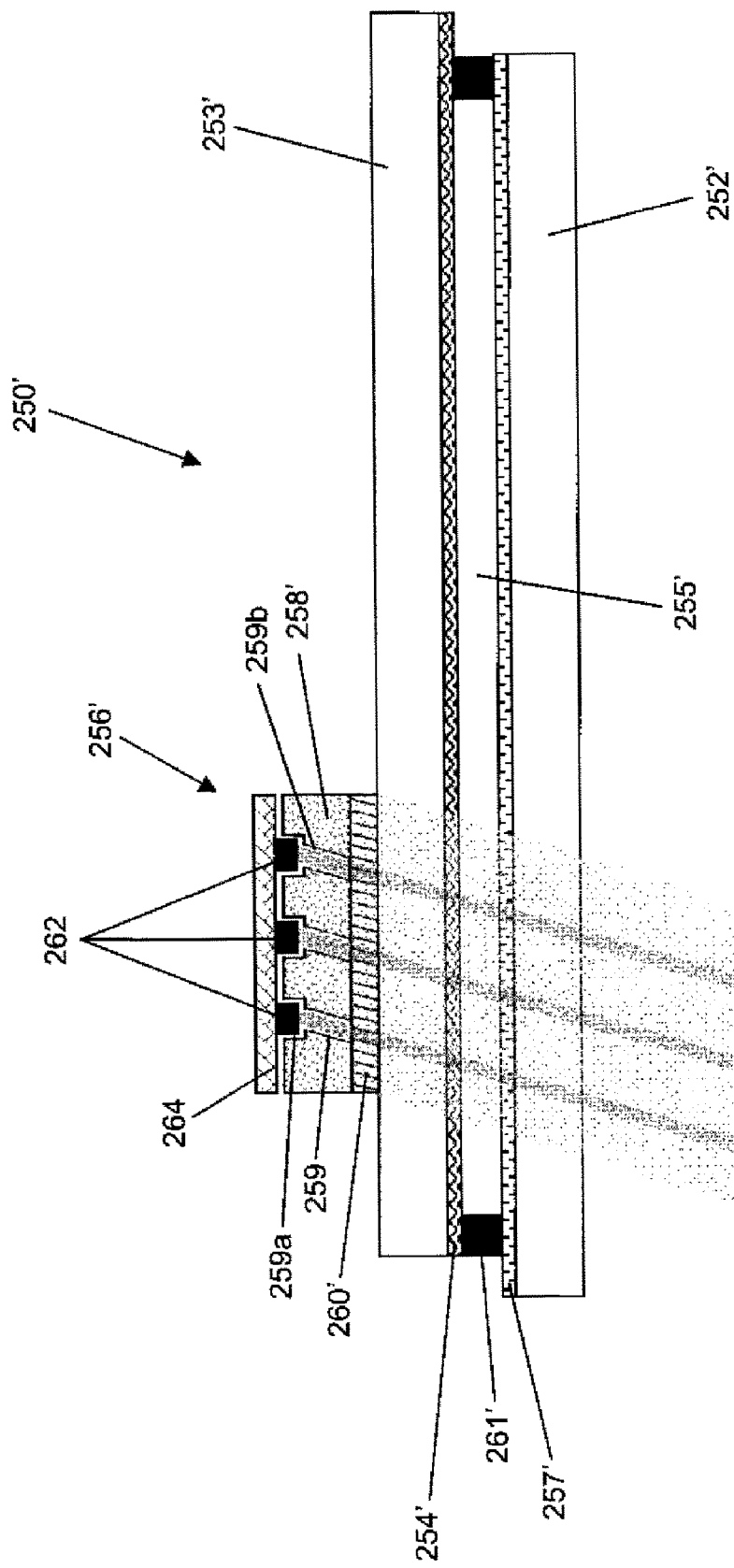

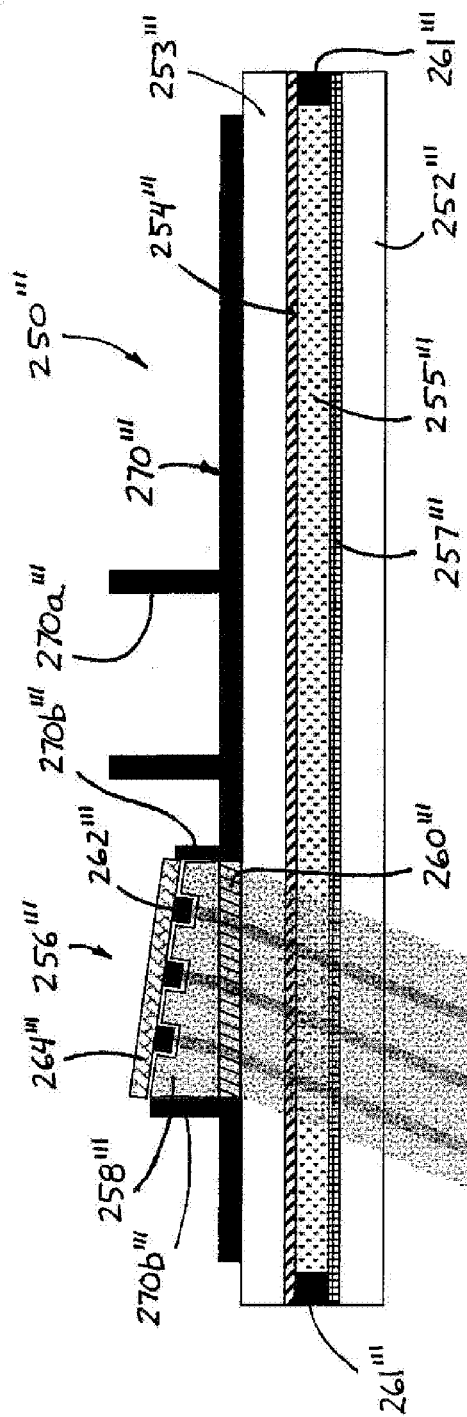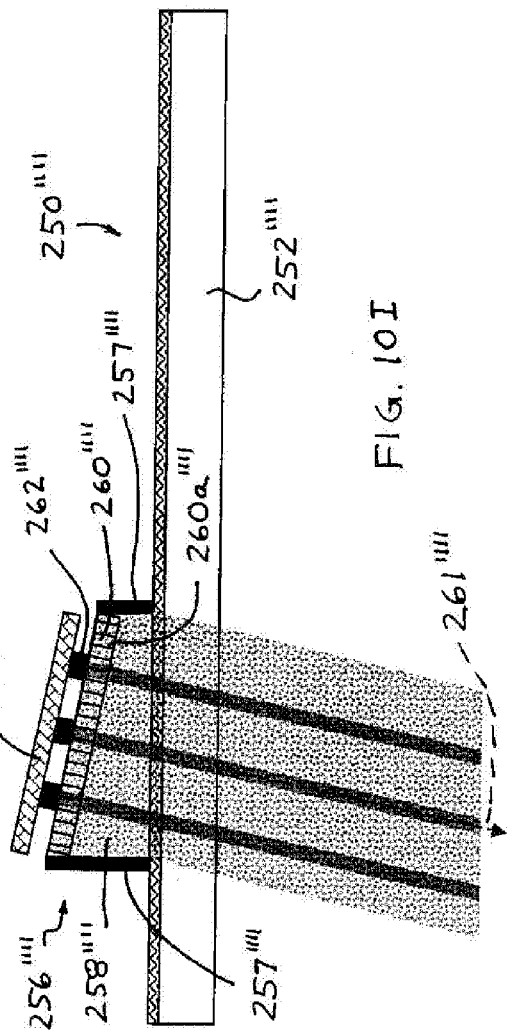
FIG. 10H
FIG. 10I

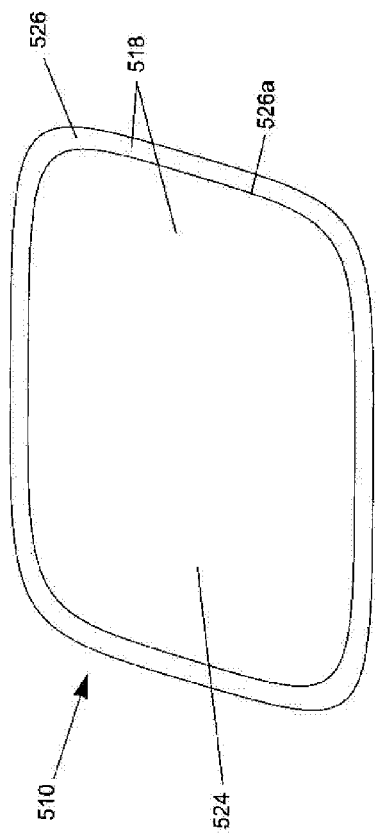
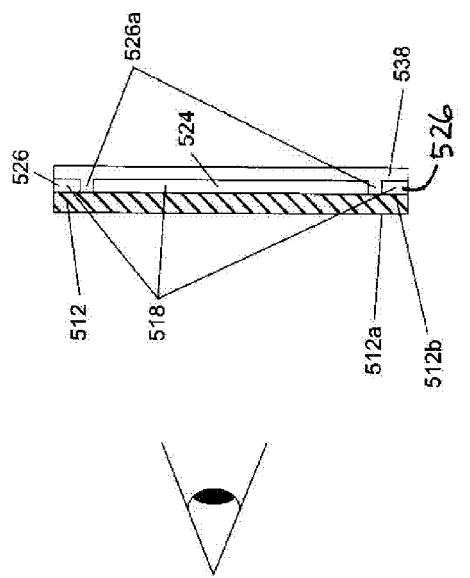
Fig. 15A
Fig. 15B

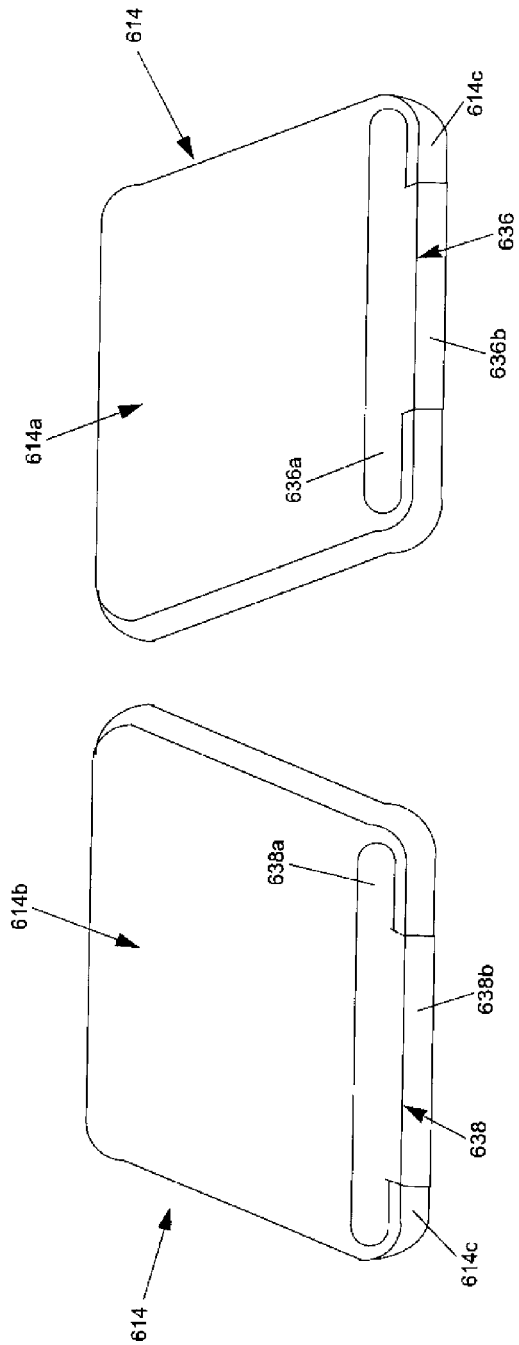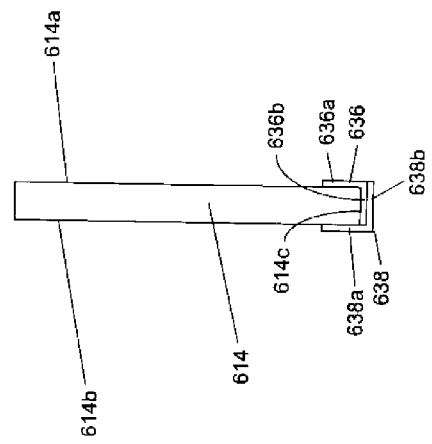

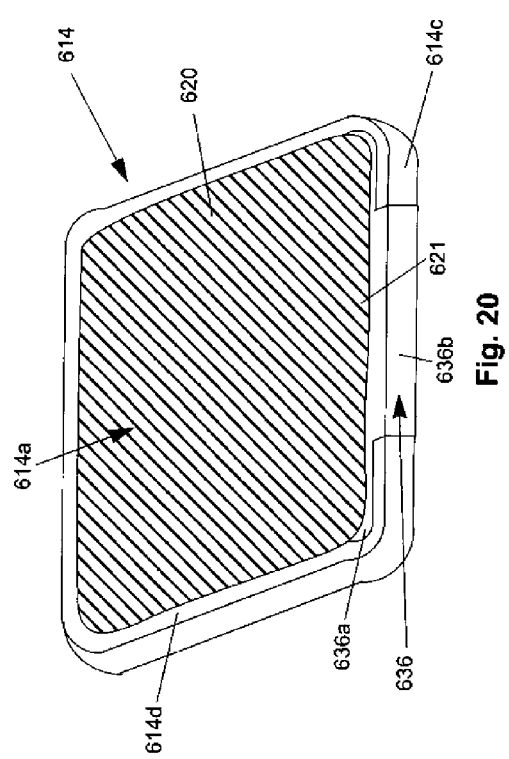
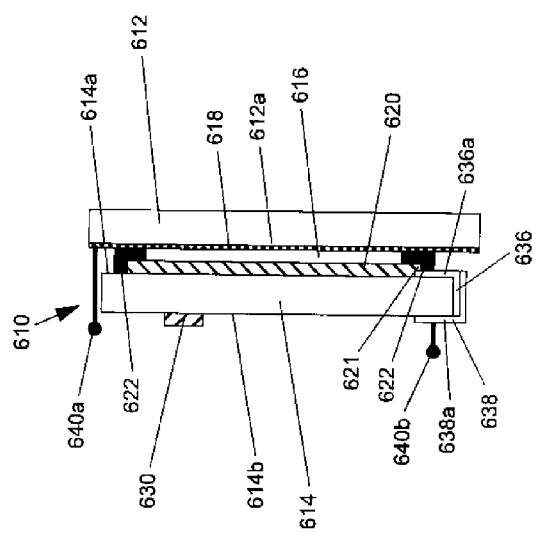

Initial Reflectance, Response Time and Current Draw @ 23°C, 1.2V

| Sample # | 50 to 10% Color (sec) | 10 to 50% Bleach (sec) | Max Ref (%) | Min Ref (%) | Max Current Draw (mA) | SS Current Draw (mA) |
|---|---|---|---|---|---|---|
| 1 | 3.2 | 4.9 | 86.1 | 6.8 | 287 | 110 |
| 2 | 3.2 | 5.1 | 86.6 | 6.6 | 286 | 106 |
| 3 | 3.1 | 5.5 | 87.3 | 6.5 | 282 | 103 |
| 4 | 3.5 | 4.9 | 87.9 | 6.9 | 275 | 106 |
| 5 | 2.8 | 5.5 | 85.6 | 6.4 | 319 | 104 |
| 6 | 3.4 | 5.2 | 87.4 | 6.8 | 282 | 108 |
| 7 | 3.1 | 5.0 | 85.1 | 6.6 | 291 | 109 |
| 8 | 3.1 | 5.0 | 85.7 | 6.8 | 307 | 108 |
| 9 | 3.0 | 5.1 | 84.8 | 6.6 | 310 | 107 |
| 10 | 3.1 | 5.1 | 85.1 | 6.7 | 311 | 107 |
| 11 | 2.9 | 5.0 | 84.8 | 6.8 | 315 | 108 |
| 12 | 3.0 | 5.5 | 86.4 | 6.3 | 300 | 103 |
| 13 | 3.0 | 4.9 | 86.9 | 6.7 | 311 | 108 |
| 14 | 3.1 | 5.2 | 84.4 | 6.5 | 286 | 106 |
| 15 | 3.1 | 5.0 | 85.6 | 6.6 | 300 | 107 |
| 16 | 2.9 | 5.1 | 85.2 | 6.6 | 318 | 107 |
| 17 | 3.2 | 5.0 | 86.2 | 6.8 | 276 | 106 |
| 18 | 3.1 | 5.3 | 86.5 | 6.6 | 287 | 107 |
| 19 | 3.0 | 5.2 | 84.7 | 6.6 | 300 | 108 |
| 20 | 3.1 | 5.2 | 85.2 | 6.7 | 300 | 107 |
| 21 | 3.0 | 5.0 | 85.9 | 6.8 | 300 | 109 |
| 22 | 3.0 | 5.1 | 85.4 | 6.6 | 301 | 108 |
| 23 | 3.0 | 5.3 | 86.8 | 6.5 | 312 | 105 |
| 24 | 2.9 | 5.2 | 85.9 | 6.6 | 312 | 107 |
| 25 | 3.2 | 5.2 | 86.3 | 6.6 | 284 | 107 |
| 26 | 2.9 | 5.1 | 86.3 | 6.6 | 314 | 108 |
| 27 | 3.0 | 4.7 | 87.6 | 6.9 | 309 | 110 |
| 28 | 3.1 | 4.8 | 87.1 | 6.9 | 311 | 108 |

Fig. 26

Initial Reflectance, Response Time and Current Draw @ 23°C, 1.2V
After 50,000 cycles (30 sec, 30 sec) @ 65°C / 95% RH

| Sample # | 50 to 10% Color (sec) | 10 to 50% Bleach (sec) | Max Ref (%) | Min Ref (%) | Max Current Draw (mA) | SS Current Draw (mA) |
|---|---|---|---|---|---|---|
| 1 | 4.0 | 5.6 | 84.8 | 6.7 | 241 | 97 |
| 2 | 3.6 | 5.5 | 85.2 | 6.6 | 251 | 95 |
| 3 | 3.5 | 6.0 | 85.8 | 6.6 | 250 | 94 |
| 4 | 3.8 | 5.4 | 86.7 | 6.8 | 249 | 96 |
| 5 | 3.4 | 6.1 | 84.1 | 6.4 | 277 | 96 |
| 6 | 3.6 | 5.5 | 86.0 | 6.8 | 256 | 98 |
| 7 | 3.6 | 5.8 | 84.0 | 6.5 | 252 | 96 |
| 8 | 3.6 | 5.5 | 84.1 | 6.7 | 257 | 97 |
| 9 | 3.6 | 5.9 | 83.0 | 6.5 | 269 | 96 |
| 10 | 3.5 | 5.8 | 83.6 | 6.6 | 266 | 97 |
| 11 | 3.4 | 5.5 | 83.4 | 6.7 | 272 | 97 |
| 12 | 3.2 | 6.2 | 84.8 | 6.2 | 259 | 93 |
| 13 | 3.5 | 5.4 | 85.2 | 6.8 | 264 | 97 |
| 14 | 3.4 | 5.7 | 83.4 | 6.3 | 251 | 96 |
| 15 | 3.6 | 5.7 | 84.1 | 6.7 | 255 | 97 |
| 16 | 3.2 | 5.5 | 83.5 | 6.5 | 277 | 98 |
| 17 | 3.8 | 5.6 | 84.9 | 6.7 | 249 | 96 |
| 18 | 3.5 | 5.8 | 84.8 | 6.6 | 258 | 96 |
| 19 | 3.4 | 5.4 | 83.5 | 6.7 | 266 | 97 |
| 20 | 3.4 | 5.7 | 83.6 | 6.7 | 267 | 97 |
| 21 | 3.4 | 5.4 | 84.2 | 6.8 | 266 | 98 |
| 22 | 3.4 | 5.5 | 83.9 | 6.6 | 263 | 97 |
| 23 | 3.5 | 5.9 | 85.2 | 6.5 | 269 | 96 |
| 24 | 3.7 | 5.9 | 84.3 | 6.5 | 271 | 96 |
| 25 | 3.8 | 5.8 | 84.9 | 6.6 | 242 | 95 |
| 26 | 3.2 | 5.7 | 84.9 | 6.6 | 279 | 97 |
| 27 | 3.5 | 5.2 | 85.9 | 6.8 | 277 | 99 |
| 28 | 3.5 | 5.3 | 85.7 | 6.7 | 265 | 98 |

Fig. 27

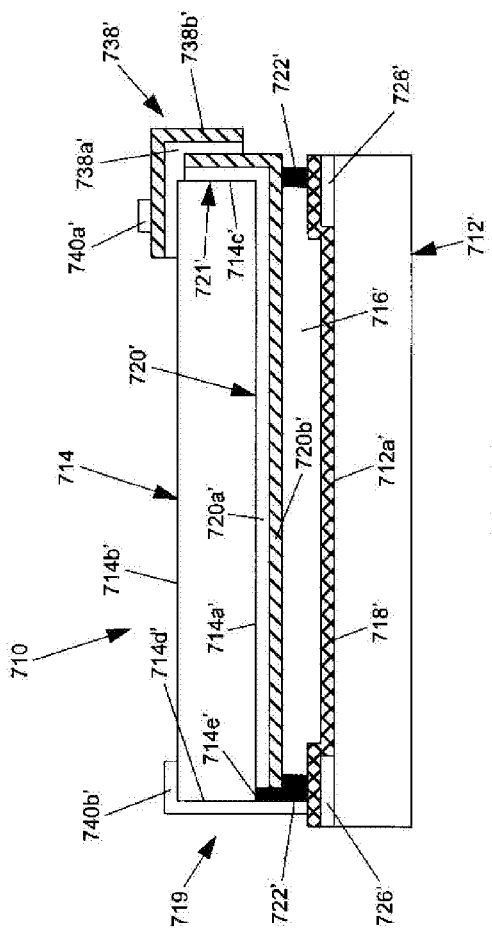
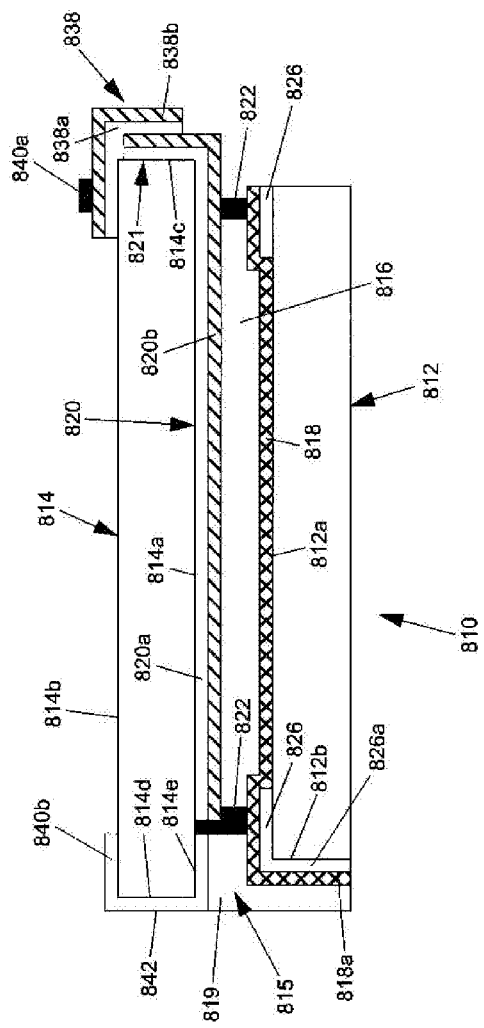
Fig. 28
Fig. 29

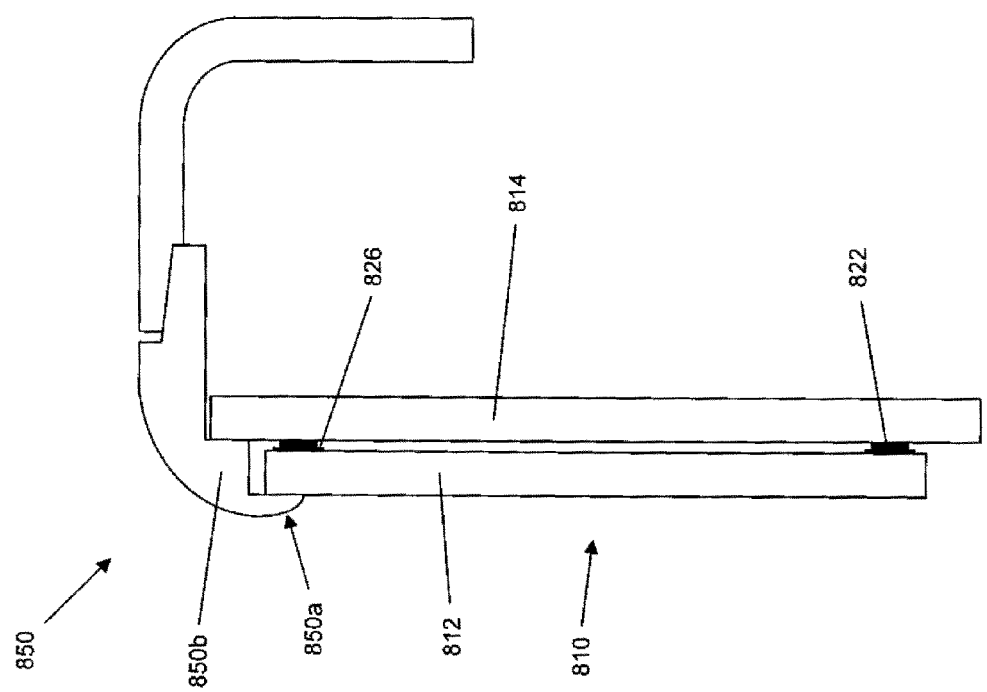

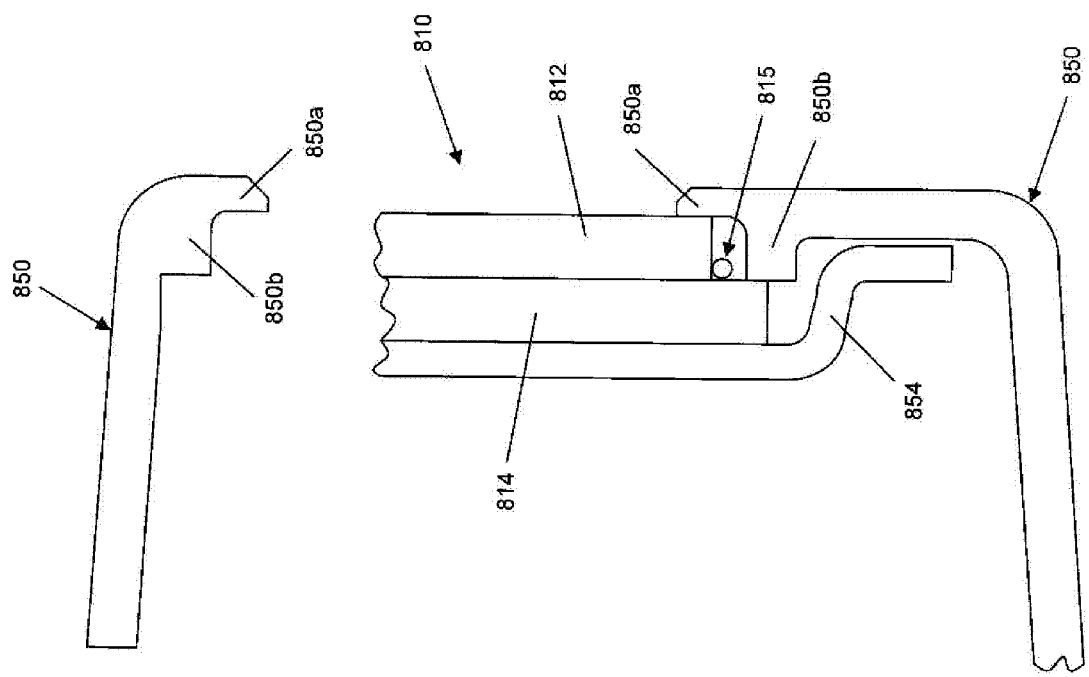

REARVIEW MIRROR SYSTEM

CROSS REFERENCE TO RELATED APPLICATIONS

The present application is a continuation of U.S. patent application Ser. No. 12/122,102, filed May 16, 2008, now U.S. Pat. No. 7,636,188, which is a continuation of U.S. patent application Ser. No. 11/912,576, filed Oct. 25, 2007, now U.S. Pat. No. 7,626,749, which is a 371 national phase application of PCT Application No. PCT/US2006/018567, filed May 16, 2006, which claims the benefit of U.S. provisional applications, Ser. No. 60/681,250, filed May 16, 2005; Ser. No. 60/690,400, filed Jun. 14, 2005; Ser. No. 60/695,149, filed Jun. 29, 2005; Ser. No. 60/730,334, filed Oct. 26, 2005; Ser. No. 60/750,199, filed Dec. 14, 2005; Ser. No. 60/774,449, filed Feb. 17, 2006; and Ser. No. 60/783,496, filed Mar. 17, 2006, which are all hereby incorporated herein by reference in their entireties.

FIELD OF THE INVENTION

The present invention relates to rearview mirror assemblies and, more particularly, to an interior or exterior rearview mirror assembly having information displayed at the mirror assembly.

BACKGROUND OF THE INVENTION

Interior and exterior mirrors for vehicles typically comprise a substrate having a first surface facing a viewer of the mirror and a second, reflecting surface opposite the first surface. Often, such mirrors may comprise electro-optic reflective element assemblies, which have first and second substrates, whereby the reflecting surface is typically at the third surface of the reflective element assembly (the front surface of the rear substrate) or at the fourth surface of the reflective element assembly (the rear surface of the rear substrate). It is common to include information created on the reflective element substrate, such as safety messages (for example, an exterior rearview mirror may include the message "objects in mirror are closer than they appear" or the like) or other information or indicia. Examples of such indicia are described in U.S. Pat. Nos. 5,189,537 and 5,825,527, which are hereby incorporated herein by reference in their entireties.

Such indicia or information is typically created by removal of the reflective coating or layers at the respective surface of the substrate, such as by sand blasting or laser ablating the reflective coating, or by overlaying or overcoating a material onto one of the layers or coatings, such as by screening of materials, such as ink or epoxy, onto the layers or coatings at the respective substrate surface (such as described in U.S. Pat. No. 5,189,537, which is hereby incorporated herein by reference). Such indicia or information thus provides a marked, highly visible and definite indicia or information conveyance that is readily discernible and viewable by a person viewing the mirror assembly.

SUMMARY OF THE INVENTION

The present invention provides a display of information or indicia at a reflective element by applying or disposing or otherwise forming or establishing indicia or the like by establishing a layer of a material that is different from the reflective material that is coated on the respective substrate to define the reflective surface of the reflective element (such as a layer of reflective material that has a distinctly higher or lower reflectivity than that of the layer of reflective material it is coated over or under). The indicia or information is visible to the viewer of the mirror assembly without unduly detracting from or interfering with the functionality of the reflective element.

According to an aspect of the present invention, a rearview mirror assembly for a vehicle includes a reflective element having a substrate with a reflective coating thereon. A layer of material is established to form indicia or information at the reflective element. The layer of material provides a visible contrast between the reflective coating and the layer of material so that the indicia or information is viewable by a person viewing the mirror assembly. The reflective element reflects light incident thereon over the coated surface, including the area at which the layer of material is disposed, and the indicia so created (such as for example, a vehicle brand name or logo) is subtly visible to the viewer by contrast with the adjacent main reflector coating reflective property, so that the presence of the indicia or logo is visible but subtle and non-obtrusive.

The layer of material may comprise a reflective material or a transparent material, and may be discernible due to a contrast in color or reflectance or due to an interference effect or difference in refractive index or the like. The reflective element may comprise an electro-optic reflective element assembly or cell, such as an electrochromic reflective element or cell, and may have the reflective coating at the third or fourth surface of the cell (the front surface of the rear substrate or the rear surface of the rear substrate). The layer of material may be disposed or established over the reflective coating or under the reflective coating. The layer of material may be established to provide indicia or a logo or the like, or to provide an information message or the like at the mirror reflective element. The invention may also be applicable to non-electro optic mirrors such as conventional chromium or titanium mirror reflectors or to blue mirror reflectors (as are commonly known in the automotive mirror art).

Therefore, the present invention provides a mirror reflective element that includes an information message or indicia established at the reflective element that does not unduly detract from or interfere with the functionality of the reflective element. The reflective element provides a desired amount of reflectance of visible light incident thereon over the reflective area of the mirror, including the area or region that includes the indicia or information, maintaining at least about 35 percent reflectivity (as measured using SAE J964a), more preferably at least about 40 percent reflectivity, and most preferably at least about 45 percent reflectivity, in the region or regions where the indicia is established. The reflective element and indicia layer thus provide a watermark-type effect at the reflective element, which allows the vehicle manufacturer or mirror manufacturer to provide a brand name or emblem or logo or the like at the reflective element without unduly affecting the reflectance of the reflective element over the viewable reflective surface of the reflective element.

These and other objects, advantages, purposes and features of the present invention will become apparent upon review of the following specification in conjunction with the drawings.

BRIEF DESCRIPTION OF THE DRAWINGS

FIG. 6A is a sectional view of another reflective element of the present invention;

FIG. 10A is a sectional view of another reflective element of the present invention, with a display element at the rear of the reflective element;

FIG. 10B is a plan view of the display element of FIG. 10A;

FIG. 10C is a sectional view of the display element of FIGS. 10A and 10B;

FIG. 10D is a sectional view of another reflective element of the present invention, with a display element at the rear of a transflective electro-optic reflective element;

FIG. 10H is a sectional view of another reflective element of the present invention, with a display element at the rear of a transflective electro-optic reflective element;

FIG. 10I is a sectional view of another reflective element of the present invention, with a display element at the rear of a transflective reflective element;

FIG. 15A is a plan view of a non-electro-optic reflective element having a perimeter band formed thereon in accordance with the present invention;

FIG. 15B is a sectional view of the non-electro-optic reflective element of FIG. 15A;

FIG. 17 is a perspective view of a rear substrate of a mirror reflective element for an exterior rearview mirror of the present invention, as viewed from the front or third surface of the rear substrate;

FIG. 18 is a perspective view of the rear substrate of FIG. 17, as viewed from the rear or fourth surface of the rear substrate;

FIG. 19 is a sectional view of the rear substrate of FIGS. 17 and 18, with the third and fourth surface wrap-around coatings thereon;

FIG. 20 is a perspective view of the rear substrate of FIGS. 17-19, as viewed from the front or third surface of the rear substrate, and showing the transflective mirror layer or layers disposed thereon;

FIG. 21 is a sectional view of a mirror reflective element, incorporating the rear substrate of FIG. 20 in accordance with the present invention;

FIG. 26 is a table listing the initial performance characteristics of samples of electrochromic cells in accordance with the present invention;

FIG. 27 is a table similar to the table of FIG. 26, but listing the performance characteristics of the samples after 50,000 cycles;

FIG. 28 is a sectional view of a reflective element assembly in accordance with the present invention;

FIG. 29 is a sectional view of another reflective element assembly in accordance with the present invention;

FIG. 30 is a partial sectional view of a mirror assembly in accordance with the present invention;

FIG. 30A is another partial sectional view of the mirror assembly of FIG. 30;

DESCRIPTION OF THE PREFERRED EMBODIMENTS

Figure 1:
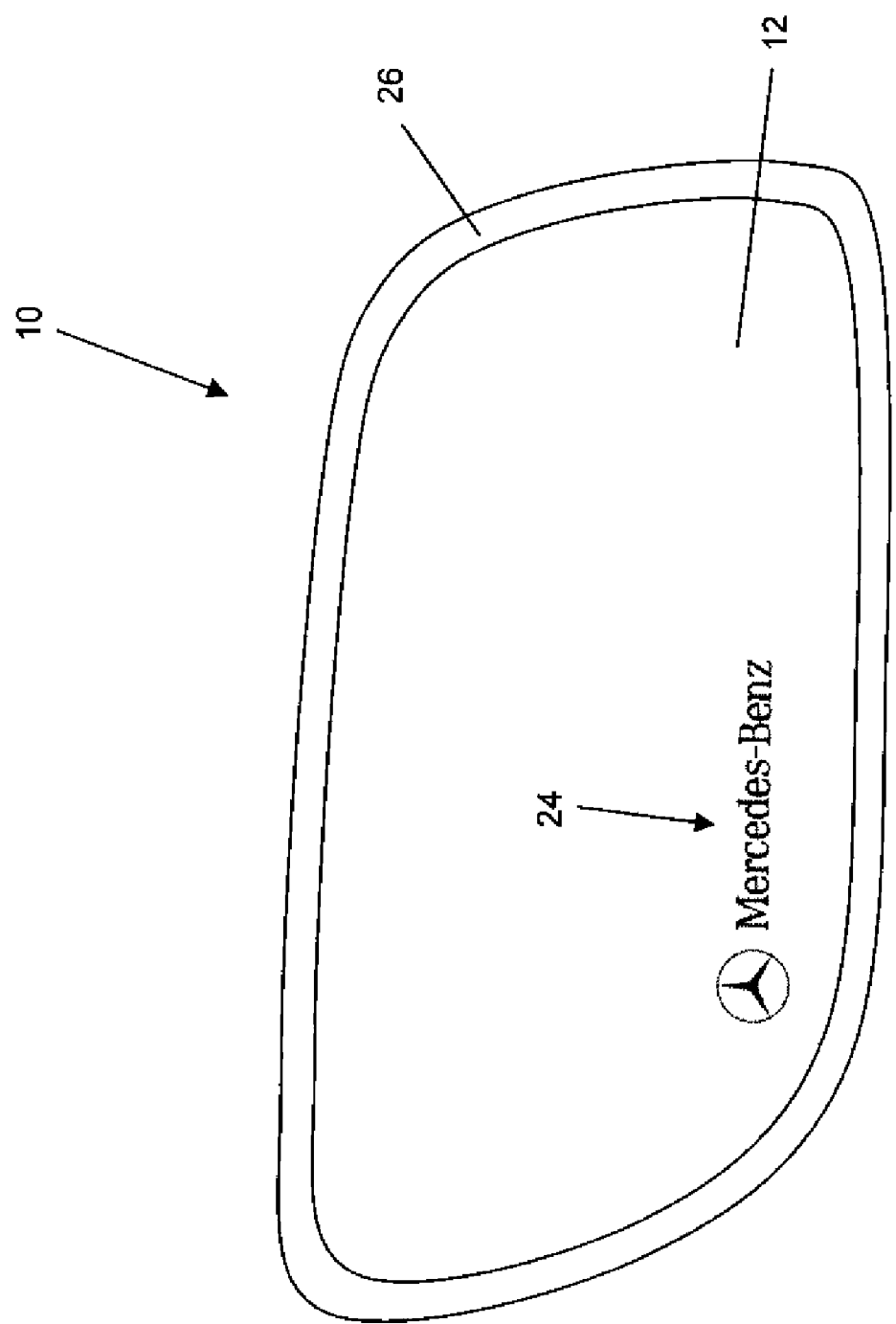
FIG. 1 is a front elevation of a reflective element of a rearview mirror assembly in accordance with the present invention.
Figure 2:
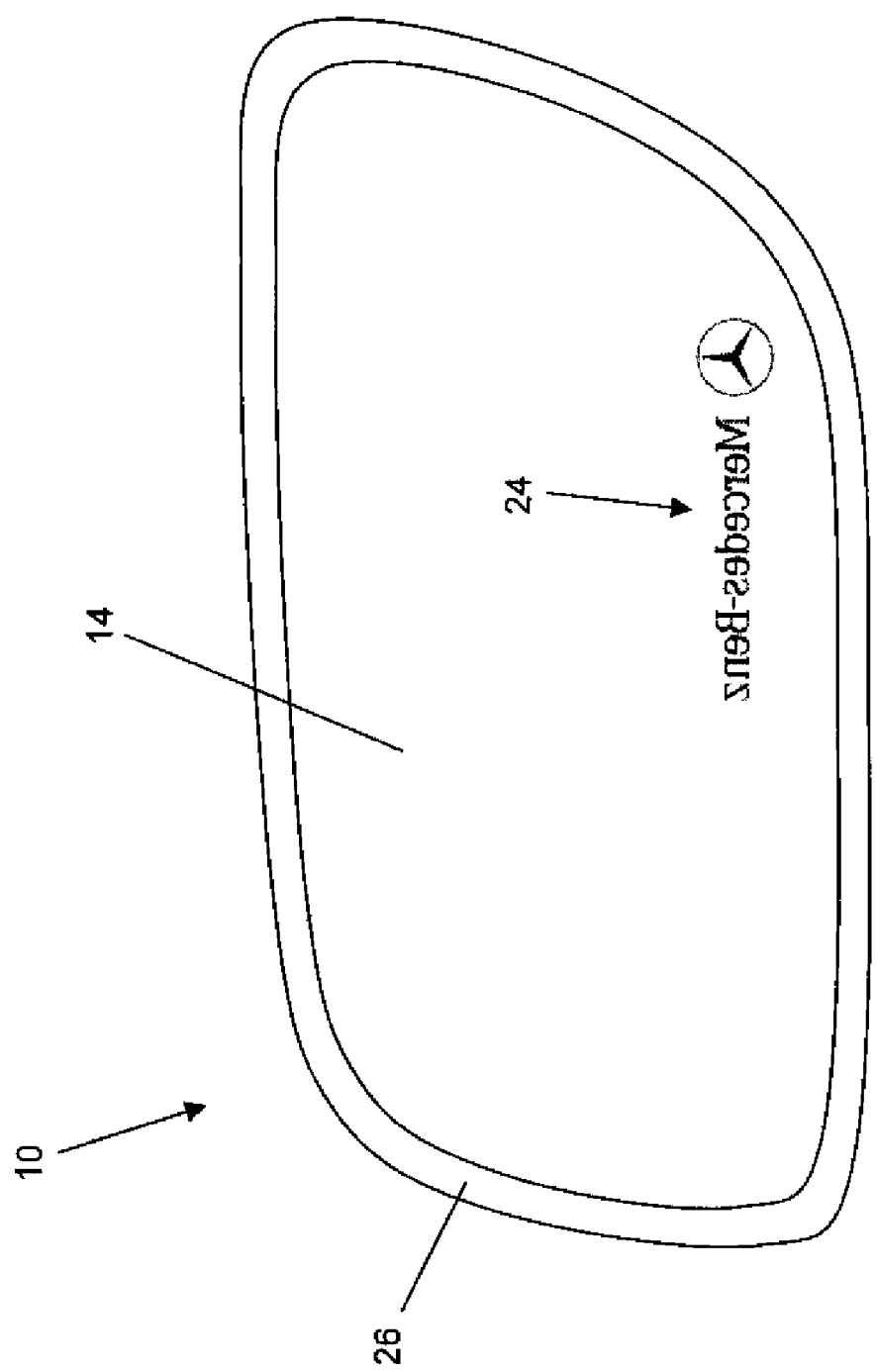
FIG. 2 is a rear elevation of the reflective element of FIG. 1.
Figure 3:
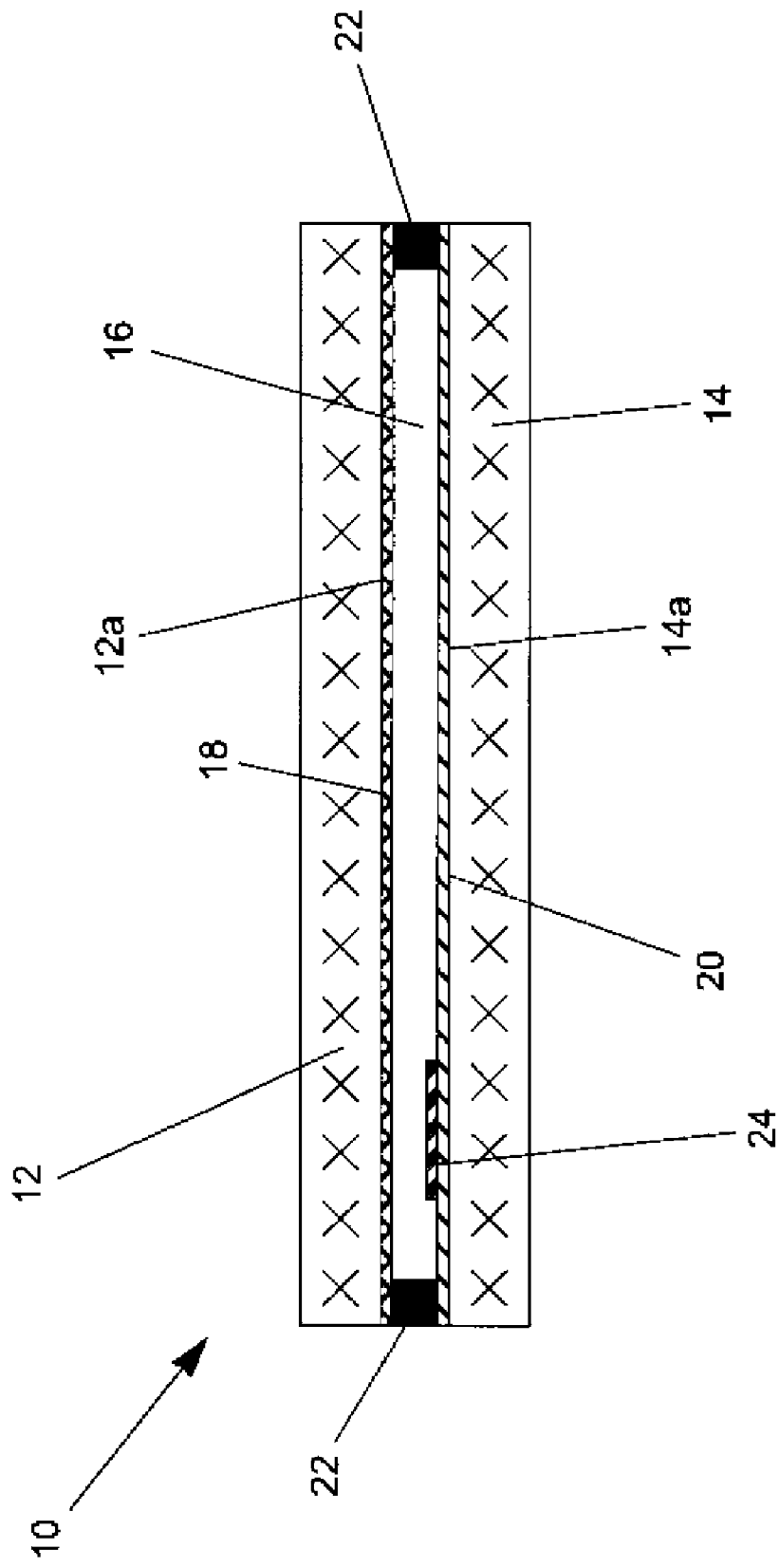
FIG. 3 is a sectional view of a reflective element of the present invention.

Referring now to the drawings and the illustrative embodiments depicted therein, a reflective element 10 (FIGS. 1 and 2) for a rearview mirror assembly, such as for an interior or exterior rearview mirror assembly for a vehicle, may comprise an electro-optic reflective element assembly or cell, such as an electrochromic reflective element or cell. The reflective element 10 includes a front substrate 12 and a rear substrate 14 (FIGS. 1-3). The rear reflective element substrate 14 is spaced from front reflective element substrate 12, and the cell includes an electrolyte or monomer composition or electrochromic medium 16 and conductive or semi-conductive layers 18, 20 (described below) sandwiched therebetween. An epoxy seal material 22 or the like, is applied between the substrates to define the cavity for the electrochromic medium and to adhere the substrates together. Reflective element assembly 10 includes a reflectant indicia layer 24 disposed or otherwise formed at the rear surface 12a of the front substrate 12 or the front surface 14a of rear substrate 14, whereby the reflectant indicia layer 24 is viewable through the front substrate 12 by a driver of the vehicle, yet does not interfere with the reflectance of the reflective element assembly.

The rearview mirror assembly may comprise an electro-optic or electrochromic reflective element or cell, such as an electrochromic mirror assembly and electrochromic reflective element utilizing principles disclosed in commonly assigned U.S. Pat. Nos. 6,690,268; 5,140,455; 5,151,816; 6,178,034; 6,154,306; 6,002,544; 5,567,360; 5,525,264; 5,610,756; 5,406,414; 5,253,109; 5,076,673; 5,073,012; 5,117,346; 5,724,187; 5,668,663; 5,910,854; 5,142,407; 4,824,221; 5,818,636; 6,166,847; 6,111,685; 6,392,783; 6,710,906; 6,798,556; 6,554,843 and/or 4,712,879, and/or U.S. patent application Ser. No. 10/054,633, filed Jan. 22, 2002 by Lynam et al. for VEHICULAR LIGHTING SYSTEM, now U.S. Pat. No. 7,195,381; and/or Ser. No. 11/021,065, filed Dec. 23, 2004, now U.S. Pat. No. 7,255,451, and/or International Pat. Publication Nos. WO 2004/098953, published Nov. 18, 2004; WO 2004/042457, published May 21, 2004; and WO 2003/084780, published Oct. 16, 2003, which are all hereby incorporated herein by reference in their entireties, and/or as disclosed in the following publications: N. R. Lynam, "Electrochromic Automotive Day/Night Mirrors", *SAE Technical Paper Series* 870636 (1987); N. R. Lynam, "Smart Windows for Automobiles", *SAE Technical Paper Series* 900419 (1990); N. R. Lynam and A. Agrawal, "Automotive Applications of Chromogenic Materials", *Large Area Chromogenics: Materials and Devices for Transmittance Control*, C. M. Lampert and C. G. Granquist, EDS., Optical Engineering Press, Wash. (1990), which are hereby incorporated by reference herein in their entireties. The thicknesses and materials of the coatings on the substrates of the electrochromic reflective element, such as on the third surface of the reflective element assembly, may be selected to provide a desired color or tint to the mirror reflective element, such as a blue colored reflector, such as is known in the art and/or such as described in U.S. Pat. Nos. 5,910,854 and 6,420,036, and in PCT Application No. PCT/US03/29776, filed Sep. 9, 2003 Donnelly Corp. et al. for MIRROR REFLECTIVE ELEMENT ASSEMBLY, which are all hereby incorporated herein by reference in their entireties.

Optionally, use of an elemental semiconductor mirror, such as a silicon metal mirror, such as disclosed in U.S. Pat. Nos. 6,286,965; 6,196,688; 5,535,056; 5,751,489; and 6,065,840, and/or in U.S. patent application Ser. No. 10/993,302, filed Nov. 19, 2004 by Lynam for MIRROR REFLECTIVE ELEMENT FOR A VEHICLE, now U.S. Pat. No. 7,338,177, which are all hereby incorporated herein by reference in their entireties, can be advantageous because such elemental semiconductor mirrors (such as can be formed by depositing a thin film of silicon) can be greater than 50 percent reflecting in the photopic (SAE J964a measured), while being also substantially transmitting of light (up to 20 percent or even more). Such silicon mirrors also have the advantage of being able to be deposited onto a flat glass substrate and to be bent into a curved (such as a convex or aspheric) curvature, which is also advantageous since many passenger-side exterior rearview mirrors are bent or curved.

As shown in FIG. 3, the rear surface 12a of front substrate 12 may have a transparent conductive layer 18 disposed thereon. The transparent conductive layer 18 may comprise any suitable transparent conductive coating or layer, such as an indium tin oxide (ITO) or doped (antimony or fluorine doped) tin oxide or doped zinc oxide (such as aluminum-doped zinc oxide) or an ITO/thin Ag/ITO stack or an ITO/thin Al/ITO stack or a thin (preferably, less than about 200 angstroms in physical thickness; more preferably less than about 150 angstroms thick; most preferably less than about 125 angstroms thick; and greater than about 75 angstroms thick, more preferably greater than about 85 angstroms thick and most preferably greater than about 100 angstroms thick) coating of silver (or a silver alloy) sandwiched between ITO or doped zinc oxide layers or a thin coating of aluminum (or an aluminum alloy) sandwiched between ITO or doped zinc oxide layers or a thin coating of platinum or palladium (or an alloy thereof) sandwiched between ITO or doped zinc oxide layers or a thin coating of ruthenium (or a ruthenium alloy) sandwiched between ITO or doped zinc oxide layers, or such as the conductive layers described in U.S. Pat. Nos. 6,690,268; 5,668,663; 5,142,406; 5,442,478 and 5,724,187, and/or in U.S. patent application Ser. No. 10/054,633, filed Jan. 22, 2002 by Lynam et al. for VEHICULAR LIGHTING SYSTEM, now U.S. Pat. No. 7,195,381; Ser. No. 11/021,065, filed Dec. 23, 2004 by McCabe et al. for ELECTRO-OPTIC MIRROR CELL, now U.S. Pat. No. 7,255,451; Ser. No. 10/528,269, filed Mar. 17, 2005, now U.S. Pat. No. 7,274,501; Ser. No. 10/533,762, filed May 4, 2005, now U.S. Pat. No. 7,184,190, and/or in PCT Application No. PCT/US03/29776, filed Sep. 19, 2003 by Donnelly Corp. et al. for MIRROR REFLECTIVE ELEMENT ASSEMBLY; and/or PCT Application No. PCT/US03/35381, filed Nov. 5, 2003 by Donnelly Corp. et al, for ELECTRO-OPTIC REFLECTIVE ELEMENT ASSEMBLY, which are hereby incorporated herein by reference in their entireties. Note that double-silver stacks (as such term is commonly known and used in the heat mirror-coated art) may be used as a transparent conductor layer. Transparent conductor layers useful in the present invention thus may comprise conductive material such as tin oxide ($SnO_2$) doped with antimony or fluorine, indium oxide, indium oxide and tin ($In_2O_3Sn$) (preferably 5-15 percent Sn), zinc oxide (ZnO), zinc oxyfluoride, zinc oxide and indium (ZnO:In), zinc oxide and aluminum (ZnO:Al), cadmium stannate ($Cd_2SnO_4$), cadmium stannite ($CdSnO_3$), cadmium oxide (CdO), copper sulfide ($Cu_2S$), titanium nitride (TiN), or titanium oxynitride ($TiO_xN_{1-x}$) to provide electrical contact to the electrochromic medium and/or for other layers/elements useful in the present invention.

In the illustrated embodiment, the reflective element 10 comprises a third surface reflective element, and the front surface 14a of rear substrate 14 includes a metallic reflective layer or coating or coatings 20 disposed thereon. The metallic reflective coatings 20 may comprise any suitable metallic layer or layers, such as silver or chromium or rhodium or aluminum or the like, and/or such as the layer or layers of the types described in U.S. Pat. Nos. 6,690,268; 5,668,663 and 5,724,187, and/or in U.S. patent application Ser. No. 10/054,633, filed Jan. 22, 2002 by Lynam et al. for VEHICULAR LIGHTING SYSTEM, now U.S. Pat. No. 7,195,381; Ser. No. 11/021,065, filed Dec. 23, 2004 by McCabe et al. for ELECTRO-OPTIC MIRROR CELL, now U.S. Pat. No. 7,255,451; Ser. No. 10/528,269, filed Mar. 17, 2005, now U.S. Pat. No. 7,274,501; Ser. No. 10/533,762, filed May 4, 2005, now U.S. Pat. No. 7,184,190, and/or in PCT Application No. PCT/US03/29776, filed Sep. 19, 2003 by Donnelly Corp. et al. for MIRROR REFLECTIVE ELEMENT ASSEMBLY; and/or PCT Application No. PCT/US03/35381, filed Nov. 5, 2003 by Donnelly Corp. et al. for ELECTRO-OPTIC REFLECTIVE ELEMENT ASSEMBLY, which are hereby incorporated herein by reference in their entireties.

As shown in FIG. 3, the indicia reflector or indicia layer 24 may be disposed or established over a portion of the third surface metallic conductive layer 20. For example, the metallic reflective layer may comprise silver or aluminum or the like or alloys thereof, and may provide at least approximately 80 percent or more reflectivity of light incident thereon. The indicia metallic reflector 24 may comprise a metallic material that has a reduced reflectivity of light incident thereon as compared to the reflectivity of the metallic reflective layer 20. For example, the indicia metallic reflector 24 may comprise chromium or titanium or the like or alloys thereof, and thus may provide reflectivity in the range of approximately 35 percent to approximately 65 percent. The reduced reflectivity of light incident on the indicia metallic reflector 24 provides a contrast between the indicia reflector and the reflective coating 20, such that the indicia metallic reflector is discernible by a person viewing the reflective element, yet still provides reflectivity at the indicia area so as to not unduly affect the functionality of the reflective element. Optionally, the indicia reflector may comprise a dielectric coating, such as a transparent conductive coating, such as an ITO or doped tin oxide or doped zinc oxide (such as with an aluminum dopant) or the like, whereby the interference effect caused by the ITO adds a slight but discernible color tint at the indicia reflector so that the indicia is discernible by a person viewing the reflective element, yet still provides reflectivity at the indicia area so as to not unduly affect the functionality of the reflective element. Examples of various interference effects of ITO or other transparent conductive materials are described in PCT Application No. PCT/US03/29776, filed Sep. 19, 2003 by Donnelly Corp. et al. for MIRROR REFLECTIVE ELEMENT ASSEMBLY; and/or PCT Application No. PCT/US03/35381, filed Nov. 5, 2003 by Donnelly Corp. et al. for ELECTRO-OPTIC REFLECTIVE ELEMENT ASSEMBLY; and/or PCT Application No. PCT/US2004/015424, filed May 18, 2004 by Donnelly Corp. et al. for MIRROR ASSEMBLY FOR VEHICLE; and/or U.S. patent application Ser. No. 11/226,628, filed Sep. 14, 2005; Ser. No. 11/021,065, filed Dec. 23, 2004 by McCabe et al. for ELECTRO-OPTIC MIRROR CELL, now U.S. Pat. No. 7,255,451; Ser. No. 10/528,269, filed Mar. 17, 2005, now U.S. Pat. No. 7,274,501; Ser. No. 10/533,762, filed May 4, 2005, now U.S. Pat. No. 7,184,190; and/or Ser. No. 11/021,065, filed Dec. 23, 2004 by McCabe et al. for ELECTRO-OPTIC MIRROR CELL, now U.S. Pat. No. 7,255,451; and/or U.S. provisional application Ser. No. 60/692,113, filed Jun. 20, 2005; Ser. No. 60/677,990, filed May 5, 2005; Ser. No. 60/653,787, filed Feb. 17, 2005; Ser. No. 60/642,227, filed Jan. 7, 2005; Ser. No. 60/638,250, filed Dec. 21, 2004; Ser. No. 60/624,091, filed Nov. 1, 2004, and Ser. No. 60/609,642, filed Sep. 14, 2004, which are hereby incorporated herein by reference in their entireties.

Figure 4:
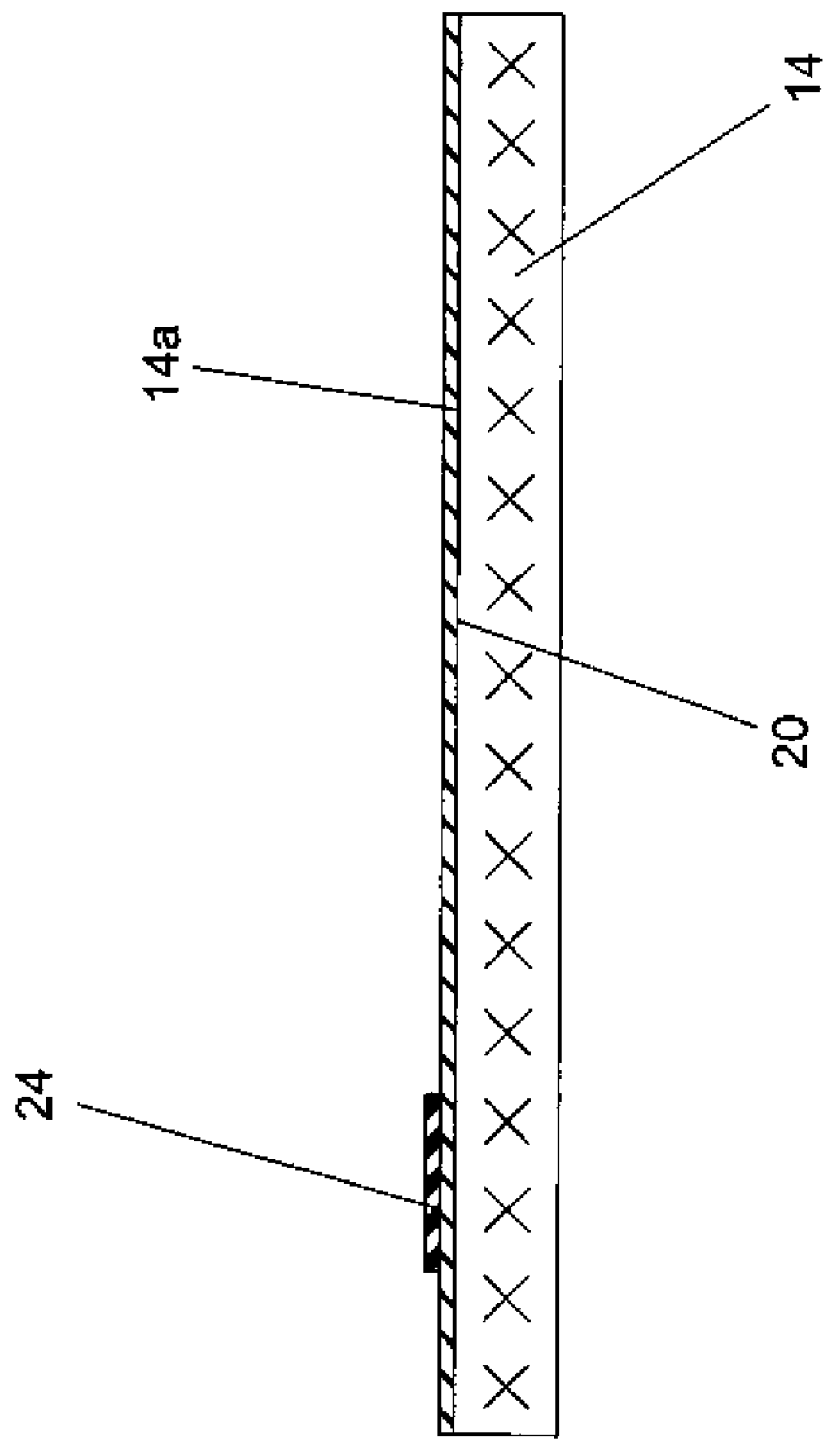
FIG. 4 is a sectional view of a rear substrate of a reflective element of the present invention.
Figure 5:
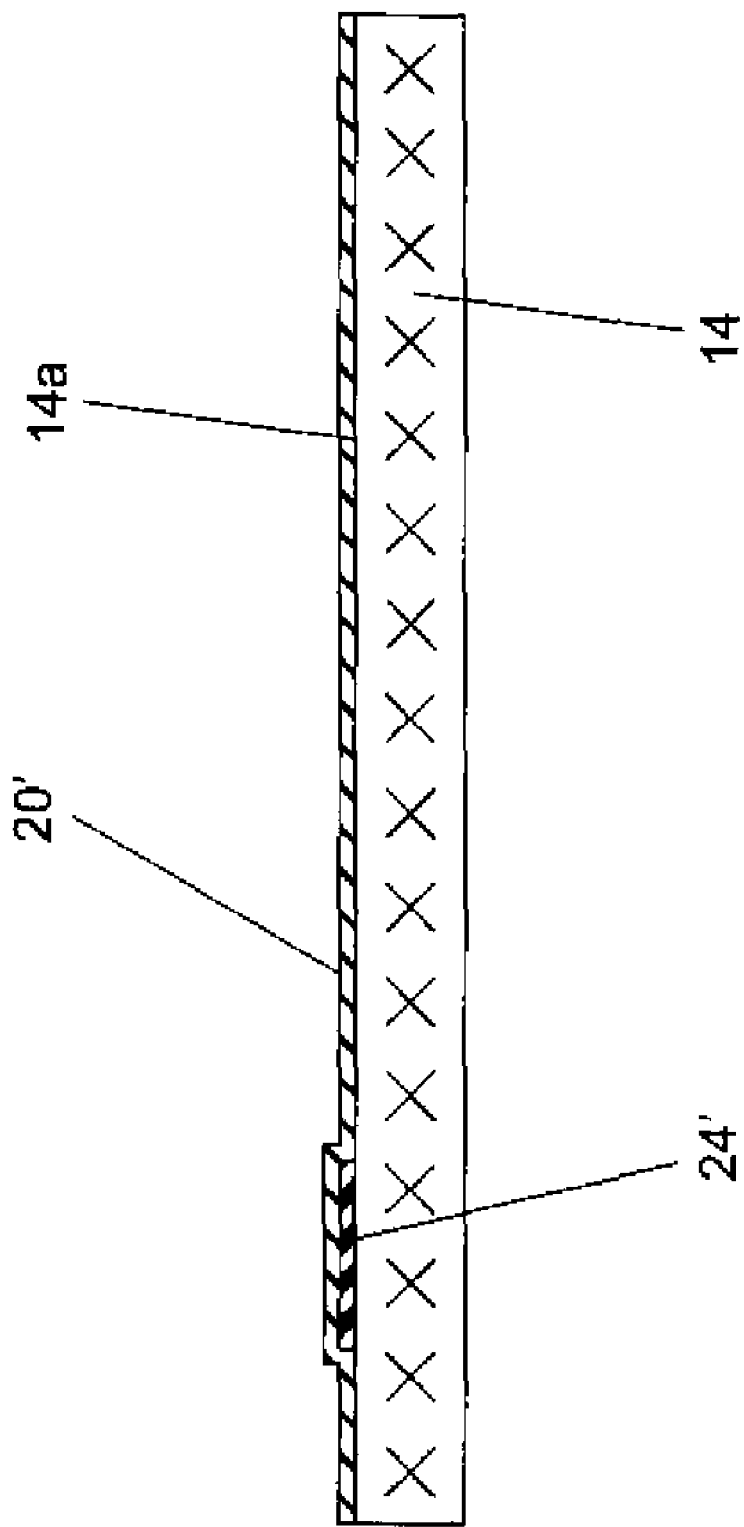
FIG. 5 is a sectional view of another rear substrate of a reflective element of the present invention.

As can be seen with reference to FIG. 4, the indicia reflector may be established over the reflective layer 20 at the front surface 14a of the rear substrate 14 so that the rear substrate with the indicia reflector established thereon may be readily assembled with the front substrate, electro-optic medium and seal in a suitable manner. Optionally, and as shown in FIG. 5, the indicia metallic reflector 24' may be applied to or established at a portion or region of the front surface 14a of the rear substrate 14, and the metallic conductive layer 20' may be disposed or established over substantially the rest of the front surface 14a and over the indicia metallic reflector 24', so that the indicia metallic reflector 24' is behind the reflective layer 20 and between at least one layer 20 and the rear substrate. For example, the indicia layer 24' may comprise a layer of chromium (such as about 2000 angstroms thick), and the reflective coating may comprise a layer of silver (such as about 600 angstroms thick). The presence of the thicker layer of chromium underneath the thin layer of silver provides a subtle viewable indicia layer at the reflective element, without adversely effecting the functionality of the reflective element. Optionally, materials for the layer may be selected to provide a difference in the reflectivity and/or color of the reflective coating or layer and the indicia layer to provide a discernible contrast so that the indicia is discernible by a person viewing the reflective element, yet still provides reflectivity at the indicia area so as to not unduly affect the functionality of the reflective element. Optionally, the indicia layer or reflector may be disposed or established at either side of a fourth surface reflective coating at the rear surface of the rear substrate in a similar manner to provide the desired discernibility of the indicia at the reflective element, without affecting the scope of the present invention.

The indicia reflector or layer may be established via any suitable means. For example, the indicia reflector may be disposed, such as by sputter coating or the like, at a masked area of the substrate surface to dispose the material at the desired location. Optionally, the indicia layer may be coated or screened onto the substrate surface or onto the reflective coating, such as by a screen/coat/strip process (where a resist pre-deposition is screened or printed onto the substrate, and the indicia layer (such as chromium or the like) is coated onto the substrate and the resist post deposition of the indicia layer material is washed away, whereby the indicia layer material remains at the screened or printed areas). Other means for applying or establishing or forming the indicia layer onto the substrate surface (or onto a reflective coating on the substrate surface) may be implemented without affecting the scope of the present invention.

Optionally, a light source or indicator may be positioned behind the indicia layer, such as at a circuit board within the mirror, to illuminate or backlight the indicia layer to further enhance viewing of the indicia, particularly in low lighting conditions, such as at nighttime. Optionally, the illumination source or light source behind the indicia may be selected to match the color that may be typically associated with the selected logo (such as discussed below), such as a green or red or blue indicator or light emitting diode or the like for the school color or the like. Other forms of customized logos or indicia or the like and associated illumination sources and the like may be established at the reflective element, without affecting the scope of the present invention.

Although shown and described as an exterior rearview mirror assembly, the reflective element of the present invention may be suitable for use with an interior rearview mirror assembly, where the reflective element and a housing of the mirror are pivotally or adjustably mounted to an interior portion of a vehicle, such as via a double ball mounting or bracket assembly or the like.

Optionally, the indicia layer may provide a graphic depiction of a desired image, such as a logo of the vehicle manufacturer or other desired image. For example, the indicia may be established or otherwise formed to provide the letters "FORD" or may be established or otherwise formed in a pattern similar to the design or designs indicative of the manufacturer, such as the Chevrolet "bowtie" or the like. Optionally, other designs or patterns or text or logos or indicia or the like may be provided at the reflective element to provide a desired image or logo. For example, the indicia layer may be formed to be indicative of other vehicle manufacturers or entities or sponsors or indicia or trademarks or emblems or signature items, or representations of a certain political views, religious beliefs, tribal affiliations, community ties, collegiate affiliations, allegiances and/or advocacy (such as, for example, a "peace" sign or other symbol or text or the like) or other views, affiliations, beliefs, etc., or other custom ports or icons may be formed elsewhere on the reflective element to convey other information or logos or the like, without affecting the scope of the present invention (and such as described in U.S. patent application Ser. No. 11/021,065, filed Dec. 23, 2004 by McCabe et al. for ELECTRO-OPTIC MIRROR CELL, now U.S. Pat. No. 7,255,451, and/or PCT Application No. PCT/US2004/015424, filed May 18, 2004 by Donnelly Corp. et al. for MIRROR ASSEMBLY FOR VEHICLE, which are hereby incorporated herein by reference in their entireties).

The desired image or logo may be indicative of the vehicle manufacturer, or may be selected by the user or vehicle owner to provide a customized interior or exterior rearview mirror assembly, such as described above with respect to the different logos or colors, without affecting the scope of the present invention. For example, a person may select the logo or mascot of their alma mater to be established at a desired location at the reflective element to customize the mirror assembly for that particular person or owner. The customized reflective element may provide the desired logo or indicia or the like, without unduly affecting the functionality of the reflective element.

Optionally, and as shown in FIGS. 1 and 2, the reflective element 10 may include a perimeter metallic band 26, such as the types described in PCT Application No. PCT/US03/29776, filed Sep. 19, 2003 by Donnelly Corp. et al. for ELECTROCHROMIC MIRROR ASSEMBLY; and/or PCT Application No. PCT/US03/35381, filed Nov. 5, 2003 by Donnelly Corp, et al. for ELECTRO-OPTIC REFLECTIVE ELEMENT ASSEMBLY; and/or U.S. patent application Ser. No. 11/021,065, filed Dec. 23, 2004 by McCabe et al. for ELECTRO-OPTIC MIRROR CELL, now U.S. Pat. No. 7,255,451; Ser. No. 10/528,269, filed Mar. 17, 2005, now U.S. Pat. No. 7,274,501; Ser. No. 10/533,762, filed May 4, 2005, now U.S. Pat. No. 7,184,190; Ser. No. 11/226,628, filed Sep. 14, 2005; and/or Ser. No. 11/021,065, filed Dec. 23, 2004 by McCabe et al. for ELECTRO-OPTIC MIRROR CELL, now U.S. Pat. No. 7,255,451; and/or U.S. provisional application Ser. No. 60/692,113, filed Jun. 20, 2005; Ser. No. 60/677,990, filed May 5, 2005; Ser. No. 60/653,787, filed Feb. 17, 2005; Ser. No. 60/642,227, filed Jan. 7, 2005; Ser. No. 60/638,250, filed Dec. 21, 2004; Ser. No. 60/624,091, filed Nov. 1, 2004, and Ser. No. 60/609,642, filed Sep. 14, 2004, which are hereby incorporated herein by reference in their entireties. The perimeter band metallic material may be selected to provide a desired band color, such as due to interference effects or material colors and/or reflectances and/or refractive indices. Optionally, the material for the perimeter band may be selected so that the appearance or color of the perimeter band may substantially match or contrast the appearance or color of the indicia layer or reflector, depending on the desired appearance of the reflective element. For example, a combination or stack of oxides comprising materials having different high and low refractive indices may be stacked upon one another to provide alternating refractive indices to spectrally tune the metallic band and/or the indicia reflector or layer to the desired colors or tints or appearances (such as utilizing principles described in PCT Application No. PCT/US03/29776, filed Sep. 19, 2003 by Donnelly Corp. et al. for ELECTROCHROMIC MIRROR ASSEMBLY, and/or Ser. No. 10/528,269, filed Mar. 17, 2005, now U.S. Pat. No. 7,274,501, which are hereby incorporated herein by reference in their entireties).

Figure 6:
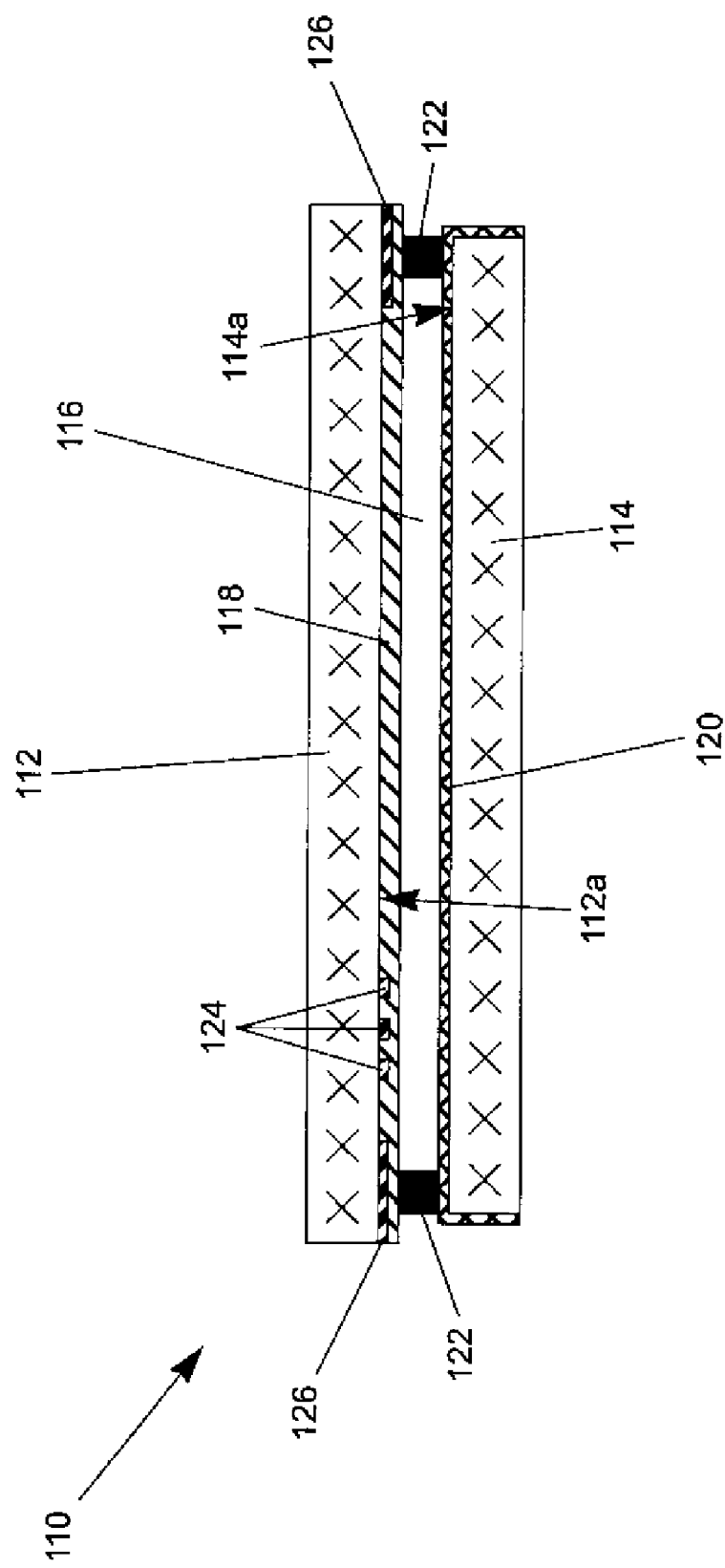
FIG. 6 is a sectional view of a reflective element of the present invention.

Optionally, and with reference to FIG. 6, a reflective element assembly or cell 110 for a rearview mirror assembly, such as for an interior or exterior rearview mirror assembly for a vehicle, includes a front substrate 112 and a rear substrate 114 spaced from front reflective element substrate 112, with an electrolyte or a cured monomer composition or electrochromic medium 116 sandwiched therebetween. The front substrate 112 has a transparent conductive coating or layer 118 disposed on its rear surface 112a (typically referred to as the second surface of the reflective element assembly) and the rear substrate 114 has a metallic conductive coating or layer 120 disposed on its front surface 114a (typically referred to as the third surface of the reflective element assembly), such as described above. As can be seen in FIG. 6, the indicia 126 is locally deposited or established or disposed at the second surface of the front substrate at the desired location and/or pattern (and with the ITO coating adjacent to or over the indicia), while the metallic conductive coating 120 is deposited or established or disposed over substantially the entire third surface of the rear substrate so as to be behind and surrounding the indicia as viewed by the driver when the mirror assembly is installed at the vehicle. An epoxy seal material 122 or the like, is applied between the substrates to define the cavity for the electrochromic medium and to adhere the substrates together. Reflective element assembly 110 includes a reflective perimeter or border band 126 and a reflectant indicia layer 124 disposed or otherwise formed or established at the rear or second surface 112a of the front substrate 112.

Indicia layer 124 may be established during the same coating process as the perimeter band 126 and may be established on the rear surface of the substrate, so that the transparent conductive layer 118 is disposed or established onto the perimeter band 126 and indicia layer 124 and over the rear surface 112a of front substrate 112. For example, the rear surface of the front substrate may be masked to define the perimeter border and the desired indicia or form. The mask may be etched or cut or punched to provide the desired indicia or logo or the like (which may appear in a reverse image manner when the mask is placed on the rear surface of the front substrate). The etched mask thus may be placed at or on the rear surface of the front substrate and the desired reflective material (such as described below) may be disposed onto the rear surface of the substrate in the unmasked or uncovered areas. The reflective indicia may be formed so as to be located at the electrochromic portion of the mirror (radially inward from the seal and perimeter or border band), so as to be readily viewable by the driver of the vehicle and so as to be visibly effected by the darkening of the electrochromic medium and the corresponding dimming of the electrochromic mirror, as discussed below.

Preferably, metallic conductive coating 120 comprises a substantially highly reflective material with a high degree of reflectivity of light incident thereon. For example, the third surface coating 120 may comprise aluminum or silver or their alloys (or other similar or suitable metallic compositions and the like), and may provide greater than about 80 percent reflectivity of light incident thereon (as measured using SAE J964a) and more preferably greater than about 90 percent reflectivity of light incident thereon. Preferably, the reflective indicia 124 (and the reflective perimeter band 126) comprises a lower or reduced reflectivity of light incident thereon than that provided by the third surface reflective coating. For example, the reflective indicia 124 may comprise chromium or titanium or nickel or molybdenum or ruthenium or their alloys or other similar or suitable metal (such as a stainless steel or a nickel based alloy, such as Hastelloy C), and may provide about 65 percent reflectivity of light incident thereon, and more preferably less than about 55 percent reflectivity of light incident thereon (such as between about 35 percent reflectivity to about 65 percent reflectivity of light incident thereon).

Indicia layer 124 may also comprise a specularly reflective layer, preferably such as a mirror-reflective thin film of chromium, ruthenium, silver, silver alloy, aluminum, aluminum alloy or other metal or metal alloy. Thus, and preferably, the indicia layer material comprises a metallic material such that is locally provides a mirror-like reflection at the second surface of the front substrate that is subtly discernible against the third surface mirror reflector at the third surface of the rear substrate of the electrochromic reflective element. Such a specular or mirror-like reflective material may be attained from a sputtered or vacuum deposited metallic thin film coated onto the substrate. The indicia coating or coatings or layer(s) may be disposed onto the substrate surface at the desired location and pattern with the transparent electrically conductive coating of the second surface of the front substrate (such as ITO or other transparent electrically conductive coatings, such as doped tin oxide or doped zinc oxide such as ZnO:Al or the like) deposited over the glass surface and over the indicia material (so that the reflection off the indicia layer(s) is unaffected by the ITO disposed therebehind and thus more metallic or "silvery" in hue and is substantially spectrally neutral rather than being spectrally reflecting/ tinted), or the ITO coating may be deposited onto the second-surface surface of the front substrate with the indicia coating material disposed onto the ITO-coated surface at the desired location and pattern (so that the reflection off the indicia layer(s) is/are seen through the ITO and so an interference spectral character to such reflectivity may be imparted), depending on the particular application and desired appearance/effect of the mirror reflective element assembly.

Although shown as a mirror reflective element having the front substrate 112 larger than the rear substrate, such as for a frameless mirror reflective element for an exterior rearview mirror assembly, the mirror reflective element with indicia may comprise other types of reflective elements, such as a flush reflective element for an interior or exterior rearview mirror assembly or an offset construction such as is known in the electro-optic mirror art, without affecting the scope of the present invention. For example, and as shown in FIG. 6A, a reflective element 110' (preferably an exterior vehicular mirror element) may have a front substrate 112' that is substantially flush with the rear substrate 114', with a reflective indicia or logo 124' (and optionally and preferably a perimeter border band 126' as well) established at the second surface 112a' of front substrate 112'. The front substrate 112' is spaced from the rear substrate 114' with an electrochromic medium 116' disposed therebetween and sealed by a perimeter seal 122'. The logo or indicia 124' (locally established inboard of the perimeter edge or border of the front substrate on its second surface) and border band 126' (at and substantially circumscribing the second-surface perimeter edge or border region of the front substrate) preferably comprise the same metallic reflecting layer, such as sputtered chromium or the like or have distinctly different reflectivity (such as chromium for indicia 124' and ruthenium for border band 126'), and are preferably established via the same coating process as described above. Reflective element 110' includes a transparent conductive coating 118' at the second surface 112a' (such as disposed or established over the perimeter border band 126' and indicia 124', such as described above), which may comprise an ITO coating or a doped zinc oxide (such as ZnO:Al) coating (such as the types discussed below) or other suitable transparent conductive coating or layer or material.

The third surface reflective coating or layers 120' at the third surface 114a' of rear substrate 114' may comprise any suitable material or materials or layers to provide the desired reflectivity and/or transreflectivity at the third surface of the mirror reflective element. For example, the third surface coatings 120' may comprise a layer of chromium 120a' at the third surface 114a' of rear substrate 114', with a layer of ruthenium 120b' disposed over the layer of chromium 120a'. In such an application, the indicia 124' may comprise chromium and the front-most layer 120b' of third surface reflector 120' may comprise ruthenium (that typically is about 5-20 percent or so more reflecting than chromium, depending on the deposition conditions employed), or both may be similar or identical materials (e.g. chromium or ruthenium). Even with the same materials, the indicia is still discernible due to a contrast between the indicia 124' at the second surface and the coatings or layers 120' at the third surface (due to the optical properties such as refractive index and spectral absorption of the electro-optic EC medium disposed between the second and third surfaces). In the illustrated embodiment, the ITO layer 118' is disposed over the indicia 124', but optionally the ITO layer may be disposed at the second surface with the indicia disposed over the ITO at the desired location or pattern. If the ITO is established at the second surface before the indicia, the indicia may be colored or tinted due to the optical interference effect or coloring caused by the ITO (when the ITO is between the substrate and the indicia and thus the indicia is viewed through the ITO coating by a person viewing the mirror reflective element). Such an arrangement may provide a gold-tinted or blue-tinted or other color tint to the indicia, dependent principally on the thickness of the ITO (or other transparent conductive material) used, which may be preferred depending on the particular application of the mirror assembly and desired effect or appearance of the mirror assembly. Optionally, indicia layer(s) 124' may be formed of a metallic metal coating (such as of gold or a gold alloy) that is itself spectrally selective in reflectivity so as to be tinted in reflection.

Figure 6B:
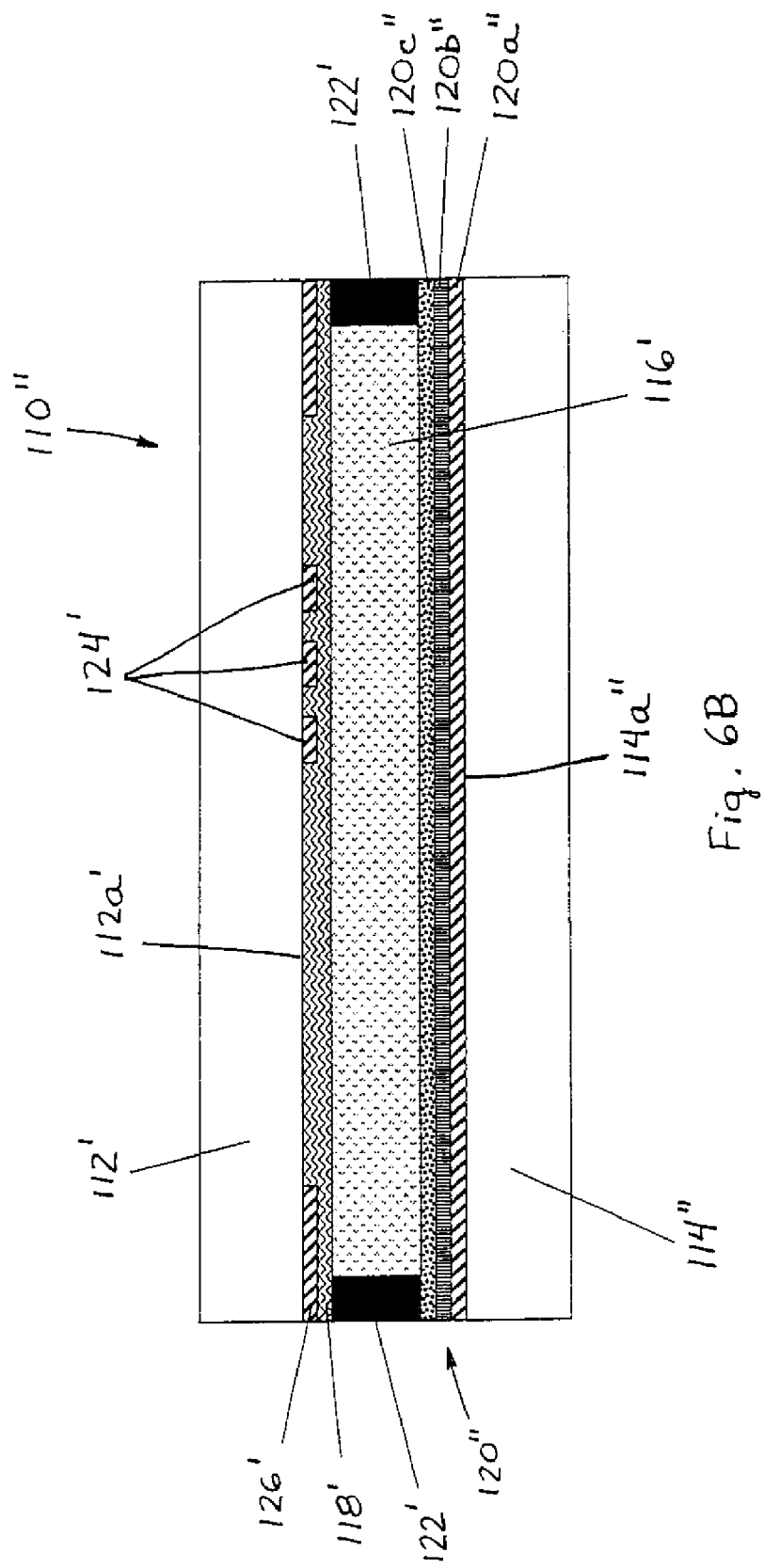
FIG. 6B is a sectional view of another reflective element of the present invention.

Optionally, and as shown in FIG. 6B, a mirror reflective element 110" (preferably an exterior vehicular mirror element) may be substantially similar to mirror reflective element 110' as described above, and may include a third surface coating or layers 120" at a rear surface 114a" of the rear substrate 114" that comprises a layer of chromium 120a" disposed at the third surface of the rear substrate, with a layer of silver 120b" disposed over the layer of chromium 120a" and a layer of aluminum zinc oxide 120c" (ZnO:Al) disposed over the layer of silver 120b". The third surface reflector thus comprises a different material and specular reflectivity as compared to the chromium indicia 124', whereby the indicia may be more readily discernible by a person viewing the reflective element when the reflective element is in its "day" state due to the contrast between the much more highly reflecting third surface main mirror reflector (typically a silver or silver-alloy metal coating that has a specular first-surface reflectivity, as measured in accordance with SAE J964a, that is at least about 80% R and often at least about 90% R) and the less highly reflecting second-surface indicia/ logo reflecting coating or layer (for example, an evaporated chromium coating that has a reflectivity of about 45-55% R or a sputtered chromium coating that has a reflectivity of about 55-65% R). Other stacks or layers of metallic conductive reflective or transflective coatings or layers may be implemented to achieve the desired reflectivity and transmissivity at the third surface of the reflective element, while providing a desired degree of discernibility of the indicia, while remaining within the spirit and scope of the present invention. The indicia material and third surface reflector material and arrangement of the indicia and ITO coatings may be selected to achieve the desired color and reflectivity differential of the indicia relative to the third surface reflector, depending on the particular application and desired effect of the mirror assembly.

Because the reflective indicia that is locally established in a pattern on the second surface of the front substrate is desirably less reflective than the third surface reflective coating on the rear substrate (when the mirror is in its "day" or undimmed state or high reflectance state) or, less desirably, vice versa, and is surrounded by and backdropped by the third surface reflective coating (which preferably provides a higher reflectivity background to the indicia), the indicia is subtly (such as via the differences in reflectivities of the materials used) discernible by a person viewing the reflective element when the EC medium is unpowered and is in its high reflectance state. The viewability and discernibility of the indicia may be subtle when the reflective surface of the rear substrate is at its highly reflective state or when the electrochromic medium is not darkened. Thus, during the unpowered state of the electrochromic mirror, the indicia may be subtly viewable and discernible by a person viewing the mirror assembly. However, when the electrochromic minor is powered to darken the electrochromic medium and thus to dim the mirror (such as in response to a glare sensor or the like located at the mirror assembly or elsewhere in the vehicle), the reflectivity of light provided by the third surface reflective coating is reduced (due to the darkening of the electrochromic medium in front of the third surface reflective coating), so that the indicia becomes more visible or more discernible to a person viewing the mirror. In other words, the indicia may be enhanced and more readily viewable and discernible as the minor is darkened and the reflectivity of the third surface reflective coating is limited or reduced by the darkening of the electrochromic medium.

Optionally, the third surface metal reflector on the third surface of the rear substrate of the cell, the perimeter reflective border band around the edge border of the second surface of the front substrate, and the indicia (also on the second surface but inward of the border band) may be reflective materials, and may comprise substantially the same metallic or reflective material, so that all three have similar or closely similar reflective properties, and may all have substantially the same optical properties, such as reflectivity level and refractive index/k-value. By so choosing, the optical contrast between the third surface reflector coating and the second surface perimeter border is substantially reduced and essentially eliminated such that the viewer barely sees or notices the presence of the second surface border band when the electrochromic cell is not powered (i.e. is undimmed and is in its bleached state), and the presence of the border reflective band is only discernable when the electrochromic medium dims when the cell is powered. Also, the presence of the indicia (such as an ANTI-GLARE indicia or AUTODIM indicia or the like) on the second surface is subtly noticeable to a viewer because its optical properties substantially match those of the third surface reflector coating (for example, chromium may be used for the indicia and ruthenium for the third surface reflector for an exterior mirror element, or chromium may be used for the indicia and silver or a silver-alloy may be used for the third surface reflector for an interior mirror element), such that the viewer subtly sees or notices or discerns the presence of the second surface indicia when the electrochromic cell is not powered (i.e. is undimmed and in its bleached state), but the presence of the indicia on the second surface becomes appreciably discernable when the electrochromic medium dims when the cell is powered, and in such circumstances provides a "surprise and delight" benefit to the consumer.

This is particularly advantageous when an AUTODIM or similar automatic dimming indication logo/indicia is used. When the likes of an electrochromic automatic dimming interior mirror element dims in reflectivity at night when rear-approaching glaring headlights are detected, the driver is often unaware of and thus unappreciative of the anti-glare benefits of this feature. In accordance with the present invention, the AUTODIM logo/indicia on the second surface of the front substrate becomes plainly visible once the electro-optic EC medium is powered at night when the mirror element is subject to and is being illuminated by incident light from approaching headlights that are sufficiently intense to cause the automatic glare detection circuitry to power the electro-optic EC medium. And the more intense the glare detected, the darker the electro-optic EC medium dims and the more the second-surface logo/indicia stands out, and so the continuously variable reflectivity feature of such automatic electrochromic mirror assemblies is conveyed to the driver. Note that, for example, the third surface reflector coating and the second surface perimetal border reflector band (if present) and the second surface indicia may all three comprise chromium thin films or all three may comprise ruthenium thin films or all three may comprise rhodium thin films or all three may comprise Hastelloy C-276 thin films or all three may comprise molybdenum thin films or all three may comprise aluminum (or aluminum alloy) thin films or all three may comprise aluminum/palladium alloy thin films or all three may comprise silver (or silver alloy) thin films, or all three may comprise sub-sets of these or other suitable coatings or films.

Thus, the indicia may optionally be selected to provide information that may be relevant to the driver of the vehicle during night driving when the EC medium dims or darkens in response to detected incident glaring conditions. For example, the logo/indicia may provide a notice or indication to the driver that the electrochromic mirror assembly is powered and thus in an active mode or darkened or dimmed mode, in order to provide a visual reinforcement or communication to the driver that the mirror assembly is working in the desired and designed manner, and is delivering glare protection. Such an information display logo or indication is thus desirable, since customers may not otherwise readily recognize that the electrochromic mirror is properly dimming, and thus may not otherwise fully appreciate the benefits provided by the automatic mirror dimming feature. For example, the indicia can read "AUTODIM" or "ANTI-GLARE" or "EC" or "NIGHT" or may be an icon, such as a representation of a headlamp with a cross or "X" superimposed thereon, indicating that the glare or reflection of the light from the headlamps is being reduced or dimmed by the mirror. Optionally, the logo/indicia may convey other information, such as an automaker brand or personalization information, to the driver that stands out when the EC medium dims.

The indicia material of the present invention thus may provide a reflective logo that is faintly visible/discernible to the driver when the EC mirror is in its "day" state (where the EC medium is not darkened or colored), but becomes plainly or substantially visible/discernible when the EC mirror dims to its "night" state (when the EC medium is darkened or colored to reduce glare at the reflective element). For example, the reflective logo may be locally coated or established at the second surface of the front substrate and may have a reflectivity of about 55 percent of light incident thereon, while the main or primary mirror reflector established at the third surface of the rear substrate may have a reflectivity of about 70 percent of light incident thereon. Thus, in the "day" state, the driver can discern the lower reflectivity of the logo against the distinctly higher or brighter reflectivity of the main mirror reflector behind the logo; whereby the logo is subtly but distinctly visible/discernible at the mirror reflective element while the mirror reflectivity of light incident thereon is sustained across the viewing surface, even at the location where the logo is disposed or established. Because a person's eyes typically can discern a difference in reflectivity of about 5 percent, and can more readily discern a difference in reflectivity of about 10 percent or more, the difference in reflectivity between the logo and the third surface mirror reflector is readily discernible by the driver of the vehicle when the mirror is in its "day" state.

When the mirror changes to its "night" or antiglare state, the reflectivity of the primary mirror reflector is substantially reduced (due to the darkening or coloring of the EC medium), while the reflectivity of the logo (established at the second surface and thus in front of the EC medium) is substantially unaffected by the activation of the EC mirror. Thus, when the EC mirror dims, the logo "stands-out" or becomes plainly or substantially visible or discernible at the reflective element. The indicia or logo may be selected to convey the desired message or information or display to the viewer. For example, the logo may comprise the term "AUTODIM" or "ANTI-GLARE" or the like to indicate to the driver that the EC mirror has such a feature. Optionally, the logo may comprise a personalized logo, such as a sports logo or college logo or the like (which may be selected by the user or owner of the vehicle) or a vehicle logo, such as "FORD" or "GM" or the like, depending on the particular application and desired display or appearance of the mirror assembly.

The indicia material and the third surface reflector material may comprise similar materials or may comprise different reflective materials, depending on the desired appearance and effect of the reflective element. For example, the indicia material may be selected as a gold or bronze colored or tinted material (such as a gold or gold alloy or the like) to provide a desired spectral appearance. Such a colored or tinted indicia material may be more readily discernible at the reflective element since it is backdropped and surrounded by the specularly reflective mirror reflector at the third surface. The third surface mirror reflector may comprise any suitable reflective or transflective material or materials, such as an ISI (ITO-silver-ITO) stack of layers or layers including other metallic materials, such as silver alloys and the like, such as the other materials discussed herein), and provides a specularly reflective (and optionally transreflective) mirror reflector behind and around the indicia as viewed by a driver of the vehicle.

Note that the degree of subtly that the logo/indicia is discernible to the driver when the electrochromic (EC) medium is not powered (i.e., the EC mirror element is in its high or "day" reflectance state) can be determined by the choices made for the logo/indicia metallic reflecting layer and those of the third surface reflector (or fourth surface reflector) metallic main mirror reflecting layer. For example, a chromium or similar lower reflecting (typically with a first-surface reflectivity in the about 45% R to about 65% R range) metal coating choice for the logo/indicia will be more discernible if the main mirror reflector (that preferably is on the third surface rather than on the fourth surface) is a, high reflecting reflector [such as a silver mirror coating (or a silver alloy) with a first-surface reflectivity of at least about 80% R (and often greater than about 90% R)] than it would be if the main mirror reflector is a medium reflecting reflector [such as a ruthenium mirror coating (or a ruthenium alloy or a platinum or palladium metal or alloy) with a first-surface reflectivity in the about 65% R to about 75% R range, typically]. Also, should the metallic logo/indicia overcoat the transparent conductor coating (such as ITO or AZO) of the second surface (and thus be located behind the transparent conductor coating when the mirror reflective, element is viewed by a person at the vehicle), the metallic logo/indicia may be less subtly discernible than if the metallic logo/indicia undercoats the transparent conductor coating (because the metallic logo/indicia is subject to optical interference effects and has a spectrally selective reflectivity so as to be color tinted in reflectance when the metallic logo/indicia overcoats and is thus located behind the transparent conductor coating).

Particularly for an exterior minor, a user typically cannot discern that the EC function is working, since there is no feedback to the user when the EC function is operating to dim or darken the minor reflection. The increased viewability of the indicia when the EC medium is darkened provides a visual prompt to the user to reinforce to the consumer the value of the feature, particularly for exterior mirror applications, such that the consumer may recognize the value and functionality of the feature and may increase the use the EC feature, thereby enhancing safety. Although it is known to provide LEDs or the like to interior mirror assemblies, the indicia of the present invention provides a similar function, but with reduced costs and complexity of the mirror assembly, since no additional electronic LED or the like is needed to convey the indication that the EC mirror is powered.

Although shown and described as having a third surface reflective coating, the reflective element may have a fourth surface reflective coating, without affecting the scope of the present invention. Optionally, and as shown in FIG. 6, the third surface reflective metallic coating may be disposed over the perimeter edge or edges of the rear substrate so as to provide a wraparound portion at the perimeter edge or edges for electrical connection of electrical connectors at the fourth surface 114a of the reflective element assembly 110 to the conductive coatings 118, 120, such as by utilizing aspects described in U.S. patent application Ser. No. 11/226,628, filed Sep. 14, 2005; and/or Ser. No. 11/021,065, filed Dec. 23, 2004 by McCabe et al. for ELECTRO-OPTIC MIRROR CELL, now U.S. Pat. No. 7,255,451, which are hereby incorporated herein by reference in their entireties.

Also, although shown and described with the perimeter band and indicia being formed directly on the rear surface of the front (first) substrate and with the transparent conductive coating disposed over the perimeter band and indicia, the transparent conductive coating may first be disposed over the rear surface of the front substrate with the perimeter band and indicia then being disposed onto the transparent conductive coating, without affecting the scope of the present invention. Such an arrangement may be desired if a color or tint of the perimeter band and indicia, such as due to the interference effect of the transparent conductive coating between the perimeter band/indicia and the substrate surface, such as described above and by utilizing aspects described in U.S. patent application Ser. No. 11/226,628, filed Sep. 14, 2005; and/or Ser. No. 11/021,065, filed Dec. 23, 2004 by McCabe et al. for ELECTRO-OPTIC MIRROR CELL, now U.S. Pat. No. 7,255,451; and/or U.S. provisional application Ser. No. 60/692,113, filed Jun. 20, 2005; Ser. No. 60/677,990, filed May 5, 2005; Ser. No. 60/653,787, filed Feb. 17, 2005; Ser. No. 60/642,227, filed Jan. 7, 2005; Ser. No. 60/638,250, filed Dec. 21, 2004; Ser. No. 60/624,091, filed Nov. 1, 2004, and Ser. No. 60/609,642, filed Sep. 14, 2004, which are hereby incorporated herein by reference in their entireties.

The indicia and the perimeter band or coating may be established onto the substrate surface, such as onto the rear surface of the front substrate via the same coating operation and with the same material. The indicia thus may be established without additional coating processes, since the indicia is established by using the same mask and coating that normally would be utilized for establishing the perimeter coating or band. The indicia is thus established at the substrate surface in a highly economical manner For example, a substrate may be provided and a mask (with an outer portion defining the perimeter band and with the indicia formed or cut through the mask) may be placed on the substrate surface (such as the rear surface of the front substrate). The desired metallic layer material may be disposed at the substrate surface so as to be established at the unmasked perimeter band and indicia regions via a single deposition process or the like. The perimeter band and the indicia thus may be readily established in an economical manner without multiple steps or processes and with the same material so that the indicia may substantially match the perimeter band in appearance or color or tint or discernibility.

Although shown and described as an electro-optic or electrochromic reflective element assembly or cell, the reflective element may comprise a single substrate with a reflective coating at its rear surface, without affecting the scope of the present invention. The indicia layer may be disposed or established at the rear of the reflective coating so as to be discernible through the substrate and reflective coating, or may be disposed or established between the reflective coating and the rear surface of the substrate, such as in a similar manner as described above. The mirror assembly may comprise a prismatic mirror assembly or other mirror having a single substrate reflective element, such as a mirror assembly utilizing aspects described in U.S. Pat. Nos. 6,318,870; 6,598,980; 5,327,288; 4,948,242; 4,826,289; 4,436,371; and 4,435,042; and PCT Application No. PCT/US04/015424, filed May 18, 2004 by Donnelly Corporation et al. for MIRROR ASSEMBLY FOR VEHICLE; and U.S. patent application Ser. No. 10/933,842, filed Sep. 3, 2004, now U.S. Pat. No. 7,249,860, which are hereby incorporated herein by reference in their entireties. Optionally, the prismatic reflective element may comprise a conventional prismatic or flat reflective element or prism, or may comprise a prismatic or flat reflective element of the types described in PCT Application No. PCT/US03/29776, filed Sep. 19, 2003 by Donnelly Corp. et al. for MIRROR REFLECTIVE ELEMENT ASSEMBLY; U.S. patent application Ser. No. 10/528,269, filed Mar. 17, 2005, now U.S. Pat. No. 7,274,501; Ser. No. 10/709,434, filed May 5, 2004 by Lynam for MIRROR REFLECTIVE ELEMENT, now U.S. Pat. No. 7,420,756; Ser. No. 10/933,842, filed Sep. 3, 2004 by Kulas et al, for INTERIOR REARVIEW MIRROR ASSEMBLY, now U.S. Pat. No. 7,249,860; Ser. No. 11/021,065, filed Dec. 23, 2004 by McCabe et al. for ELECTRO-OPTIC MIRROR CELL, now U.S. Pat. No. 7,255,451; and/or Ser. No. 10/993,302, filed Nov. 19, 2004 by Lynam for MIRROR REFLECTIVE ELEMENT FOR A VEHICLE, now U.S. Pat. No. 7,338,177, and/or PCT Application No. PCT/US2004/015424, filed May 18, 2004 by Donnelly Corp. et al. for MIRROR ASSEMBLY FOR VEHICLE, which are all hereby incorporated herein by reference in their entireties, without affecting the scope of the present invention. A variety of mirror accessories and constructions are known in the art, such as those disclosed in U.S. Pat. Nos. 5,555,136; 5,582,383; 5,680,263; 5,984,482; 6,227,675; 6,229,319; and 6,315,421 (the entire disclosures of which are hereby incorporated herein by reference in their entireties), that can benefit from the present invention. The subtle contrast indicia of the present invention may be established on any of a first, second, third or fourth surface of a laminate-type electro optic mirror cell or on any of a first or second surface of a single-substrate mirror element.

Optionally, a mirror reflective element may include a display element that emits or projects illumination through a pattern or indicia formed or established at the reflective element. For example, and with reference to FIG. 7, a mirror reflective element 210 for a rearview mirror assembly, such as for an interior or exterior rearview mirror assembly for a vehicle, includes a front substrate 212 and a rear substrate 214 spaced from front reflective element substrate 212, with an electrolyte or a cured monomer composition or electrochromic medium 216 sandwiched therebetween. The front substrate 212 has a transparent conductive coating or layer 218 (such as an ITO layer, such as a ½ wave ITO layer or a doped tin oxide layer or a doped zinc oxide layer or a light transmissive metal oxide/metal/metal oxide stack such as ITO/Ag/ITO or ZnAlO/Ag/ZnAlO or ZnAlO/Al/ZnAlO or ITO/Ag/ZnAlO or the like) disposed on its rear surface 212a (typically referred to as the second surface of the reflective element assembly) and the rear substrate 214 has a metallic conductive coating or layer 220 disposed on and substantially over its front surface 214a (typically referred to as the third surface of the reflective element assembly), such as described above. An epoxy seal material 222 or the like, is applied between the substrates to define the cavity for the electrochromic medium and to adhere the substrates together. In the illustrated embodiment, reflective element assembly 210 includes a reflective perimeter or border band 226 disposed or otherwise formed or established at the rear or second surface 212a of the front substrate 212, such as described above.

Reflective element 210 includes a display element 230 located rearward of the reflective element and directed at a pattern or indicia 232 formed or established at the rear surface 214b of rear substrate 214 (commonly referred to as the fourth surface of the reflective element). The pattern 232 may comprise the likes of a pattern of stars or dots, a pattern of bars or bar segments, portions of which may be connected or unconnected to each other, or other patterns or indicia or the like. The pattern or indicia 232 may comprise any suitable material (such as chromium, molybdenum or tungsten or the like) and may provide a decorative or light management effect that is viewable and discernible by the driver of the vehicle (or other person viewing the mirror) when the display element 230 (such as a light source, such as a light emitting diode (LED) or the like) is activated. For example, the pattern 232 may be formed to indicate that the turn signal of the subject vehicle is activated, such as for exterior mirror applications for indicating to a driver of an adjacent vehicle that the turn signal of the subject vehicle is activated. The indicia or pattern or structure established at the fourth surface of the reflective element thus may break up or direct light from the display element and/or may obscure or hide the presence of the display element from direct view by a person viewing the reflective element, so as to provide a desired appearance or direction of the light passing through the reflective element for viewing by the driver of the vehicle or other person within or outside of the vehicle. Optionally, the pattern may be thin film coating or a thick film coating, such as a printed pattern or painted pattern, such as a paint or ink or lacquer, or such as an adhesively applied or "stick-on" element or appliqué or the like. For example, the pattern or indicia may be printed or painted or coated or otherwise applied or disposed at a portion of the rear surface of the reflective element, or may be coated or applied or formed or otherwise established on a Mylar shape (or other substrate or the like) that may be adhered to the rear surface of the reflective element, thereby avoiding coating the entire rear surface or substantially the entire rear surface of the reflective element.

The third surface conductive coating 220 may comprise a transflective coating or layer or other suitable third surface reflective and conductive coatings. In the illustrated embodiment, the third surface conductive coating 220 comprises a layer of a transparent conductive material 220a (such as ITO or the like) over substantially the entire front surface 214a of the rear substrate 214, and a reflective coating or layer 220b (or multiple coatings or layers), such as a layer of chromium/ rhodium or chromium/ruthenium or molybdenum/chromium or an ITO/silver/ITO stack of layers or the like. A window or aperture 234 is formed or established in the reflective coating or coatings 220*b* (such as by laser ablating or etching the reflective coating 220*b* to remove the coating 220*b* at the window area [or by masking the metallic transflective coating 220*b* while it is being deposited onto the transparent conductive layer 220*a*], while maintaining the transparent conductive coating 220*a* at the window area).

Figure 7:
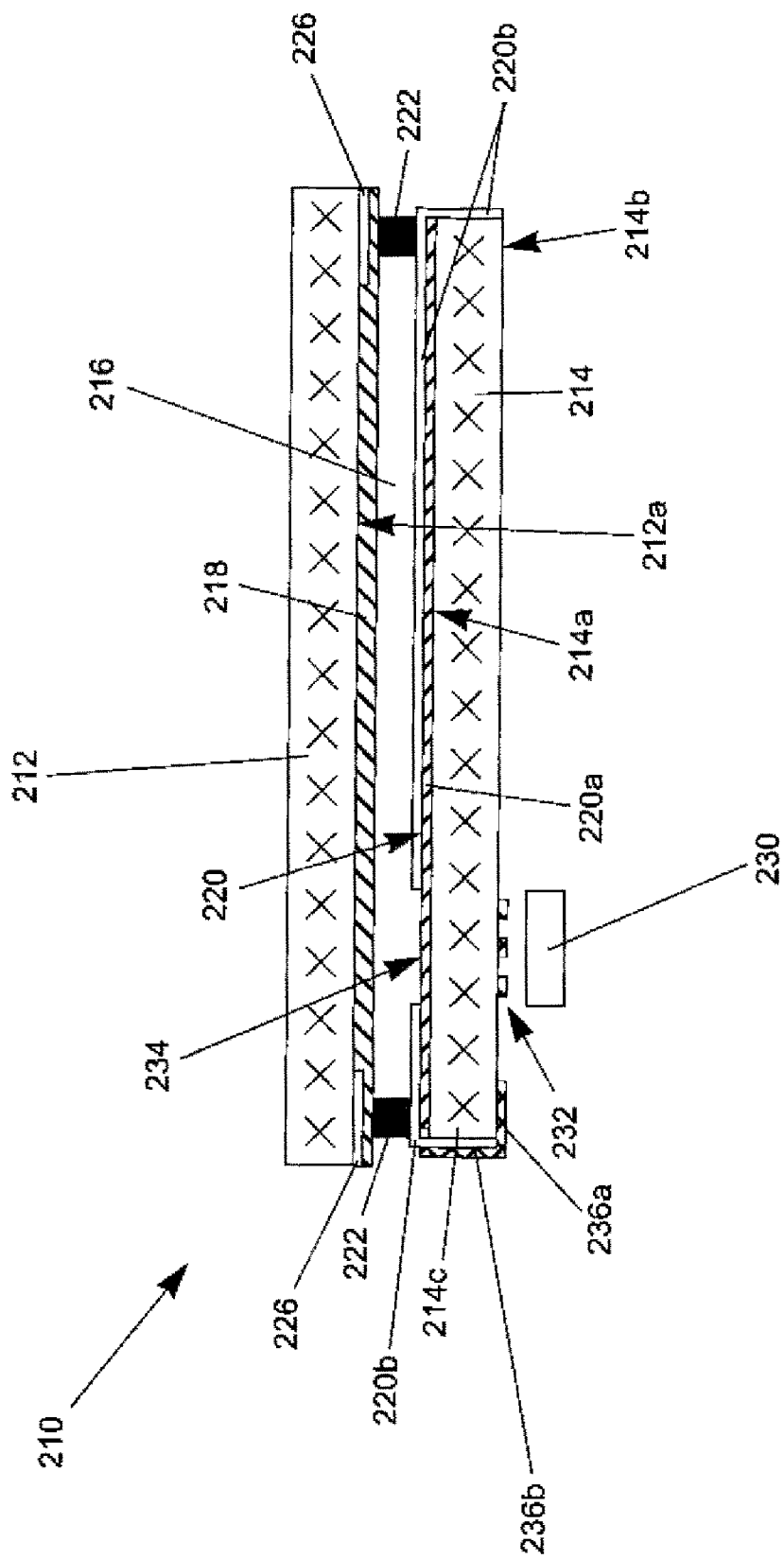
FIG. 7 is a sectional view of another reflective element of the present invention, with a display element at a patterned element at the fourth surface of the reflective element.

As shown in FIG. 7, the reflective element 210 may include a fourth surface conductor 236*a* and wrap-around coating 236*b* that wraps around and over a perimeter edge 214*c* of rear substrate 214 and over a third surface conductive wraparound coating 220*c* at the perimeter edge 214*c*, in order to provide electrical conductivity between the fourth surface conductor 236*a* and the third surface conductive and reflective coating 220*b*. Preferably, the indicia or pattern 232 is formed or established during the same coating process that establishes the fourth surface conductor 236*a* and wrap-around coating 236*b* and thus may comprise the same material as the fourth surface conductor 236*a* and wrap-around coating 236*b* (such as chromium or molybdenum or tungsten or Hastelloy or ruthenium or rhodium or other suitable conductive material). Alternately, the pattern or indicia 232 may comprise a different material and may be established via a different coating or forming or establishing process.

Figure 8:
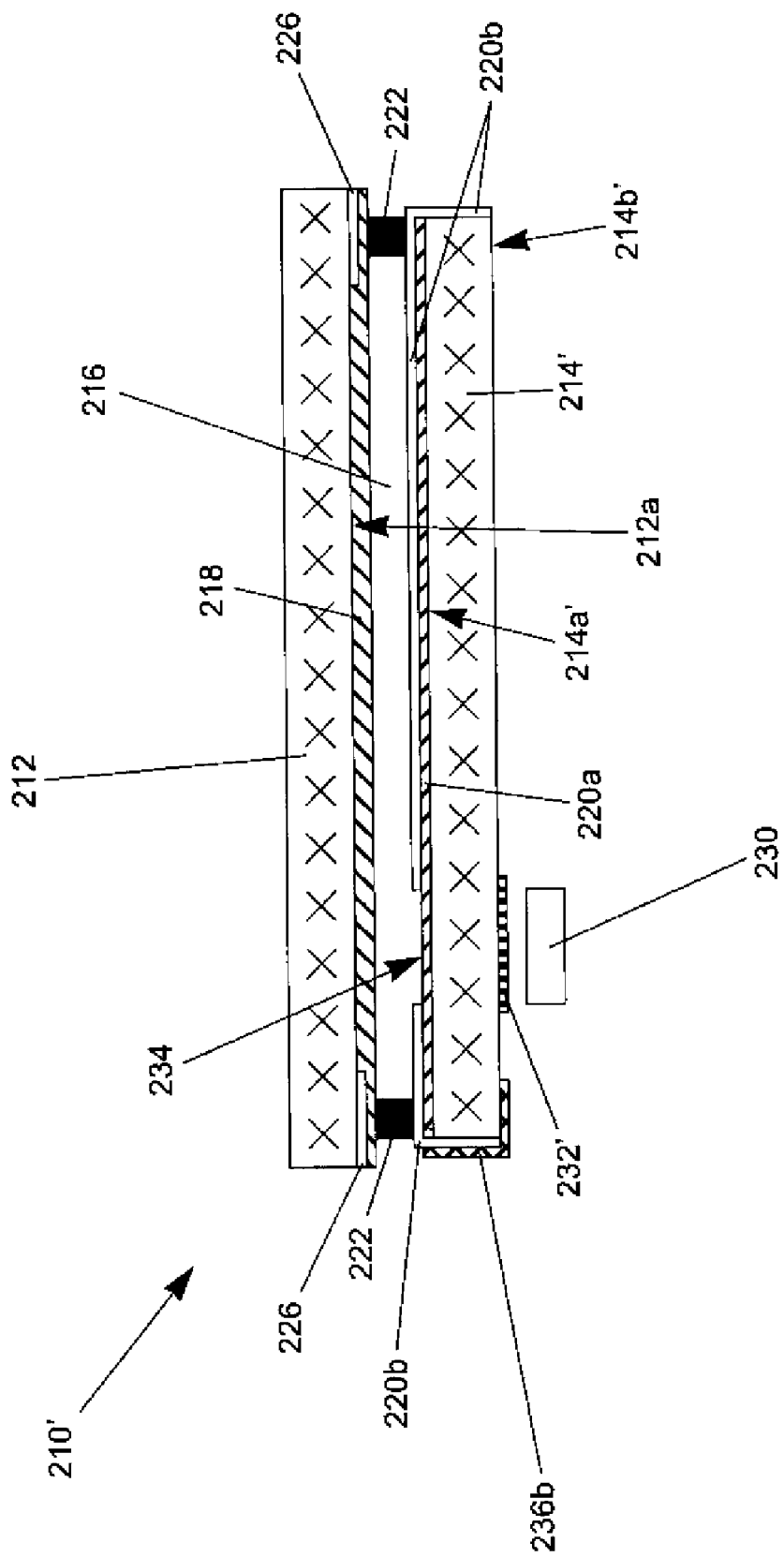
FIG. 8 is a sectional view of another reflective element of the present invention, with a display element at a transflective element at the fourth surface of the reflective element.

For example, and with reference to FIG. 8, the reflective element 210' may include a transflective coating or layer or appliqué 232' established at the fourth surface 214*b'* of the reflective element 214' and at the display element 230 and generally opposite the window area 234 at the third surface reflective coating 220*b*. The transflective coating 232' thus may provide a reflective appearance at the window area 234, while allowing light from display element 230 to pass through the transflective coating 232' and through the reflective element 210' for viewing by a person viewing the mirror reflective element assembly. The transparent conductive coating 220*a* may be disposed over substantially the entire front surface 214*a'* of rear substrate 214', while the third surface reflective coating or reflector 220*b* may have an aperture 234 established therein, such as described above.

Figure 9:
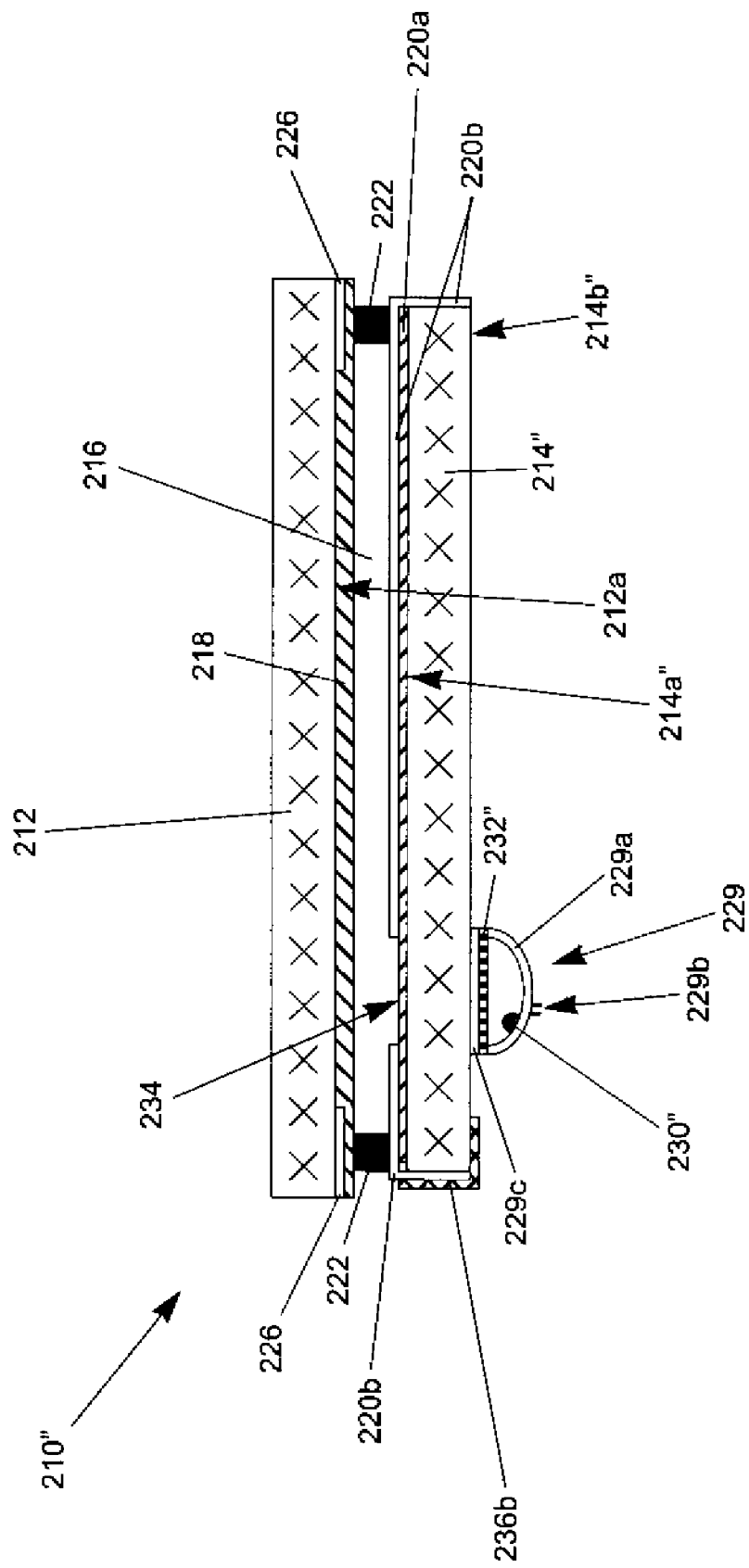
FIG. 9 is a sectional view of another reflective element of the present invention, with a display element module at the fourth surface of the reflective element.

Optionally, and with reference to FIG. 9, the reflective element 210" may include a display module 229 that may be attached or adhered or established at the rear surface 214*b"* of rear substrate 214" and generally opposite the window area 234 formed in the third surface reflective coating 220*b* (that is disposed on the transparent conductive layer 220*a* [such as a layer or coating of ITO or the like, such as a layer of 80 ohms/sq. ITO or the like] at the front surface 214*a"* of rear substrate 214"). The display module 229 includes a housing 229*a*, a light source or display element 230" (such as a light emitting diode or other suitable light source) and a transflective window element 232". The housing 229*a* may include electrical connectors 229*b* for electrically connecting the display module 229 to a power source or circuitry of the mirror assembly. Preferably, display module 229 may be attached to the rear surface 214*b"* of rear substrate 214" via an optical index matching adhesive 229*c*, such as an optical epoxy or optical acrylic (such as utilizing aspects of the reflective element described in U.S. patent application Ser. No. 10/993, 302, filed Nov. 19, 2004, now U.S. Pat. No. 7,338,177, which is hereby incorporated herein by reference in its entirety. The housing 229*a* may mount or receive the display element 230" such that the light is emitted at an angle through the transflective window and the reflective element (such as, for example, for a blind spot system indicator whose light output is directed into the vehicle cabin so as to be seen by the driver of the host vehicle) to enhance viewability and discernibility of the display (or to reduce the viewability or discernibility of the display, such as by directing the light output away from the cabin of the vehicle so that the light output is not readily discernible by the driver of the host vehicle) to a person viewing the reflective element at an angle. The housing 229*a* may have a polished or reflective or otherwise shaped or formed inner surface to enhance directing of the light toward and through the reflective element when the display module 229 is attached to the fourth surface of the reflective element. Optionally, the display module may include a pattern or indicia formed on a window element, which may or may not comprise a transflective window element, in order to provide the desired pattern or appearance of the display.

Reflective elements 210' and 210" of FIGS. 8 and 9 may be otherwise substantially similar to the reflective element 210 and other reflective elements described above, such that a detailed discussion of the reflective elements will not be repeated herein. The common or similar elements of the reflective elements are shown in FIGS. 8 and 9 with the same reference numbers as used in FIG. 7 with respect to reflective element 210.

Optionally, and with reference to FIGS. 10A-C, a mirror reflective element 250, such as an exterior mirror reflective element, includes a glass substrate 252, a transflective mirror reflector 254 and a display element, such as a turn signal indicator 256, at the rear of the substrate 252 and behind the transflective mirror reflector 254. The mirror reflective element may comprise a single glass substrate (such as glass substrate 252 shown in FIG. 10A), or may comprise an electro-optic reflective element assembly or cell, such as an electrochromic reflective element assembly or cell (such as electro-optic reflective element assembly 250' of FIG. 10D, discussed below, which includes a front substrate 252' and a rear substrate 253' with an electro-optic medium 255' disposed therebetween). In the illustrated embodiment, the transflective mirror reflector 254 is disposed at the rear surface of the substrate 252. However, the transflective mirror reflector may be disposed at the front surface of the substrate, without affecting the scope of the present invention. Turn signal indicator 256 is disposed at the rear of the reflective element substrate and transflective reflector and is operable to emit or project light therethrough for viewing by a person viewing the reflective element, and preferably for viewing by a person viewing the reflective element at an angle with respect to the reflective element.

Turn signal indicator 256 includes a transparent or translucent optical plastic block 258 and a light control film 260. As shown in FIG. 10A, optical plastic block 258 is disposed at the rear of the substrate 252 and at the rear of the transflective mirror reflector 254, with the light control film 260 disposed between optical plastic block 258 and transflective mirror reflector 254. Optical plastic block 258 may comprise a transparent plastic material, such as, for example, an acrylic or polycarbonate or polystyrene material or the like, formed such as by injection molding, casting or the like. Turn signal indicator 256 includes a plurality of illumination sources 262, such as light emitting diodes or the like, located at the rear of optical plastic block 258 and generally at or aligned with a plurality of apertures or passageways or pipeways 259 formed through block 258 and through which light passes without passing through the optical plastic material of the block itself. However, because of the physical laws of refraction, and because of the angles involved, some of the light generated and emitted by each individual light source or light sources 262 passes through the pipeways and some of the light enters the optical plastic material of the block and exits other points or areas of the block so that the block effectively glows.

Thus, when the light sources are activated, a person viewing the reflective element will see the five beams of relatively intense light that passes through the pipeways and a less intense but visibly appreciable illumination of the block itself around the light beams. In order to limit or substantially preclude light leaking or passing through the sidewalls of the block so as to be viewable through the reflective element outside of the block shape or footprint (such as an arrow or chevron or the like), the outer walls 258a of the block 258 may be specularly or diffusely reflective or absorbing (such as via a coating or surface finish or the like at the outer walls of the block). Optionally, the rest of the reflective element backing may have an opaque coating or paint or the like (such as an dark or otherwise substantially opaque coating or paint or tape or the like) disposed or applied over the rear of the reflective element except at the display region (the area at which the light control film is disposed).

Thus, light emitted by the light sources may pass through the pipeways in the block and through the block material itself at the rear of the reflective element, whereby the block provides a continuous shape (such as an arrow or chevron shape or footprint) around the series of illumination sources so as to provide an illuminated shape emanating from the block and through the mirror reflective element. Light control film 260 may comprise any suitable film and may function as microlouvers, so as to preferentially direct light that is received from one angle whereby the light is redirected or controlled to another direction. An example of a suitable light control film or material is disclosed in U.S. Pat. No. 5,481,409 (which is hereby incorporated herein by reference in its entirety), and may comprise a light control film manufactured by the 3M Company of Minn., such as the light control film commercially available under the trade name LCF-P (light control film—polycarbonate). Such a film comprises a thin plastic film enclosing a plurality of closely spaced, light black colored microlouvers. A preferred light control film is approximately 0.75 mm thick or thereabouts, and the angled microlouvers are spaced approximately 0.127 mm apart. The microlouvers may be in various angular positions to provide a particular viewing angle, such as from as narrow as about a 48 degree angle to as wide as about a 90 degree angle. Thus, the light control film controls or directs the light emitted by the illumination sources 262, including the light beams passing through the pipeways in the block as well as the other light emanating from the block material itself, in a desired or appropriate or predetermined angle with respect to the mirror substrate, and helps assure that the driver of the host vehicle is largely unaware or not bothered by actuation of the through-the-mirror reflector turn signal indicating light sources.

The likes of 3M Light Control Film comprises a thin plastic film containing closely spaced dark or black or light absorbing microlouvers. When used as described herein, the film simulates a tiny Venetian blind, wherein the microlouvers allow for controlled transmission of the light emitted by the indicator light sources (that are disposed behind the transflective mirror element) along the axis of the microlouvers so that the light is seen by drivers overtaking the host vehicle in a side-lane blind spot area but the line of sight from the driver of the host vehicle to the turn signal indicator's emitted light beam is substantially blocked by the microlouvers. Examples of light directing or regulating filters or baffle assemblies can be found in U.S. Pat. Nos. 4,906,085 and 5,313,335, the entire disclosures of which are hereby incorporated by reference herein.

Although shown and described as a turn signal indicator, and with the pipeways allowing the light beams to pass through the block at an outward angle and the light control film directing the light at an outward angle away from the vehicle (so as to be principally viewable by a driver of a vehicle approaching or overtaking the subject vehicle while being substantially not viewable or discernible by the driver of the subject vehicle), the display element may comprise other types of indicators or displays or illuminated indicia, such as a blind spot detector system alert or an information display or an approach light or the like. The angle of the pipeways and of the light control film may be selected depending on the particular application of the display element. For example, for a blind spot detector alert, the block and light control film may be constructed and arranged so as to direct light toward the driver of the subject vehicle. Optionally, a display element or display elements at a rearview mirror may have a block and light directing film that direct light at different angles so as to provide two different displays or indicators at the mirror. For example, the block and light directing film may direct illumination from one or more illumination sources or LEDs outward away from the vehicle for a turn signal indicator, and may direct illumination from one or more other illumination sources or LEDs inward or toward the vehicle for a blind spot detector alert, so that two distinct displays or display types are provided at the reflective element of the mirror assembly. The two distinct displays may be provided by a single display element or module or may be provided by separate display elements at the rear of the reflective element.

As shown in FIGS. 10A and 10C, pipeways 259 are formed with recesses 259a at the rear or back of the block 258 and angled pipeways 259b between the recesses 259a and the front of the block 258. The recesses 259a are configured to receive or partially receive the illumination sources 262, which may be mounted to or established on a printed circuit board 264 or the like disposed at or attached to the optical plastic block 258. Although shown in FIG. 10A as being loosely positioned at or received in the recesses 259a, it is desirable to have the illumination sources or LEDs snugly fit in or contacting, and preferably optically coupled to, the transparent block 258 so that the illumination from the illumination sources is emitted or projected into the block when the illumination sources are activated.

Optionally, and with reference to FIG. 10D, the mirror reflective element may comprise a transflective electro-optic mirror reflective element 250', which includes a glass front substrate 252', a glass rear substrate 253', and a display element or turn signal indicator 256' at the rear of the rear substrate 253'. The mirror reflective element 250' comprises an electro-optic, such as electrochromic, reflective element assembly or cell with an electro-optic medium 255' (such as electrochromic medium) disposed between the front and rear substrates 252', 253'. Rear substrate 253' includes a transflective mirror reflector 254' disposed at its front surface (the third surface of the reflective element assembly or cell), while front substrate 252' includes a transparent conductor 257' disposed at its rear surface (the second surface of the reflective element assembly or cell). The electro-optic medium 255' is disposed between the substrates and is in contact with the transparent conductor 257' and transflective mirror reflector 254' and contained between the substrates via a perimeter seal 261'. The electro-optic mirror construction may be of an offset construction or a flush or frameless construction or design, such as utilizing aspects of various mirror constructions and designs, such as described herein.

Turn signal indicator 256' is disposed at the rear of the rear substrate 253' and is operable to emit or project light therethrough for viewing by a person viewing the reflective element, and preferably for viewing by a person viewing the reflective element at an angle with respect to the reflective element, such as in a similar manner as described above. Although shown in FIG. 10D as having a third surface transflective mirror reflector 254', the transflective mirror reflector may be disposed at the rear of the rear substrate 253' (at the fourth surface of the reflective element assembly or cell), with the turn signal indicator 256' disposed at the fourth surface transflective mirror reflector at the rear surface of the rear substrate. As described above, the turn signal indicator 256' includes a transparent or translucent optical plastic block 258', a light control film 260', and a plurality of illumination sources 262 (preferably LEDs) on a printed circuit board 264. Turn signal indicator 256' may be substantially similar to turn signal indicator 256, described above, such that a detailed discussion of the turn signal indicators need not be repeated herein. The similar elements of the turn signal indicators not specifically addressed above with respect to turn signal indicator 250' are referenced with like numbers in FIGS. 10A and 10D.

When manufacturing a printed circuit board (PCB), it is least expensive and thus desirable to vertically or axially place the LEDs or chips. However, one could choose to have the LEDs put in and angled relative to the plane of the circuit board. The present invention allows for flat placement of the LEDs on the circuit board or substrate or chip, while still providing an angled direction of light emitted by the LEDs. The LEDs are thus substantially vertically oriented on the circuit board (so light emitted by the LEDs would be substantially vertical), but the emitted light is piped through the hollow tubes or pipeways in the block at or near the desired angle or direction for viewing of the lights by a person viewing the reflective element. Some of the emitted light would also leak into and through the transparent walls of the tubes and block to provide the substantially solid, continuous illumination or glow in the desired or appropriate shape around the illumination sources.

The angled pipeways 259b through optical plastic block 258, 258' are angled so that light from illumination sources 262 passes through the pipeways at an angle relative to the substrate 252 or substrates 252', 253', such as at an outward angle (such as for a turn signal indicator application) so as to direct or guide the light outward away from the side of the vehicle when the mirror reflective element is mounted at a vehicle, such as at a driver or passenger-side exterior rearview mirror of a vehicle, so as to be generally not viewable or discernible by the driver or occupant of the vehicle. For example, for a turn signal indicator application, the pipeways and/or light control film preferably function to angle the light emitted by the illumination sources outwardly away from the subject vehicle such that a driver of an overtaking vehicle would see the display, but the driver of the subject vehicle would not readily see or discern the display at the mirror reflective element. The pipeways and/or light control film may be constructed and/or arranged so as to be angled outward for a turn signal indicator (such as shown in FIGS. 10A and 10D and described above), but could be otherwise angled inward or downward for other applications (such as for a blind spot detector alert or an approach light or the like) or could have multiple angles, as discussed below.

Preferably, the optical plastic block 258, 258' is formed to be generally arrow-shaped with illumination sources 262 disposed therealong. As can be seen with reference to FIGS. 10A and 10D, the light control film 260, 260' may function to direct or guide the light generally along the same angle as the angled pipeways 259b (as shown in FIG. 10D), or the light control film may function to direct or guide the light at a different angle than the angle of the angled pipeways 259b (as shown in FIG. 10A), without affecting the scope of the present invention. By providing the angle of transmission of the light control film as a different angle as compared to the angle of the pipeways through the block, more of the light emitted from the illumination sources and passing through and along the pipeways may reflect back off of the light control film and/or transmit through the walls, and/or couple through the walls of the pipeways/tubes and into the block, thereby enhancing the illumination of the block when the illumination sources are activated and effectively creating a substantially solid illuminated block, such as a solid continuous illuminated chevron or arrow shape or indicia or the like, as opposed to a series of five or seven individual separated discontinuous light sources that are chevron shaped but not forming a solid continuous arrow.

Optionally, the optical plastic block may be formed without any passageways or pipeways or the plastic block may have pipeways extending only partially through the block depending on the desired appearance of the display element at the reflective element. Optionally, the illumination sources or LEDs may be located at different areas at the block, such as at a side of the block (and generally at or aligned with pipeways or at the sidewall of the block), depending on the particular application and desired appearance of the display element at the reflective element.

Figure 10E:
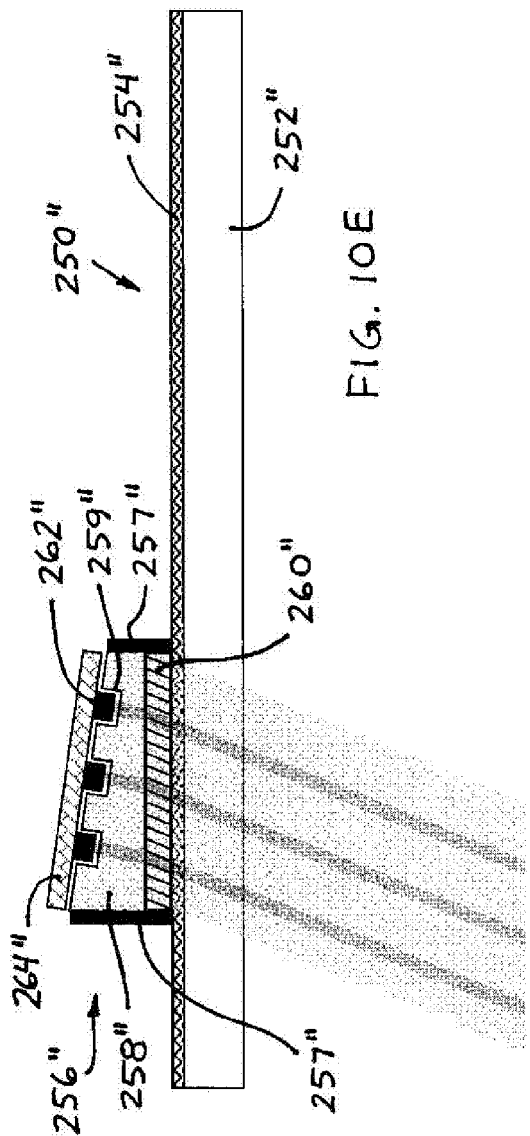
FIG. 10E is a sectional view of another reflective element of the present invention, with a display element at the rear of a non-electro-optic reflective element.
Figure 10F:
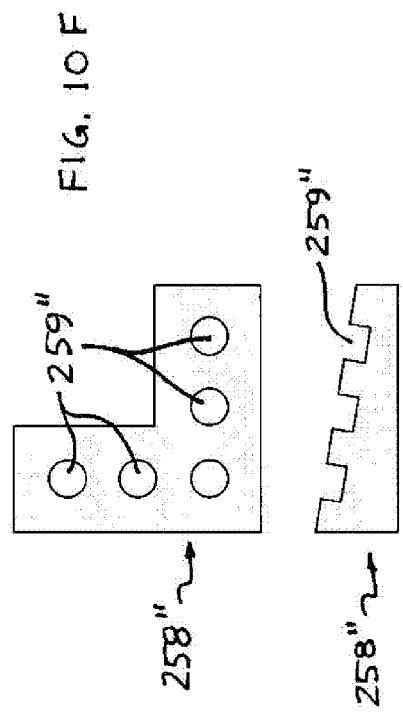
FIG. 10F is a plan view of the display element of FIG. 10E.
Figure 10G:
FIG. 10G is a sectional view of the display element of FIGS. 10E and 10F.

Optionally, and with reference to FIGS. 10E, 10F and 10G, a mirror reflective element 250", such as an exterior mirror reflective element, includes a glass or optical plastic substrate 252" (such as, for example, a substrate having a thickness of about 2 mm to about 2.5 mm or thereabouts), a transflective mirror reflector 254" (such as an aluminum-doped silicon or an ISI stack, such as an ITO/silver/ITO stack or the like) and a display element, such as a turn signal indicator 256", at the rear of the substrate 252" and behind the transflective mirror reflector 254". Turn signal indicator 256" includes a light transmitting optical plastic block 258" (that may be specularly light transmitting so as to be clear or that may be rendered diffusely light transmitting should diffuse light transmission be desired) and a light control film 260" (such as a light control film as described above). Turn signal indicator 256" includes a plurality of illumination sources 262", such as light emitting diodes or diode lasers or incandescent sources or the like, located at the rear of optical plastic block 258" and generally at or aligned with a plurality of recesses or receiving portions 259" for the light sources at an outer or rearward surface of block 258". The plurality of illumination sources 262 (preferably LEDs) may be established on a printed circuit board 264" or may be on a flexible polymeric substrate, such as an extruded plastic flat flexible cable with TPU, PVC or PBT insulation and flat copper connectors (such as is available from 3M Corporation of Minneapolis, Minn. as FFCe harnesses).

As shown in FIG. 10E, optical plastic block 258" is disposed at the rear of the substrate 252" and at the rear of the transflective mirror reflector 254", with the light control film 260" disposed between optical plastic block 258" and transflective mirror reflector 254". As also shown in FIG. 10E, turn signal indicator 256" may include a light absorbing wall or coating or material 257" established at and around block 258" to limit or substantially preclude light from passing through the sidewalls of block 258" to other areas of or at the rear of the reflective element. The light absorbing wall or coating or material 257" may comprise any suitable light absorbing material or layer or element, such as a dark or opaque wall or coating established around the block 258", such as a dark plastic or a black or dark-colored paint, or it may be a light reflecting but substantially non-light transmitting material or layer so that any stray light incident on such walls is reflected back into the body of block 258". The turn signal indicator 256" may be purchased by the mirror element sub-assembly manufacturer (such as from a low cost manufacturer such as in the Far East) and provided as a modular unit having the block and light control film within a light absorbing element/structure and with the printed circuit board and illumination sources at the rear surface of the block, and with any connectors/covers, etc., so that all the mirror element sub-assembly manufacturer need do is attach (either mechanically or adhesively, preferably with optical coupling) the bought-in or separately purchased/supplied module to the rear of the mirror element. One option is to use the likes of a PVB (polyvinyl butyral) laminating clear light transmitting film or a silicone laminating film or the like and to use the likes of an autoclave or a vacuum lamination technique (such as is described in U.S. provisional application Ser. No. 60/732,245, filed Nov. 1, 2005; and Ser. No. 60/759,992, filed Jan. 18, 2006, which are hereby incorporated herein by reference in their entireties) to optically attach the turn signal indicator module at the rear of the mirror element. Optionally, a light absorbing coating or material or opacifying material or coating may be established over the rear surface of the reflective element at locations other than where the turn signal indicator is located to limit or substantially preclude light transmission through the reflective element at regions surrounding the turn signal indicator. In such an application, an opacifying layer or element may be disposed at the rear of the reflective element and may have an opening or aperture or window established at the desired or appropriate location for the turn signal indicator to be located.

As shown in FIG. 10G, optical plastic block 258" is generally wedge-shaped or angled at its outer or rearward surface (the surface opposite from the rear of the reflective element and that has the recesses or receiving portions 259" for receiving the illumination sources 262" therein), so that the principal light axis from the illumination sources is directed at an angle relative to the rear surface of the reflective element. For example, the block may preferably be formed with its rear surface (at which the light sources mount) at an angle of about 2 degrees to about 12 degrees or thereabouts (more preferably, at an angle of about 3 degrees to about, 8 degrees or thereabouts and most preferably at an angle of about 3.5 degrees to about 5.5 degrees or thereabouts) relative to the front surface of the block (and hence to the rear surface of the mirror element to which the block engages/attaches). Note also that the front surface of the block may be convex contoured to generally match the local (concave) contour of the rear of the mirror element if it is a bent (such as a convex or an aspheric) exterior mirror element. Thus, when the reflective element is mounted at a vehicle as part of an exterior mirror assembly and is adjusted by a typical driver for rearward viewing at the side of the vehicle, the principal light axis of the illumination sources is directed away from the driver and principally into the overtaking area or adjacent lane or blind spot area so as to be readily viewable by a driver of an overtaking vehicle. Note that the angle for the rear surface of block 258" may generally match the light control angle of light control film 260", or may be somewhat different so that light control film 260" somewhat masks the presence of the individual light sources from view by an observer (whether lit or not lit). Note also that a heater pad (not shown) may be present and may have a chevron or other shaped cut out (or alternatively, a light transmitting, optionally light diffuser) portion that matches and juxtaposes where optical plastic block 258" is positioned to the rear of the reflective element.

Optionally, and with reference to FIG. 10H, the mirror reflective element may comprise transflective electro-optic mirror reflective element 250''', which includes a glass front substrate 252''', a glass rear substrate 253''', and a display element or turn signal indicator 256''' at the rear of the rear substrate 253'''. The mirror reflective element 250''' comprises an electro-optic, such as electrochromic, reflective element assembly or cell with an electro-optic medium 255''' (such as electrochromic medium) disposed between the front and rear substrates 252''', 253'''. Rear substrate 253''' includes a transflective mirror reflector 254''' (such as a thin transflective silver or silver-alloy or aluminum or aluminum-alloy or metal oxide/metal/metal oxide transflective coating stacks such as ITO/Ag/ITO or AZO/Ag/AZO) disposed at its front, inner-facing surface (the third surface of the reflective element assembly or cell), while front substrate 252''' includes a transparent conductor 257''' (such as ITO or AZO or doped tin oxide) disposed at its rear surface (the second surface of the reflective element assembly or cell). The electro-optic medium 255''' is disposed between the substrates and is in contact with the transparent conductor 257''' and transflective mirror reflector 254''' and contained between the substrates via a perimeter seal 261'''. The electro-optic mirror construction may be of an offset construction or a flush or frameless construction or design, such as utilizing aspects of various mirror constructions and designs, such as described herein. The mirror reflective element may include a heater pad disposed at its rear surface, and the heater pad may have an aperture or window or hole established at the display area for the turn signal indicator to project or emit light therethrough.

As shown in FIG. 10H, turn signal indicator 256''' includes an optical plastic block 258'''', light control film 260''', a plurality of illumination sources 262''' and a printed circuit board 264''', such as in a similar manner as described above. Mirror reflective element 250''' includes a molded backplate 270''' attached or adhered to the rear surface of rear substrate 253''' with actuator mounting elements 270a''' for mounting the mirror reflective element to a mirror actuator of the exterior mirror assembly, such as in a known manner. Backplate 270''' includes a receiving pocket 270b''' molded or formed at a desired or appropriate location at the backplate for receiving the turn signal indicator 256''' therein. As can be seen in FIG. 10H, the light control film 260''' and optical block 258''' may be received within pocket 270b''' with illumination sources 262''' and printed circuit board 264''' established at the outer or rearward surface of block 258'''. Preferably, the turn signal indicator 256''' may be provided as a modular unit (including the block, light control film, illumination sources and printed circuit board assembled together into a unitary module) and inserted into or received in the pocket 270b''' at the rear of the mirror reflective element (and held therein, such as mechanically or adhesively). However, rather than being provided as a preassembled module, the block, light control film and illumination sources (preferably LEDs) on the printed circuit board may be provided individually and assembled to the mirror reflector individually. Optionally, the mirror reflective element may include a diffuser or diffusing window or layer and/or the block itself may be diffusing or slightly diffusing of the light passing therethrough.

The backplate 270''' thus has a pocket 270b''' surrounding an aperture formed through the backplate and receiving the turn signal indicator 256''' therein. The aperture and pocket thus may be arrow-shaped or chevron-shaped and may receive a correspondingly shaped or formed turn signal indicator. The pocket 270b''' is defined by walls extending rearward or outward from the backplate to substantially encase or surround the optical block 258''' when inserted into the pocket 270b'''.

Thus, the backplate may be attached or adhered to the rear surface of the reflective element and the turn signal indicator may be inserted into or slid into the pocket. The turn signal indicator desirably may be provided as a modular unit (including the block, light control film, printed circuit board and illumination sources) that is readily inserted into the pocket and electrically connected to electrical circuitry of the reflective element and/or mirror assembly. The turn signal indicator module thus may be purchased and provided as a separate modular unit that is readily installed or attached at the rear of the reflective element, such as at the mirror manufacturer's assembly facility or plant.

Optionally, the light control film may be diffusing or partially diffusing, or the turn signal indicator may include a separate diffuser or the block itself may comprise a diffusing material. Optionally, a diffuser is not included, and optionally, the turn signal indicator may not include the light control film. The turn signal indicator may be mechanically attached or secured at the pocket and may include or provide optical coupling of the block and/or light control film with the rear surface of the reflective element, such as via an optical adhesive or the like. Optionally, the individual elements of the turn signal indicator may be inserted into or established in the pocket to assemble the turn signal indicator in the pocket.

Optical plastic blocks 258''', 258''' may be otherwise substantially similar to blocks 258, 258', described above, such that a detailed description of the optical blocks need not be repeated herein. Similar to optical plastic block 258, described above, optical plastic blocks 258'', 258''' may comprise a transparent plastic material, such as, for example, an acrylic or polycarbonate or polystyrene material or the like, formed such as by injection molding, casting or the like. Also, and similar to the optical blocks described above, optical block 258'', 258''' may be generally arrow-shaped to provide a substantially solid illuminated arrow at the reflective element when the illumination sources are activated. As can be seen in FIGS. 10E, 10G and 10H, blocks 258'', 258''' may be wedge-shaped, and may have narrower or thinner outer leg portions as compared to a thicker center or arrow head portion. Optionally, and as can be seen in FIGS. 10E, 10G and 10H, the illumination sources may be located at recesses 259'', 259''', without pipeways formed through the block as described above. The block may be substantially transparent and may diffuse the light passing therethrough.

Note that one advantage of the embodiments above is that light sources such as LEDs can be axially mounted onto PCBs and any angling of their orientation to the rear of the reflective element is via the angling of the rear surface of the optical block. This facilitates economy of manufacture as the PCB manufacturer may use automatic chip placement machines to axially (i.e. generally perpendicular to the surface of the PCB substrate) insert the likes of surface-mount LEDs (and without the need to insert at an angle or to angle the LEDs in a post-insertion operation). Also, though illustrated as a turn signal indicator, the advantages of the above embodiments may also be achieved with a blind spot detection system indicator (and where the angling of the rear surface of the optical block and of the light control film is towards the driver/cabin of the host vehicle when the reflective element is mounted in the exterior mirror assembly of the host vehicle). Also, a combined turn signal/blind spot indicator may be formed with portions of the optical block (and of the optical control film, if present) angled away from the cabin of the host vehicle for the turn signal function and towards the cabin of the host vehicle for the blind spot detection indicator function. Also, such angling of the rear surface of the optical block is also applicable should light transmitting channels or tubes be created at least partially through the block, such as shown in FIGS. 10A, 10C and 10D (and note that should such channels or tubes be present, the rest of the block may be formed of a light absorbing material, such as of a dark-pigmented polymeric material or of a light diffusing material).

Also, note that optionally, the optical control film may be disposed at the rear surface of the optical block (rather than disposed between the block 258, 258', 258'' or 258''' and the rear surface of the mirror reflective element such as shown in FIGS. 10A, 10D, 10E and 10H), while remaining within the spirit and scope of the indicator of the present invention. For example, and as shown in FIG. 10I, the turn signal indicator 256'''' includes an optical plastic block 258'''', with a light control film 260'''' established (such as via adhering or otherwise attaching) at its rear surface, and with a plurality of illumination sources 262'''' and a printed circuit board 264'''' at the rear of the block and film. Optionally, and desirably, the indicator 256'''' includes an opaque wall or tape or material 257'''' at and around the optical block 258'''', such as described above. As can be seen in FIG. 10I, the light control film 260'''' has its micro louvers 260a'''' at about zero degrees (i.e., generally perpendicular to the plane of the light control film) so as to direct the principle beam axis 261'''' of the light emitted by the illumination sources at the desired or appropriate angle established by the angling of the rear surface of the block relative to its front surface and so have the light beam emitted by the light sources pass through the block 258'''' and through the substrate 252'''' of the reflective element 250'''' to exit at an angle. Because the light control film 260'''' is established at the rear surface of the block 258'''', the block may not include recesses to receive the light sources, but optionally, the light control film may be laminated (at an angle) between a lower block portion (that has an angled rear face) and an upper block portion, and with such recesses provided in the upper block portion. The block can optionally include light transmitting pipeways therethrough (such as pipeways described above with respect to blocks 258, 258', 258'', 258''').

As shown in FIG. 10I, the rear surface of the block may be angled relative to the forward surface of the block at the rear of the reflective element, and may be substantially flat or planar, with the light control film established thereat, and with the illumination sources and printed circuit board located at the rear of the light control film so as to direct or emit illumination through the light control film and through the transparent block and further through the transflective reflective element at an angle set by the slanted rear face of the block. The angle of the rear surface of the block and the angle of the micro louvers thus may be selected to provide the desired angle of the principle beam axis of the light emitted by the indicator. However, and as shown in FIG. 10I, it is desirable in such a configuration to use light control film with zero degree louvers. Turn signal indicator 256'''' may be otherwise substantially similar to the turn signal indicators 256, 256', 256'', 256''' described above, such that a detailed discussion of the turn signal indicators need not be repeated herein. Although shown in FIG. 10I as being established at a rear of a substrate 252'''' of a non-electro-optic transflective reflective element, the indicator 256'''' (with the light control film established at the rear of the optical block) may be implemented at the rear of an electro-optic reflective element, such as described above with respect to indicators 256' and 256''', and the indicator may be received or inserted into a pocket at a backplate or the like of the reflective element).

Placement of the light control film on the angled rear surface of the optical block is advantageous when the light control film (such as 3M's Vikuiti™ ALCF-P or LCF-P) is used where the louver angle is zero degrees and where on-axis vertically incident light from the light sources is highly transmitted but where off-axis light is cut-off by the embedded micro louvers. Such zero degree louvered light control film is used for privacy filters for laptop computer screens and ATM screens, and so is economically available. By being able to purchase and use zero angle louvered light control film as shown in FIG. 10I, but by using the likes of an angled optical block to support the light control film at an angle in front of the light sources that are similarly angled and supported, economical assembly can be enhanced [or, alternatively, by using a mechanical support to mutually support and angle the light control film/light sources relative to the plane of the rear of the mirror reflective element, so that light emitted by the light sources is generally aligned with or on-axis with the light transmission axis between the louvers, and so that the light beam passed through the light control film impinges on the mirror reflective element and passes therethrough with its principal beam axis directed away (for a turn signal indicator) from the vehicle body side and away from direct view by a driver of the host vehicle to which the exterior mirror reflective element is attached].

Economy of assembly and supply can be achieved by utilizing the embodiment such as shown in FIG. 10H. The combination of a mirror backplate that is adapted to receive a turn signal indicator module (or a blind spot indicator module or an approach light module) in combination with a transflective mirror reflective element can optimize the cost for the mirror assembly supplier as follows. The mirror assembly supplier (which may be the Tier 1 supplier to the automaker) can make or procure the transflective mirror element. Separately, the mirror assembly supplier can make or procure the mirror backplate. Separately, the mirror assembly supplier can make or procure the turn signal module (or its sub-components). Then, the mirror assembly supplier (or a sub-assembly supplier thereto) can take the transflective mirror element and attach a heater pad to its rear (with an aperture or a light transmitting window, preferably a light diffuser and transmitter, created therein that matches, for example, the chevron shape and dimensions of the turn signal indicator module that will be used). Then the backplate (that is modified to receive the turn signal module such as is shown in FIG. 10H) can be attached (such as via a tape adhesive or the like). Then the turn signal indicator module may be inserted into the pocket at the backplate, and any cap or cover may be attached and the assembly of the mirror element with indicator feature is achieved.

There are several benefits to using a transflective mirror reflector for such a through-the-mirror-reflective element turn signal feature (or other indication or lighting feature). Currently, the likes of a General Motors GMT 800 driver-side exterior mirror assembly is equipped with an electrochromic mirror element that has a signal light area formed in its reflective coating by removing a portion of the reflective coating and aligning the signal light with this signal light area. The portion removed is laser ablated to leave lines devoid of reflective material separated by lines of the reflective material in a non-transflective mirror reflector that is deposited onto the third surface of the electrochromic mirror element used (such as is disclosed in U.S. Pat. No. 6,111,683, the entire disclosure of which is hereby incorporated by reference herein).

The embodiment illustrated in FIG. 10H and disclosed herein has several advantages and improvement over these existing through-the-mirror-reflective element turn signal electrochromic mirrors. For example, use of a third surface transflective mirror reflector instead of a third surface mirror reflector where holes/apertures/jail-bar lines/ablations/micro-ablations or the like are created has the benefit that there are no consumer viewable openings such as holes/apertures/jail-bar lines/ablations/micro-ablations present in the mirror reflector's coating(s). Thus, should the automaker or consumer elect not to use the turn signal feature, the turn signal module may be left out but the common backplate [where the receiving structure for the turn signal module/components can be economically created during the injection molding of the backplate from a polymeric resin (such as ABS or PC/ABS or the like)] and heater pad may still be used. This is because with a transflective reflector, there are no visible holes or ablations or lines of the like visible to the consumer that betray that there is now no turn signal indicator present. Thus, use of a third surface transflective mirror reflector in such an electrochromic through-the-mirror-reflective element turn signal feature allows the Tier 1 mirror maker and/or the automaker elect to supply a base or turn-signal featured electrochromic mirror assembly using a common assembly process.

As a further advantage, use of a third surface transflective mirror reflector has the advantage that there is no need to align the light sources (such as the 5 or 7 LEDs in a turn signal chevron) of the turn signal unit/module with holes or apertures in the mirror reflector. And by having the receiving structure/elements for the turn signal module be molded into the plastic backplate itself, the turn signal alignment and positioning to the rear of the mirror element is accurately established in the precise attachment of the backplate to the rear of the minor element (an operation that the mirror element sub-assembly maker has to do in any event so that the minor sub-assembly correctly receives the mirror element-positioning actuator).

Thus, and in accordance with embodiments above, a transparent or substantially transparent optical plastic block may be formed in the general shape of an arrow so that the arrow is viewable and discernible by a person viewing the reflective element. The light emitted through the pipeways in the block and through the light control film may be viewed (such as at or near the angle of the directed or guided light) as relatively intense points of light or light sources when the illumination sources are activated, while the transparent block (preferably in the shape of an arrow or other suitable shape or form) will be viewable as a solid shape (such as an arrow shape or the like) around the light sources to provide an image of the arrow and not just the individual points of light. When the illumination sources are activated, light emitted by the illumination sources is guided through and along the angled pipeways through the block and may be refracted or guided or controlled by light control film so as to be directed in a desired direction, such as outwardly away from the vehicle. Thus, the illumination sources and the illuminated block are readily viewable by a driver of another vehicle adjacent or approaching the subject vehicle, while the illumination is not readily viewable or discernible by the driver of the subject vehicle.

The transflective minor reflector (such as at the rear of the single substrate or at the front surface of the rear substrate of the electro-optic reflective element assembly or cell) may comprise any suitable transflective minor reflector or coating or layer or layers, such as those described herein. For example, and in a preferred embodiment, the transflective mirror reflector may comprise a silicon material or a doped silicon material or the like, preferably having a refractive index (as measured at the sodium D line) of at least about 3 or thereabouts. For example, good results have been achieved by sputtering from a silicon-aluminum sputtering target (e.g. 95%/5% Si:Al) or the like. In such an embodiment, a sputter coating of a physical thickness (sputtered in an argon atmosphere) of about 200 to 300 angstroms or thereabouts exhibits a first surface reflectivity of about 60-65% R photopic reflectivity (as measured per SAE J964a), and a second surface reflectivity of about 50-55% R, and a photopic transmission of around 18 to 20% T or thereabouts. The coating may be deposited or disposed on a flat or substantially flat substrate (and optionally, subsequently bent in a glass bender thereafter), or may be deposited or disposed on a curved substrate, such as a curved substrate of the type shown in FIG. 14 and discussed below. Other transflective mirror reflectors may be implemented depending on the particular application. Optionally, the substrate may include a reflective perimeter band around its perimeter, such as described below with respect to FIG. 14, so that a single substrate mirror reflective element may be used at an opposite side of the vehicle (such as the passenger-side of the vehicle) in conjunction with an electro-optic reflective element assembly implemented at the other side of the vehicle (such as the driver-side of the vehicle) that may include such a perimeter reflective band to provide a frameless reflective element, such as described herein.

Figure 11:
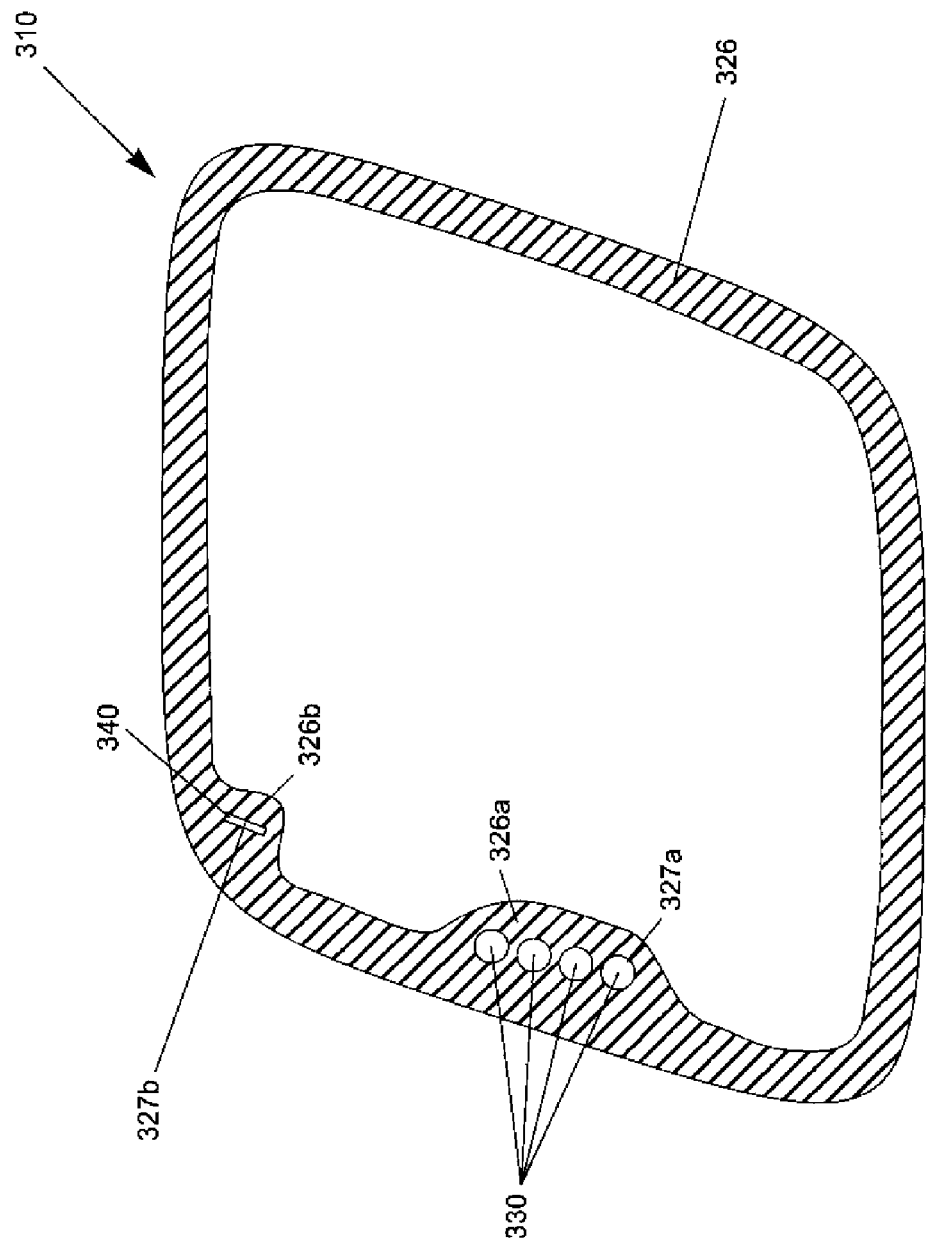
FIG. 11 is a plan view of another reflective element of the present invention.

Optionally, and particularly for exterior mirror applications, the reflective element may include a broader perimeter band at the area or region where a display element is located. For example, and with reference to FIG. 11, an exterior mirror reflective element 310 may include a perimeter band 326 around the perimeter or border of the reflective element. The perimeter band 326 has a broader band portion 326a along a perimeter portion of the reflective element 310 and along an area that has one or more display elements 330. The display elements 330 may comprise illumination sources or light sources, such as light emitting diodes (LEDs) or the like, and may be positioned behind the rear surface of the reflective element and directed to emit illumination through the reflective element and through the broader band portion 326a of perimeter band 326. The broader band portion 326a may have one or more windows or ports 327a formed or established through the band portion and, generally at or aligned with the display elements 330, or the perimeter border band 326 (or at least the broader band portion 326a of perimeter band 326) may be passively transflective (such as a band formed or established by a layer of a silicon material or the like) to allow light from the display element or elements 330 to pass through the reflective element and the perimeter band (optionally, the perimeter band may have a higher transmissivity characteristic than the electro-optic area of the reflective element to enhance viewability and discernibility of the light emitted by the display elements) so as to be viewable by a person viewing the reflective element. For example, and such as is described in U.S. Pat. No. 6,065,840, which is hereby incorporated herein by reference in its entirety, a sputtered silicon thin film (with a physical thickness in a range of about 300 angstroms to about 450 angstroms) can have a photopic reflectivity greater than at least about 50 percent, and more preferably greater than at least about 55 percent of light incident thereon, and having a transmission value greater than at least about 15 percent, and more preferably greater than at least about 20 percent of light incident thereon.

Optionally, the reflective element 310 may include a photo sensor 340 for sensing light at the reflective element. In the illustrated embodiment, the photo sensor 340 is located at and behind the perimeter band 326, and at a broader region 326b of perimeter band 326. The photo sensor 340 may be directed or angled or oriented so as to be facing generally upward or skyward to detect light above the reflective element. The perimeter band portion 326b may have a window or port 327b formed therethrough to allow light to pass through the perimeter band portion 326b to the photo sensor 340.

The reflective element 310 may comprises a transflective or display on demand type of reflective element with a perimeter seal around the perimeter of the reflective element and, thus, around the perimeter of the electro-optic area of the mirror reflective element. The perimeter band may be disposed (such as on the second surface of the front substrate as described above) around the perimeter of the substrate so as to conceal the perimeter seal (such as described in PCT Application No. PCT/US03/29776, filed Sep. 19, 2003 by Donnelly Corp. et al. for ELECTROCHROMIC MIRROR ASSEMBLY; and/or PCT Application No. PCT/US03/35381, filed Nov. 5, 2003 by Donnelly Corp. et al. for ELECTRO-OPTIC REFLECTIVE ELEMENT ASSEMBLY; and/or U.S. patent application Ser. No. 11/021,065, filed Dec. 23, 2004 by McCabe et al. for ELECTRO-OPTIC MIRROR CELL, now U.S. Pat. No. 7,255,451; Ser. No. 10/528,269, filed Mar. 17, 2005, now U.S. Pat. No. 7,274,501; Ser. No. 10/533,762, filed May 4, 2005, now U.S. Pat. No. 7,184,190; Ser. No. 11/226,628, filed Sep. 14, 2005; and/or Ser. No. 11/021,065, filed Dec. 23, 2004 by McCabe et al. for ELECTRO-OPTIC MIRROR CELL, now U.S. Pat. No. 7,255,451; and/or U.S. provisional application Ser. No. 60/692,113, filed Jun. 20, 2005; Ser. No. 60/677,990, filed May 5, 2005; Ser. No. 60/653,787, filed Feb. 17, 2005; Ser. No. 60/642,227, filed Jan. 7, 2005; Ser. No. 60/638,250, filed Dec. 21, 2004; Ser. No. 60/624,091, filed Nov. 1, 2004, and Ser. No. 60/609,642, filed Sep. 14, 2004, which are hereby incorporated herein by reference in their entireties). The display elements 330 and/or photo sensor 340 may be positioned outboard of the perimeter seal so that they are not located in the electro-optic area of the reflective element. Because the display elements and/or photo sensor are positioned at the perimeter band area, they are not invasive of the electro-optic function of the reflective element. Thus, the display elements may be positioned at the reflective element for emitting illumination through the reflective element, without the extra complexities of the electro-optic or electrochromic transflective function. Also, the photo sensor may be positioned at the reflective element for receiving light external to the reflective element, without having to form a window or aperture in the reflective coatings of the transflective reflective element.

Figure 12:
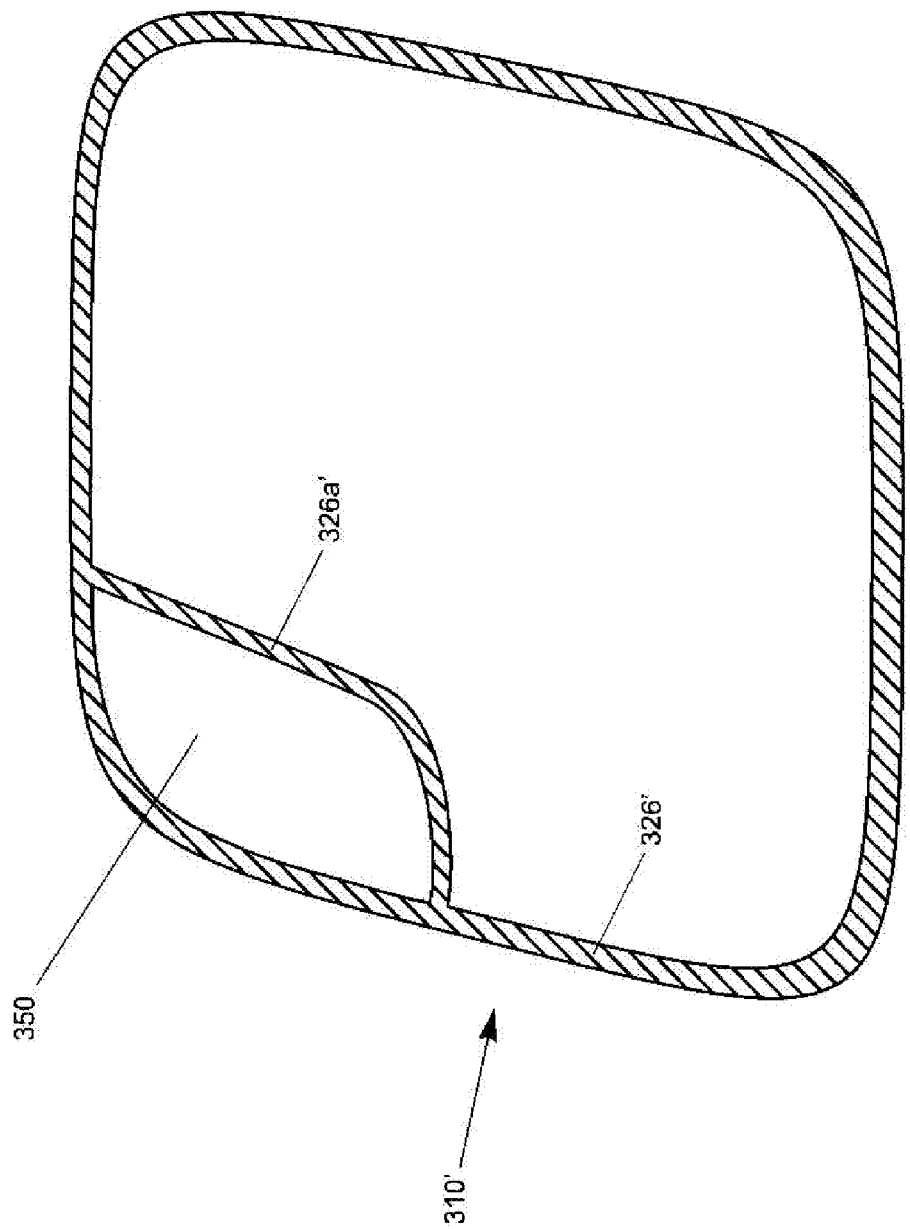
FIG. 12 is a plan view of another reflective element of the present invention, with a wide angle mirror portion.
Figure 13:
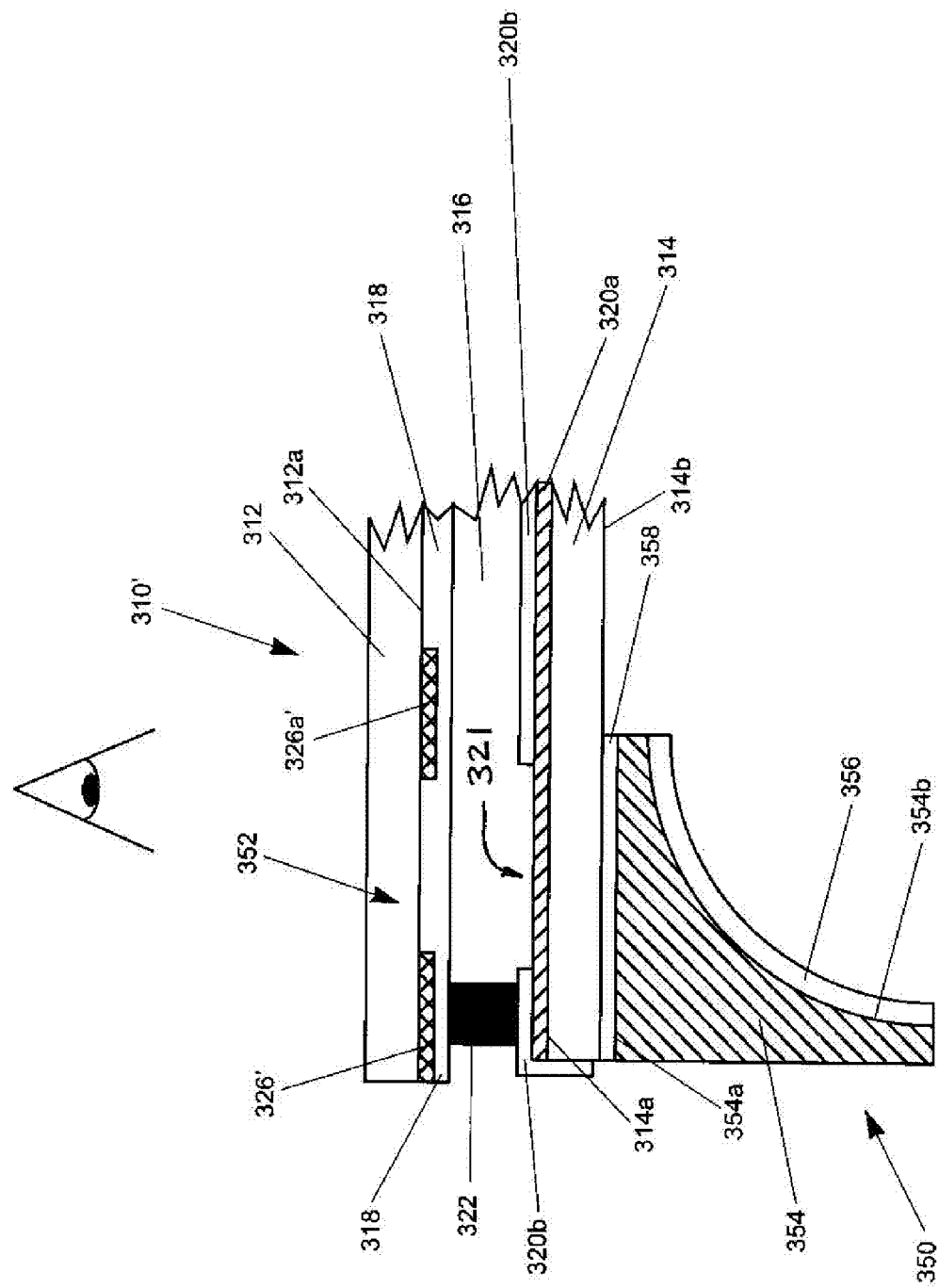
FIG. 13 is a sectional view of the wide angle mirror portion of the reflective element of FIG. 12.

Optionally, and with reference to FIGS. 12 and 13, a mirror reflective element 310' may include a wide angle or auxiliary mirror or reflector 350 at a perimeter region or corner region of the reflective element to provide a rearward wide angle view to the driver of the vehicle. The wide angle reflector may be established at the reflective element and behind the fourth surface of the reflective element, such as by utilizing aspects of the reflective elements described in U.S. Pat. No. 6,315,419 and/or U.S. patent publications, Pub. No. US 2002/0105741, published Aug. 8, 2002; and/or US 2003/0117731, published Jun. 26, 2003; and/or International Pub. No. WO 01/81956, published Nov. 1, 2001, which are all hereby incorporated herein by reference in their entireties. The wide angle reflector may be positioned at a perimeter region of the reflective element so as to provide a wide angle viewing area for viewing the blind spot area at the side and rearward of the vehicle, while the primary or central region of the reflective element provides a generally planar reflective surface for viewing rearward and sideward of the vehicle mirror.

The reflective element 310' includes a perimeter band 326' around the perimeter of the reflective element and a perimeter band portion 326a' inboard of a wide angle area or region 352 at the reflective element and around an inboard perimeter region of the wide angle reflector 350. The perimeter band thus separates and/or demarcates the wide angle reflective portion from the generally planar reflective portion of the reflective element, and may conceal or hide the edges of the wide angle reflector. As can be seen with reference to FIG. 13, the perimeter band 326' is disposed on the second surface 312a of the front substrate 312 and generally at or along the perimeter seal 322 of the reflective element 310', while the perimeter band portion 326a' is disposed on the second surface 312a and inboard of the seal 322 to generally outline/demarcate an inner perimeter of the wide angle reflector 350. The perimeter band portion 326a' may have generally the same width as the perimeter band 326', or may have a reduced width or narrow width to reduce the effect on the viewing area of the reflective element.

Wide angle reflector 350 is positioned at the rear (or fourth) surface 314b of rear substrate 314 and may be adhered to rear surface 314b and generally behind the wide angle area 352 defined by the perimeter band 326' and perimeter band portion 326a'. In the illustrated embodiment, wide angle reflector 350 comprises a substantially clear, transparent optical plastic member 354 (such as, for example, an acrylic or polycarbonate or COC or CR39 or the like) and a reflective coating or layer or adhesive or film 356. Optical plastic member 354 has a substantially flat mating surface 354a and a curved face 354b opposite to the mating face 354a. Reflective film 356 may be adhered or otherwise attached to curved face 354b so as to establish a curved reflective surface 356a. Wide angle reflector 350 may be adhered to or otherwise attached to rear surface 314b of rear substrate 314, such as via an optical adhesive 358, such as an optical epoxy or acrylic material. The optical adhesive may be substantially optically matched to the reflective element substrates, so that the refractive index of the optical adhesive is substantially similar to the refractive index of the glass substrate (such as at about 1.52 refractive index), such as by utilizing aspects of the reflective element described in U.S. patent application Ser. No. 10/993,302, filed Nov. 19, 2004, now U.S. Pat. No. 7,338,177, which is hereby incorporated herein by reference in its entirety.

Thus, the wide angle reflector may be positioned at the rear surface of the reflective element and may reflect light from a wide angle view to the driver of the vehicle to assist the driver in viewing the blind spot area at the side of the vehicle. The reflective element may comprise an electro-optic reflective element with a transparent conductive coating or layer 318 at the rear surface 312a of the front substrate 312 and a third surface reflective coating or layer (or layers) 320b at the front surface 314a of the rear substrate 314, and with an electro-optic or electrochromic medium 316 disposed therebetween. As can be seen in FIG. 13, the third surface reflective coating or layer 320b (such as a layer of chromium or ruthenium or rhodium or ruthenium/chromium or rhodium/chromium or other suitable layer or coating) may be removed or not established at the wide angle reflector area, and a transparent conductive coating or layer 320a may be disposed over the third surface, including the wide angle reflector area, so that the electro-optic feature may function in that area. A window or port or non-reflective region 321 thus may be formed in the third surface reflector (so as to provide a window or area that is substantially devoid of the reflective coating or coatings) to enhance the light transmissivity therethrough (such as by ablating or masking the area to remove or not establish the reflective coating or coatings at the wide angle reflector area). The front surface of the rear substrate thus may have the transparent conductive coating 320a over its entire surface, with the wide angle reflector area being masked during the deposition or coating of the third surface reflective coating or coatings so that the reflective coatings are not deposited or established at the wide angle viewing area (or the reflective coatings may be removed or ablated after the coating process). The wide angle reflector thus may be disposed behind the electro-optic medium so as to provide the wide angle reflective field of view through the electro-optic medium.

Optionally, the perimeter seal may be disposed around the perimeter of the reflective element and along the wide angle perimeter band portion 326a' so that the wide angle area 352 is devoid of the electro-optic medium (and may be devoid of the third surface reflector layers or coatings in that area as well) to enhance light transmissivity through the reflective element in the wide angle viewing area. In such an application, the transparent conductive coating may also be removed from the wide angle reflector area, such that the coatings or layers in that area may be readily removed or not established, such as by laser ablating or masking or the like.

Figure 14:
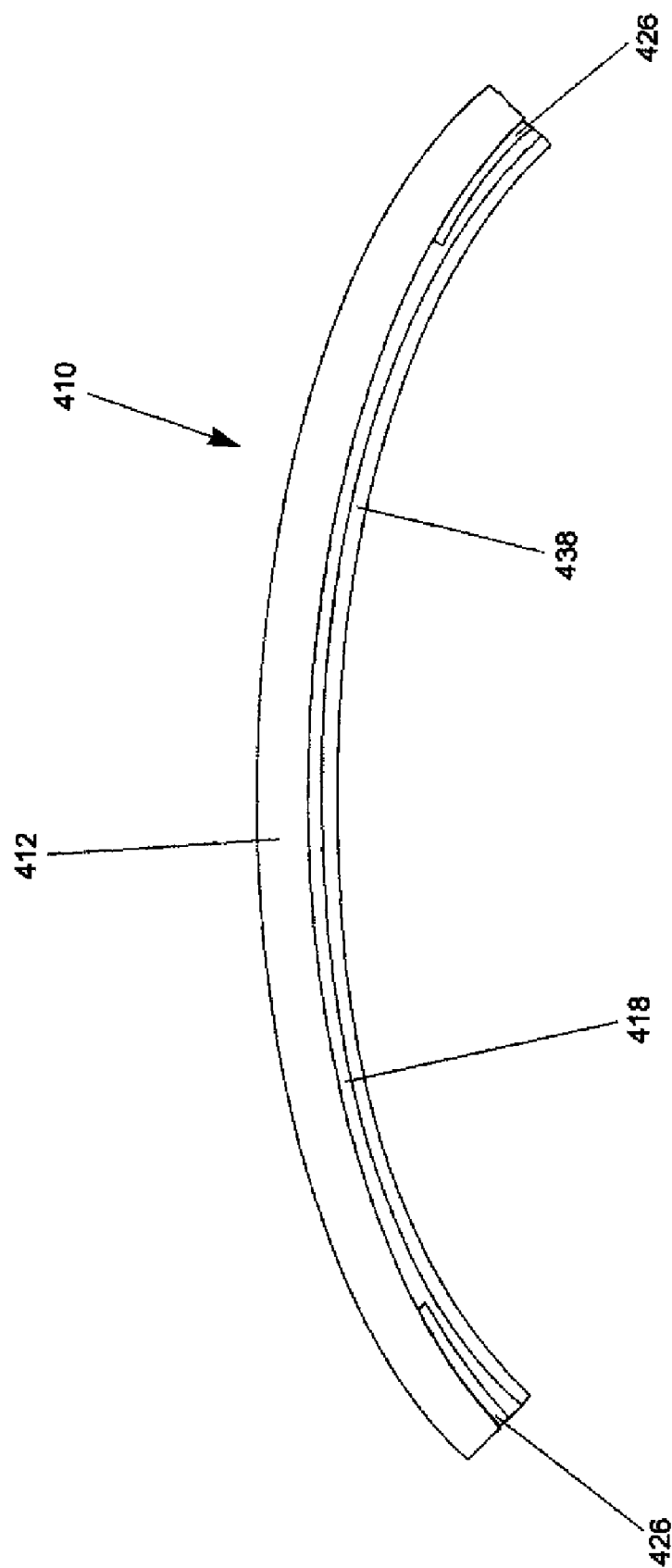
FIG. 14 is a sectional view of a curved non-electro-optic reflective element of the present invention.

Optionally, the perimeter band (and/or any indicia or display elements or the like as described above) may be established at a rear surface of a curved or bent substrate, such as for a passenger-side exterior mirror of a vehicle. For example, and with reference to FIG. 14, a curved reflective element 410 includes a bent or curved substrate 412 (such as a convex or aspheric substrate) and a reflective coating or layer 418 disposed or established at the rear surface 412a of substrate 412. A perimeter border or band 426 (such as chromium or other suitable material) may be disposed around the perimeter region of the reflective element, such as directly on the rear surface of the substrate 412 (as shown in FIG. 14) or over the reflective coating at the perimeter region (so that the reflective coating is between the perimeter band and the rear surface of the substrate), such as described above.

The reflective coating or layer may comprise a metallic reflective material or may comprise transflective materials, such as a silicon or indium/silver material or an interference stack, such as an $SiO_2/TiO_2/SiO_2$ stack of layers or the like (such as by utilizing aspects of the reflective elements described in PCT Application No. PCT/US03/29776, filed Sep. 9, 2003 by Donnelly Corp. et al. for MIRROR REFLECTIVE ELEMENT ASSEMBLY; and/or PCT Application No. PCT/US03/35381, filed Nov. 5, 2003 by Donnelly Corp. et al. for ELECTRO-OPTIC REFLECTIVE ELEMENT ASSEMBLY; and/or U.S. patent application Ser. No. 11/021,065, filed Dec. 23, 2004 by McCabe et al. for ELECTRO-OPTIC MIRROR CELL, now U.S. Pat. No. 7,255,451; Ser. No. 10/528,269, filed Mar. 17, 2005, now U.S. Pat. No. 7,274,501; Ser. No. 10/533,762, filed May 4, 2005, now U.S. Pat. No. 7,184,190; Ser. No. 10/993,302, filed Nov. 19, 2004, now U.S. Pat. No. 7,338,177, which are hereby incorporated herein by reference in their entireties). As shown in FIG. 13, a protective coating 438 (such as a lacquer or paint, which may be substantially transparent if the reflective element is a transflective reflective element) may be disposed over the reflective coating 418 to protect the reflective coating.

Typically, it is desired that the appearance of the mirror reflective elements of the exterior rearview mirrors of a vehicle match or substantially match between the driver-side and passenger-side rearview mirrors of a vehicle, so that, for example, for a vehicle with a driver-side electro-optic reflective element and a passenger-side non-electro-optic reflective element, the bleached (or non-colored or non-darkened) appearance of the driver-side mirror reflector matches or substantially matches the appearance of the non-electro-optic passenger-side mirror reflector. A person viewing the vehicle, such as in a vehicle showroom or at a parking lot or the like, or while the vehicle is being driven along a road, thus may view and discern that that the mirror reflector at the driver-side minor matches or substantially matches the mirror reflector at the passenger-side mirror.

When both the driver and passenger-side rearview mirrors are selected to have the same type of reflective element (such as a frameless electro-optic reflective element using a border, non-dimming metallic reflective band, such as, for example, a frameless electrochromic reflective element as described above), such symmetry of appearance is readily achieved. However, it is not unusual, for economy purposes, to provide an electro-optic reflective element at the driver-side exterior rearview mirror and a non-electro-optic reflective mirror at the passenger-side exterior rearview minor. When an electro-optic driver-side exterior rearview minor is implemented on a vehicle with a non-electro-optic passenger-side exterior rearview mirror (as is often selected to reduce costs associated with the mirror assemblies of the vehicle), it is still typically desired that the reflective elements of the side rearview mirrors substantially or fully match in appearance to provide a similar appearance or style at the mirror at both sides of the vehicle, such as for aesthetic purposes. Thus, it is desired that the appearance of the non-electro-optic reflective element of the passenger-side rearview mirror substantially or fully match the appearance of the electro-optic reflective element of the driver-side rearview minor, such as when the electro-optic reflective element is in its bleached or non-powered or non-darkened state (such as during high ambient lighting or daytime lighting conditions).

The perimeter band material thus may be selected to substantially match the appearances between the driver-side exterior mirror (which may comprise an electrochromic minor with a perimeter band around the perimeter to conceal the perimeter seal of the reflective element) and the passenger-side exterior mirror (which may comprise a non-electrochromic minor), so that both minors provide a similar appearance to the perimeter band and reflective element. For applications where the perimeter band material of the electrochromic or driver-side mirror is selected to be the same as the third surface reflector material, the optical match (as viewed by a person viewing the reflective element) between the perimeter band and the third surface reflector is sufficient so that the perimeter band is not readily discernible at the mirror reflector. Thus, in such applications, it may not be necessary to provide a perimeter band on the corresponding conventional (such as chrome or titanium or "Blue" coated), non-EC passenger-side exterior mirror reflective element.

However, even in such applications, the perimeter band at the driver-side mirror may be discernible to a person viewing the exterior mirror, even when the perimeter band is substantially optically matched with the central reflector region of the reflective element. Thus, in order to at least substantially match the passenger-side non-electro-optic reflective element with the electro-optic reflective element at the driver-side mirror, a perimeter band or coating (for example, a layer of chromium or of rhodium or of rhodium/chromium) may be disposed around the perimeter edge or region of the non-electro-optic reflective element, such as a curved single substrate reflective element or the like. Thus, when one exterior side rearview mirror has an electro-optic reflective element (as is typically located at the driver-side of the vehicle) and the other exterior side rearview mirror has a curved reflective element or non-electro-optic reflective element (as may be provided at the passenger-side of the vehicle), a matching perimeter band may be disposed around the non-electro-optic reflective element so that the perimeter band of the passenger-side mirror matches or substantially matches the perimeter band of the driver-side mirror (such as by utilizing aspects described in U.S. patent application Ser. No. 11/226,628, filed Sep. 14, 2005, which is hereby incorporated herein by reference in its entirety).

Such a matching appearance of the non-electro-optic reflective element with the frameless electro-optic reflective element (with perimeter band as described above) may be achieved via various processes. For example (and such as described above and shown in FIG. 14), a perimeter reflective border may comprise a first metallic reflective layer (such as a metallic border or band, such as a ruthenium metal or the like) and may be disposed around the perimeter region of the second surface of the curved glass substrate (such as by sputter deposition or the like of the border material over the second surface of the substrate while the central region or primary viewing area of the second surface of the substrate is masked). A reflective layer or coating of a second metal reflector material (such as chromium or the like) may be disposed over the second surface and over the perimeter border or band to provide the central reflective region with a reflective perimeter border or band for a frameless non-electro-optic reflective element (such as by utilizing aspects described in U.S. patent application Ser. No. 11/226,628, filed Sep. 14, 2005; Ser. No. 10/533,762, filed May 4, 2005, now U.S. Pat. No. 7,184,190; and/or Ser. No. 11/021,065, filed Dec. 23, 2004, now U.S. Pat. No. 7,255,451, and/or U.S. provisional application Ser. No. 60/681,250, filed May 16, 2005; Ser. No. 60/690,400, filed Jun. 14, 2005; Ser. No. 60/695,149, filed Jun. 29, 2005; Ser. No. 60/730,334, filed Oct. 26, 2005; and Ser. No. 60/750,199, filed Dec. 14, 2005, which are hereby incorporated herein by reference in their entireties. Optionally, and desirably, the percent reflectivity of the second metallic reflective layer is less than the percent reflectivity of the first metallic reflective layer. Optionally, the reflective material and thickness of the material layer at the perimeter or border region of the reflective element may be selected to provide a desired spectral reflectivity so as to match or substantially match the spectral reflectivity and appearance of the central region or main reflective region or dimming region of the electro-optic reflective element when the electro-optic reflective element is in its bleached or non-powered or non-darkened/non-colored state.

Optionally, the appearance of a matching perimeter band (that matches a perimeter band of an electro-optic reflective element, such as a perimeter band that substantially matches the color or tint of the central reflective region of the electro-optic reflective element when bleached) may be achieved by establishing a demarcation line along and through the reflective coating of a single substrate, so that the demarcation line appears to be an inward perimeter edge of a reflective perimeter band or border. For example, and as shown in FIGS. 15A and 15B, a reflective element 510, such as a generally planar reflective element or a curved reflective element for an exterior rearview minor, includes a substrate 512 (such as a glass substrate, such as a generally flat substrate or a bent or curved substrate, such as a convex or aspheric substrate) and a reflective coating or layer 518 (such as a mirror reflector coating or coatings comprising, for example, chromium or titanium or silver or aluminum or silver alloy or aluminum alloy or a stack of layers, such as an ITO/silver/ITO stack of layers, or like) disposed or established at the second or rear surface 512b of substrate 512 (opposite the first or front or viewable surface

512a of the substrate 512), such as by sputter deposition in a vacuum deposition chamber, such as is known in the coating arts. As shown in FIG. 15B, a perimeter or border reflector region 526 may be outlined or demarcated or defined by a demarcation line 526a established (such as by laser etching or the like) through the reflective coating or layer 518 at the perimeter region. The reflective element 510 thus has a central main reflector region 524 and the perimeter or border reflector region 526 separated or defined or circumscribed by demarcation line 526a.

Thus, a mirror substrate or shape (such as a glass substrate or shape) may be cut from a sheet of glass to the desired mirror shape. The mirror substrate may be uniformly coated (with no masking) over at least substantially or entirely the second or rear surface of the substrate to provide a substantially uniform reflective coating or layer at the second surface of the substrate. Optionally, a sheet of glass or the like may be substantially uniformly coated over a surface of the sheet, and one or more coated mirror substrates or shapes may be cut from the coated glass sheet to provide the mirror substrate with the reflective coating or layer at the second surface of the substrate. The demarcation line then may be established (such as via laser etching or the like) around the perimeter of the cut and coated substrate so as to circumscribe and run around substantially or wholly the perimeter region of the cut substrate or shape. The demarcation line and perimeter or border reflector region and central main reflector region of the reflective element thus may be established via a single, unmasked coating process. The demarcation line may be established at a range of about 2 mm to about 5 mm (or more or less) inward from the perimeter cut edge of the substrate, whereby the width of the demarcation line may be selected to match or substantially match the border or perimeter band on the electro-optic reflective element at the driver-side mirror.

As shown in FIG. 15B, a coating or layer or overcoating 538 (such as a lacquer or paint or frit or tape or appliqué or coating) may be disposed over the reflective coating 518 to cover or coat the rear surface of the reflective element. The coating or layer may be painted or pad printed or screened or inked or otherwise applied or disposed or established at the rear surface of the reflective element. Optionally, the coating or layer 538 may be disposed over the entire rear surface (whereby the coating may provide environmental protection if needed or desired at and over the metallic layer materials (such as aluminum or gold or the like) of the reflective layer or coating, or may be disposed along the demarcation line 526a to substantially fill in the demarcation line 526a.

The paint or coating or layer may be selected to be any desired color or tint so as to provide the desired edge demarcation of the perimeter or border reflector region 526. For example, the coating or layer 538 may comprise a dark color, such as black or the like, or may comprise a light grey or other color or tint, depending on the particular application and, more particularly, on the color or visibility or viewability of the perimeter band on the electro-optic reflective element at the driver-side rearview mirror. For example, the darker the color of the coating or layer or paint, the more readily viewable or discernible the demarcation line 526a may be to a person viewing the exterior rearview mirror. Thus, it may be desirable to provide a light grey (or similar or selected pale color or the like) demarcation line so that the demarcation line is readily viewable/discernible, but not overly apparent or dominant at the reflective element.

The viewable width of the demarcation line (the dimension across the demarcation line when viewed at the reflective element by a person viewing the exterior rearview mirror) may be selected to provide the desired degree of viewability or discernibility of the demarcation line, so as to give the appearance of an edge of a perimeter band or border coating. Optionally, for example, the demarcation line may have a width of preferably less than approximately 350 microns (one micron being equal to one millionth of a meter), more preferably less than approximately 250 microns and more preferably less than approximately 175 microns. Also, for example, the demarcation line may have a width of preferably greater than approximately 50 microns, more preferably greater than approximately 75 microns and more preferably greater than approximately 100 microns. The demarcation line through the reflective coating at the rear surface of the reflective element thus functions to demarcate a perimeter border or band so as to provide the appearance of a perimeter band at the border region of the reflective element that substantially optically matches the central main reflector region of the reflective element.

Although shown and described as a substantially continuous or uninterrupted demarcation line that circumscribes the perimeter region of the reflective element substrate, the demarcation line may be formed to only partially circumscribe the perimeter region of the reflective element substrate, without affecting the scope of the present invention. For example, the demarcation line may be a line segment around a portion of the perimeter region of the substrate or the demarcation line may comprise a non-continuous or interrupted demarcation line (such as a plurality of line segments or dashes or the like) that extends partially or entirely around the perimeter region of the mirror substrate.

Figure 16:
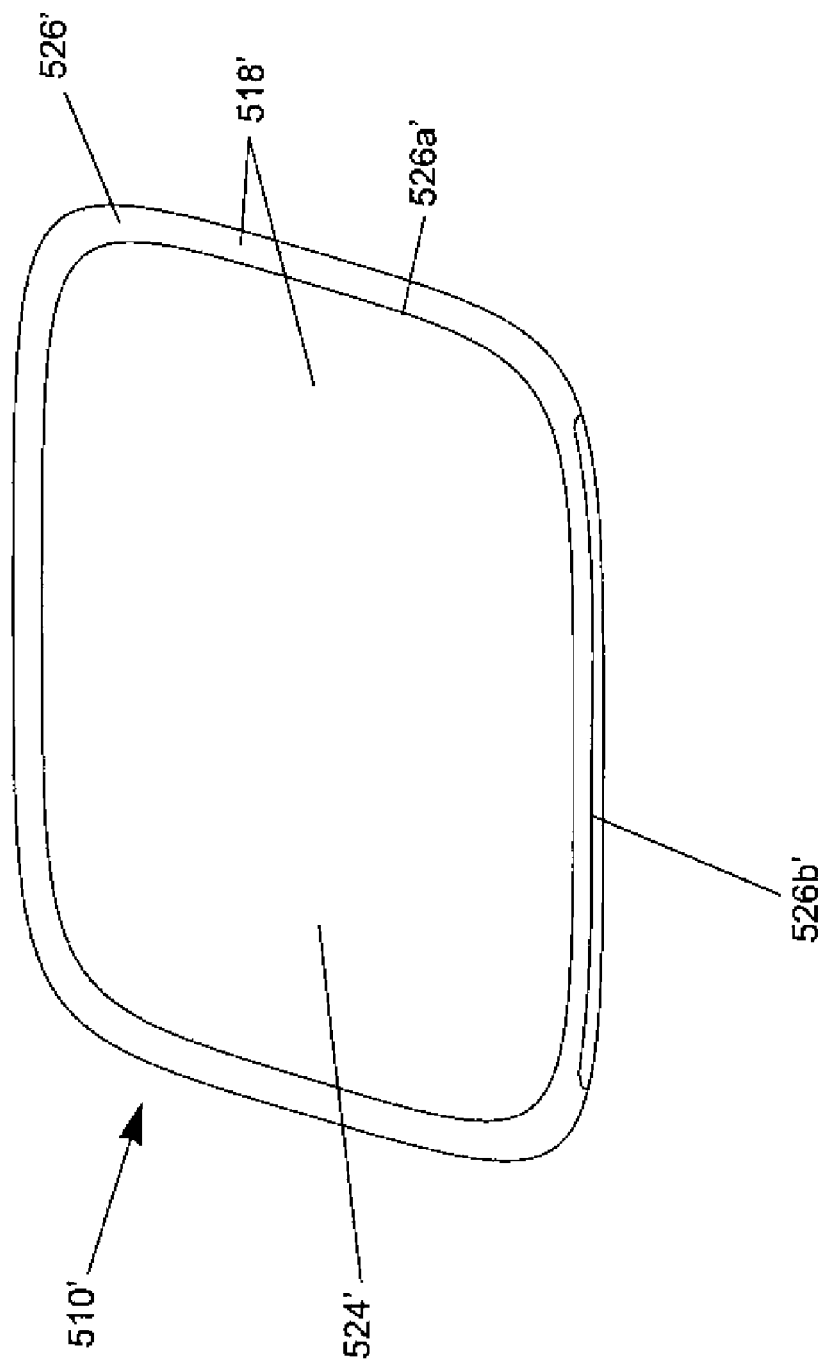
FIG. 16 is a plan view of another non-electro-optic reflective element having a perimeter band formed thereon in accordance with the present invention.

Optionally, and as shown in FIG. 16, a mirror reflective element 510' may have a mirror reflective coating or reflector 518 and a perimeter or border reflector region 526' and central main reflector region 524', and a demarcation line 526a', such as described above. Mirror reflective element 510' includes a second demarcation line 526b' established or formed (such as by laser etching or the like) in and through the reflective coating 518, such as in a similar manner as described above with respect to demarcation line 526a of reflective element 510. In the illustrated embodiment, the second demarcation line 526b' extends along the lower perimeter region of the mirror substrate and curves downward to the perimeter edge of the reflective element 510'. Such a second demarcation line may be desirable for a passenger-side non-electro-optic mirror reflective element so that the non-electro-optic passenger-side mirror reflective element matches or substantially matches an electro-optic driver-side mirror reflective element, such as, for example, the driver-side mirror reflective element supplied by Gentex Corp. of Zeeland, Mich. for a model year 2006 Audi vehicle. The mirror reflective element 510' may be otherwise substantially similar to the mirror reflective element 510 described above, such that a detailed discussion of the mirror reflective elements will not be repeated herein.

Although shown and described as having the central main reflector region and the border reflector region (as either defined by a demarcation line through the reflector coating or by a separate layer or coating around a perimeter region of the reflective element) at the same surface of the electro-optic or non-electro-optic reflective element, it is envisioned that the border reflector band may be formed or established on the second or rear surface of the substrate while the central or main reflector coating may be established on the first or front surface of the substrate (in such an application, masking may be required to faint the coatings at one or both sides of the substrate). Alternately, and optionally, the border reflector band may be established on the first surface of the substrate while the central or main reflector coating may be established on the second surface of the substrate (in such an application, masking may be required to form the coatings at one or both sides of the substrate). Optionally, the border and central reflector coatings may both be on the first or front surface of the reflective element, depending on the particular application of the reflective element and mirror assembly.

The substrate or substrates of the reflective element may comprise any type of suitable substrate, such as a single glass substrate or the like. For example, the substrate may comprise a glass substrate having a thickness of at least about 1.6 mm, more preferably a thickness of at least about 1.8 mm and more preferably a thickness of at least about 2 mm, but could have a greater thickness or a reduced thickness without affecting the scope of the present invention. The substrate may comprise a substantially flat or planar substrate or may comprise a curved substrate depending on the particular application of the reflective element.

Optionally, and with reference to FIGS. 17-21, a reflective element assembly 610 for an exterior rearview mirror assembly includes a front substrate 612 (FIG. 21) and a rear substrate 614 spaced from front reflective element substrate 612, with an electro-optic medium 616 (preferably an electrochromic medium) sandwiched therebetween. The front substrate 612 has a transparent conductive coating or layer 618 (such as an ITO layer, such as a ½ wave ITO layer or a doped tin oxide layer or a doped zinc oxide layer or the like) disposed on its rear surface 612a (typically referred to as the second surface of the laminate reflective element assembly) and the rear substrate 614 has a third surface mirror reflector 620 (FIGS. 20 and 21) coated thereon (the mirror reflector may comprise a layer or stack of layers of metals or a metal or stack of metals with at least one conductive oxide layer, such as ITO, or the like as discussed below). The third surface mirror reflector covers the central region or EC-active or viewing region of the front surface 614a (typically referred to as the third surface of the reflective element assembly) of the rear substrate 614 (but does not extend or cover fully to the perimeter edge of the substrate), and the mirror reflector coating 620 overlaps a tab-out or edge wraparound coating or coatings 636 (that extends substantially or fully to a perimeter edge of the substrate, and preferably, if in a "flush" electrochromic mirror element construction, wraps around the cut edge of the substrate) as discussed below. An epoxy seal material 622 (FIG. 21) or the like, is applied between the substrates to define the cavity for the electrochromic medium and to adhere the substrates together. The epoxy seal 622 overlaps and seals an overlap region 621 where the third surface mirror reflector 620 overlaps the wraparound coating 636 to environmentally protect the third surface mirror reflector 620, as also discussed below.

Because an exterior rearview mirror is located at the exterior of a vehicle, the mirror reflective element is typically exposed to a hostile environment and may be exposed to humidity, rain, snow, ice, dirt, salt, debris and the like. In typical laminate electrochromic reflective element assemblies, any portion of the mirror reflector layer or layers that extend beyond the perimeter seal toward the outer edge of the rear substrate (for purposes of electrical contact) are particularly vulnerable. Thus, it is desirable to provide a robust reflective element, such as a mirror reflective element having environmentally stable coatings or layers on the surfaces of the reflective element substrates that can be exposed to the hostile environment. Although such environmentally stable or robust coatings, as discussed below, are desirable and suited for exterior mirror applications, aspects of such coatings and the constructions herein are equally suited for interior mirror applications as well.

As shown in FIG. 18, the rear substrate 614 of reflective element 610 includes a third surface conductor or coating 636 that is disposed over the uncoated glass substrate and along a portion (such as an uncoated perimeter region or perimeter glass surface) of the third surface 614a of rear substrate 614. The third surface coating 636 includes a third surface conductor portion or tab-out portion 636a (disposed at the perimeter region of the third surface 614a) and a wrap-around portion or coating 636b that wraps around and over a perimeter edge or cut edge 614c of rear substrate 614. Third surface coating 636 may comprise an environmentally stable metallic layer or material, such as chromium or rhodium or ruthenium or platinum or the like, or a stack of, for example, of chromium/ruthenium or chromium/rhodium or chromium/platinum or the like, and thus provides an environmentally stable or robust wraparound coating at the perimeter region of the front surface 614a of the rear substrate 614.

As shown in FIGS. 17 and 19, rear substrate 614 also includes a fourth surface conductor or coating 638 disposed over the glass substrate and along a portion (such as an uncoated perimeter region or perimeter glass surface) of the fourth surface 614b of rear substrate 614. Fourth surface coating 638 includes a fourth surface conductor portion or electrical contact portion 638a and a wrap-around portion or coating 638b that wraps around and over perimeter edge or cut edge 614c of rear substrate 614 onto the cut edge of the substrate and contacting third surface conductor coating 636 (and may be disposed at or over or under wrap-around portion 636b at perimeter edge 614c, as shown in FIG. 19), in order to provide electrical conductivity between the fourth surface conductor 638a and the third surface conductor 636 and the third surface mirror reflector coating 620, as discussed below. The fourth surface conductor 638a and wrap-around coating 638b may comprise the same material as the third surface conductor 636a and wrap-around coating 636b (such as chromium or molybdenum or tungsten or Hastelloy or ruthenium or rhodium or platinum, or a stack of, for example, of chromium/ruthenium or chromium/rhodium or chromium/platinum or the like, or other suitable environmentally stable conductive material). Alternately, the fourth surface coating 638 may comprise a different material than the third surface coating 636, with both coatings or layers being selected to be substantially environmentally stable or robust.

The third and fourth surface conductors 636, 638 may be disposed onto the respective perimeter regions and edge of the rear substrate during the same or separate coating processes. For example, the rear substrate preferably has at least the third and fourth perimeter edge wraparound environmentally robust conductor coatings formed in a dual-side sputtering coating chamber (such as a sputter-up/sputter-down or a sputter-left/sputter-right coating chamber where the substrate carrier passes through opposing sputter targets so that the substrate can be coated at both sides), such as by utilizing aspects of the coating chambers and processes described in U.S. patent application Ser. No. 11/021,065, filed Dec. 23, 2004 by McCabe et al. for ELECTRO-OPTIC MIRROR CELL, now U.S. Pat. No. 7,255,451, which is hereby incorporated herein by reference in its entirety. In such a chamber, for example, one of the conductors (such as, for example, fourth surface conductor 638) may be sputter coated from the bottom of the substrate, while the other conductor (such as, for example, third surface conductor 636) may be sputter coated from the top of the substrate (with the central region of the respective third and fourth surface (and other perimeter portions or regions where the conductor coating is not desired) masked so that the respective conducting coatings are deposited only at an edge). The conductor coatings 636, 638 thus are disposed over the perimeter edge 614c and over a perimeter region of the respective glass surfaces 614a, 614b of the rear substrate 614. Optionally, one or both of the conductor coatings 636, 638 may be disposed around more than one perimeter region or around substantially the entire perimeter of the substrate. Optionally, one of the coatings may be disposed over the other coating at the perimeter edge 614c (if the coatings are disposed during separate coating processes) or the coatings may be disposed together onto the perimeter edge (such as for applications where the coatings are disposed during a single coating process) so as to contact one another and establish electrical conductivity between the conductor coatings 636, 638 and, thus, between the fourth surface and the third surface of the rear substrate of the reflective element assembly.

After the conductor coatings 636, 638 are disposed at the respective perimeter regions and at the edge of the substrate, the perimeter regions 614d of the front surface 614a of rear substrate 614 may be masked, whereby the third surface mirror reflector coating or layer 620 is disposed (such as via a sputter deposition process or the like) over the unmasked or central portion or EC-active portion or viewing portion or region (which is within the perimeter seal of the reflective element assembly when the reflective element assembly or cell is assembled) of the third surface 614a, and within or encompassed or surrounded by the perimeter band or region 614d of the third surface 614a of rear substrate 614. The third surface perimeter band 614d may be established by masking the perimeter region of the third surface 614a prior to deposition of the mirror reflector coating or layer 620 onto the central region of the third surface 614a. The third surface mirror reflector coating or layer 620 may comprise a transflective coating or layer or other suitable third surface mirror reflector coating comprising reflective and conductive coatings. For example, the third surface mirror reflector coating 620 may comprise a reflective metallic coating or layer or multiple coatings or layers, such as a bi-layer or the like, such as a reflective metallic coating or layer (or multiple coatings or layers), such as a layer of chromium/rhodium or chromium/ruthenium or molybdenum/chromium, or an ITO/silver/ITO or AZO/silver/AZO stack of layers or the like, over the central region or viewing region or EC-active region of the front surface 614a of the rear substrate 614.

Optionally, the third surface mirror reflector coating may not be transflective (such as for a fourth surface reflective element), and/or may comprise a substantially non-transmissive metallic reflector coating, such as a coating or layer of silver or aluminum or their alloys or the like, or may comprise a substantially non-transmissive ITO/Ag/ITO or AZO/Ag/AZO coating or layers or the like. Optionally, the rear substrate may initially be coated with a transparent conductive coating, such as ITO or the like, disposed over its entire third or front surface (for example, a substrate having such a coating already established thereon may be purchased by the mirror manufacturer), whereby the third surface conductor 636 is disposed over the perimeter region of the ITO coated third surface and the mirror reflector coating or coatings is/are disposed over the ITO coated central region or EC-active region of the rear substrate, without affecting the scope of the present invention.

As shown in FIGS. 20 and 21, the mirror reflector coating or layer 620 is disposed over the central region or portion of the third surface 614a that is substantially surrounded by the perimeter seal 622 and so is environmentally protected thereby. The mirror reflector coating 620 overlaps and makes conductive contact at a portion of the third surface conductor 636a of third surface coating 636, such as at overlap region 621, so as to contact the conductor 636a and establish conductivity between the mirror reflector coating 620 and the third surface conductor coating 636 and, thus, between the mirror reflector coating 620 and the fourth surface conductor 638a at the fourth surface 614b of rear substrate 614. As can be seen in FIG. 21, the overlap region 621 is positioned inward of the perimeter edge of the rear substrate and at a region that is encompassed by the perimeter seal 622 when the seal 622 is established at the rear substrate 614. Perimeter seal 622 thus overlaps a portion of the mirror reflector coating 620 and a portion of the third surface conductor 636a and limits or substantially precludes exposure of the minor reflector coating 620 to the exterior elements. The perimeter seal overlaps and seals against a perimeter portion of the mirror reflector coating and the uncoated glass surface of the third surface of the rear substrate in other perimeter regions where the third surface conductor 636a is not established.

The fragile or less environmentally stable mirror reflector coating 620 thus terminates or stops within the area encompassed by the perimeter seal 622 and the robust or more environmentally stable third surface conductor coating 636a contacts/overlaps the fragile mirror reflector coating 620 in the area encompassed by the perimeter seal. Thus, the more environmentally stable third surface conductor coating 636a extends outward from the perimeter seal and over the third surface at the perimeter region and to the edge of the substrate. The perimeter seal 622 thus provides environmental protection for the mirror reflector coating 620, so that the mirror reflector coating 620 may comprise a less environmentally stable or robust material, such as silver or silver alloy or ISI stack (such as metal oxide/metal/metal oxide stack, such as an ITO-silver-ITO stack or a ZnAlO/Ag/ZnAlO stack or a ZnAlO/Al/ZnAlO stack or a ITO/Ag/ZnAlO stack or the like), while the third surface conductor coating 636 and the fourth surface conductor coating 638 may comprise a more environmentally stable or robust material (such as chromium or rhodium or ruthenium or the like). Thus, the exposed conductor coatings 636, 638 (i.e., the coatings that are not encompassed and sealed by the perimeter seal and thus not within the sealed EC region of the reflective element) may be exposed to the elements and may withstand exposure to the elements at the exterior perimeter of the rear substrate and/or reflective element.

In the illustrated embodiment, and as also shown in FIG. 21, electrical connectors 640a, 640b, such as terminals or clips or pins or conductive epoxy or paste or the like, may be conductively connected to the second surface transparent conductive coating 618 and the fourth surface conductor 638a, respectively. The connectors 640a, 640b may be connected to an electrical wire or wire harness or lead or terminal or the like (not shown) to electrically connect the electrochromic reflective element to a vehicle or mirror control or power source or the like. Thus, the environmentally stable conductive wrap-around coatings 636, 638 provide electrical conductivity between the fourth surface of the reflective element to the third surface mirror reflector coating 620 at the EC-active region of the third surface of the reflective element, while the third surface mirror reflector coating 620 is substantially sealed and protected and substantially or entirely not exposed to the elements.

In a preferred embodiment, the rear substrate 614 may comprise a glass substrate having a thickness of between about 1.1 mm and about 1.6 mm or thereabouts. The third surface conduct coating 636 may comprise a layer of chromium, such as a layer of chromium that is sputtered deposited onto the glass substrate to a thickness of about 800 to about 1000 angstroms or more. The fourth surface conductor coating 638 may comprise a layer of chromium, such as a layer of chromium that is sputtered deposited onto the substrate to a thickness of about 800 to about 1000 angstroms, and the coating may be overcoated with a layer of ruthenium (such as a layer that is about 300 angstroms thick) or a layer of rhodium (such as a layer that is about 200 angstroms thick), whereby the electrical connector (typically a silver paste or epoxy or the like) contacts the overcoated layer of ruthenium or rhodium to establish the electrical connection to the conductor coating/coatings.

Optionally, and as shown in FIG. 21, reflective element 610 may include a display device 630 at the fourth surface 614b of rear substrate 614. Display device 630 may be operable to, emit or project illumination through the reflective element 610, such as through a window established at the third surface mirror reflector coating 620, or through the third surface mirror reflector coating 620 for a transflective reflective element. Display device 630 may be operable to provide a turn signal indicator or a blindspot alert indicator or the like, and may be directed to be substantially viewable to a driver of a rearwardly approaching vehicle or to be substantially viewable to the driver of the subject vehicle, depending on the particular application of the display device. The display device and reflective element may utilize aspects of the display devices described in U.S. patent application Ser. No. 11/226,628, filed Sep. 14, 2005; and/or U.S. provisional application Ser. No. 60/717,093, filed Sep. 14, 2005 by Lynam; Ser. No. 60/732,245, filed Nov. 1, 2005; and/or Ser. No. 60/759,992, filed Jan. 18, 2006 by Weller et al. for INTERIOR REARVIEW MIRROR ASSEMBLY WITH DISPLAY, which are hereby incorporated herein by reference in their entireties.

The construction shown in FIG. 21 particularly suits "flush" type reflective elements having overhang regions (defined by the front substrate being larger than the rear substrate so as to provide an overhang region or regions along the upper and/or lower perimeter regions of the reflective element assembly) as shown in FIG. 21 (and such as described in U.S. patent application Ser. No. 11/226,628, filed Sep. 14, 2005, which is hereby incorporated herein by reference in its entirety). However, for offset reflective elements, where the front and rear substrates may be similarly sized, but one is vertically offset relative to the other (such as described in U.S. patent application Ser. No. 11/021,065, filed Dec. 23, 2004 by McCabe et al. for ELECTRO-OPTIC MIRROR CELL, now U.S. Pat. No. 7,255,451; and/or U.S. Pat. Nos. 5,724,187 and 5,668,663, which are hereby incorporated herein by reference in their entireties), the reflective element may not include a fourth surface conductive wraparound coating or bus bar. For example, an offset reflective element may not include a fourth surface conductor coating, whereby the environmentally stable third surface conductor coating may be disposed at the perimeter region of the front or third surface of the rear substrate and may or may not wrap-around onto the cut edge of the rear substrate, whereby the electrical connection to the third surface coatings may be made by a known clip or the like at the perimeter region so as to contact the conductor coating at the perimeter region of the third surface of the rear substrate.

The third surface mirror reflector coating (established over the central or EC-active region of the glass third surface of the rear substrate) may comprise a metallic coating or layer or a metal oxide/metal/metal oxide coating, such as a stack of materials or layers, such as, for example, a layer of ITO (such as about 500 angstroms thick), a layer of metal (such as a layer of silver or aluminum that is about 300 angstroms thick), and a layer of ITO (such as about 120 angstroms thick). Optionally, the third surface mirror reflector stack may comprise an aluminum zinc oxide (AZO) stack, such as a stack comprising an AZO layer, a metallic layer, and another AZO layer (for example, an AZO/Ag/AZO stack of layers). The layer or layers of AZO may be sputtered from a sputtering target comprising zinc oxide doped with aluminum oxide. For example, a doped zinc oxide target having ZnO: 2% $Al_2O_3$ has achieved desired results. Such an AZO layer may be formed via sputter deposition with such a doped zinc oxide sputtering target, such as can be made by a co-precipitation process; formed of ZnO: 2% $Al_2O_3$. Note that while good results have been obtained with aluminum-doped zinc oxide, other dopants such as silver or gold can be used.

Preferably, the sputtering is done by direct current (DC) sputtering, more preferably by pulsed DC sputtering, and more preferably by medium frequency (such as within a range of about 40 kHz to about 1 MHz or thereabouts) dual magnetron DC sputtering. Alternatively, radio frequency (RF) sputtering could be used or other sputtering techniques or systems may be used, depending on what is better suited for the particular chamber and chamber conditions.

Advantages found by utilizing an AZO layer or layers include that it is a lower cost material than ITO. We find that effective AZO coatings for purposes of the present invention (i.e. highly transmissive and sufficiently conductive to allow electron flow therethrough for electrical contact to the electrochromic medium when a thin layer of AZO is overcoated over the underlying metal layer (the layer of AZO that contacts the electrochromic medium when the reflective element is assembled)) can be formed or established using non-reactive DC magnetron sputtering (and hence obviating the cost/complexity of introducing and controlling an oxygen partial vapor pressure during the sputter deposition process). Although the AZO layer may not be as conductive as an ITO layer, the conductivity of the AZO layer is sufficient to allow the electron flow from the highly conductive metallic layer (that underlies the AZO layer and acts as a conductive raceway over the third surface of the rear substrate) and through the thin AZO layer to energize the electrochromic medium when electrical power is applied to the connectors or contacts of the reflective element assembly. For instance, and for the AZO layer that the electrochromic medium contacts, we find that AZO layers having a sheet resistance of greater than about 100 ohms per square, or in certain constructions greater than about 250 ohms per square, are effective.

The glass surface of the rear substrate thus may be coated, with a third surface mirror reflector comprising a conductive coating or a stack of coatings or layers. For example, the glass surface may be regionally coated (such as at a perimeter region) with a conductive tab-out layer of sputtered chromium (such as a layer having a thickness of about 500 angstroms or thereabouts), and the central or EC-active or viewing portion of the front surface of the substrate, and a portion of the conductive tab-out layer, is overcoated with a third surface mirror reflector/mirror transflector layer. For example, a mirror reflector coating may be disposed that comprises a stack of layers, such as, for example, an AZO layer (such as about 500 angstroms thick), a metallic layer (such as a highly conducting layer of silver or aluminum doped silver or doped aluminum or the like and having a thickness of about 800 angstroms to about 1000 angstroms or thereabouts), and a layer of aluminum zinc oxide or AZO (such as a layer of AZO having a thickness of about 100 angstroms to about 200 angstroms or thereabouts). Such an AZO:metal:AZO stack of layers thus provides the desired transmissivity and reflectivity at the EC-active region of the reflective element, while being sufficiently conductive for its intended purpose of selectively energizing the electrochromic medium. Other thicknesses of layers and other materials may be utilized depending on the particular application and desired characteristics of the reflective element and mirror assembly.

Optionally, and desirably, a rear substrate for a reflective element may have a mirror reflector coating that utilizes chromium (or titanium or other stable metal) for an adhesion layer at the glass surface of the front of the substrate. For example, a preferred embodiment of such a rear substrate may have a mirror reflector coating comprising a layer of chromium (such as a layer that is about 400 angstroms thick), with a layer of metal, such as silver or aluminum or alloys thereof the like, such as a layer of silver that is about 800 angstroms thick, disposed thereon. A layer of AZO (such as a layer of AZO that is about 150 angstroms thick) is then non-reactively deposited or disposed onto the metal layer. Thus, the AZO layer or overcoat (that contacts the electrochromic medium when the reflective element is assembled and protects or isolates the metal layer from the electrochromic medium) may be non-reactively deposited, and thus obviating the cost/complexity of introducing and controlling an oxygen partial vapor pressure during the sputter deposition process. Such a mirror reflector coating may be disposed at the glass third surface of the rear substrate via a multiple target sputtering process. The adhesion layer of chromium at the glass surface of such a rear substrate may also provide reduced costs of the mirror reflector coating and of the reflective element as compared to rear substrates with an ITO adhesion layer at the glass surface.

Note that a benefit of a third surface reflector that comprises a glass substrate coated first with an environmentally stable electrically conducting layer (such as chromium), which in turn is overcoated with a highly reflecting metallic mirror layer (such as a layer of silver or of a predominantly silver silver-alloy or such as a layer of aluminum or of a predominantly aluminum aluminum-alloy), which in turn is overcoated with a transparent electrically conductive layer (that is disposed between the highly reflecting mirror metallic layer and the electrochromic medium within the electrochromic mirror element cell), is that electrical conductivity and contact to the electrochromic medium can be sustained by the underlying environmentally stable electrically conducting layer even if its overlaying environmentally fragile layers (such as silver or the like) degrade or deteriorate due to environmental exposure. An example of such a third surface reflector comprises a glass/chromium/metal (such as silver or aluminum or an alloy of silver or of aluminum)/aluminum doped zinc oxide [herein referred to as "CAZ"]. In such an exemplary construction, the third surface reflector coating (TSR) can be taken out to the edge (or wrap-around the edge) of the substrate beyond the seal, and the end product can be environmentally resilient without the need to use encapsulants or the like to environmentally protect tab out regions, cut-edge wraparound coatings, offset regions, overhang regions and/or the like. This is because the electrical continuity of CAZ or similar constructions is environmentally stable due to the underlying bedrock of the environmentally stable metallic electrical conductor, such as chromium. In such constructions, any environmentally fragile layers, such as AZO and silver coating portion, that extends beyond the perimeter seal of the mirror cell may be exposed to environmental conditions and so may deteriorate in severe environmental testing, such as 85C/85% RH, salt spray, steam autoclave, etc. (or in field usage on a vehicle), while the underlying adhesion layer/base electrically conducting coating of chromium remains intact. Thus, the EC mirror element cell can still be powered even if the overlying layers of the CAZ were partially or substantially deteriorated at the likes of a tabout or edge wraparound or offset or overhang region. Thus, for example, in an offset interior mirror (or exterior mirror) electrochromic cell construction, the clips or contacts can maintain electrical contact to the chromium (and hence thereby to the third surface mirror reflector coating that is protected by the EC perimeter seal itself), even if the overlying silver or AZO layer may locally corrode.

In a flush construction, where the likes of an edge overcoat or fourth surface electrical connection, such as via a conductive epoxy or the like, may be made, the conductive epoxy itself may locally encapsulate and environmentally protect the CAZ layer or stack, but having the bedrock of environmentally stable chromium (or a similar environmentally stable metal electrically conducting thin film layer such as of a chromium-based alloy or such as of as a nickel-based alloy, such as an Inconel or a Hastelloy, or such as of an iron-based alloy, such as a stainless steel or such as of titanium or a titanium-based alloy) has the advantage that the underlying chromium or similarly environmentally stable metal thin film layer remains electrically conducting and integral even should the overlying silver or AZO (or other transparent electrical conductor, such as other doped zinc oxides or a doped indium tin oxide, such as ITO or indium oxide or tin oxide or doped tin oxide) degrade or deteriorate in harsh environmental conditions. For example, for third surface mirror reflectors, such as ITO/Ag/ITO (ISI) or the like, where the silver metal layer is environmentally vulnerable, an encapsulating or potting material (such as described in U.S. patent application Ser. No. 11/021,065, filed Dec. 23, 2004 by McCabe et al. for ELECTRO-OPTIC MIRROR CELL, now U.S. Pat. No. 7,255,451, which is hereby incorporated herein by reference in its entirety) may be used at the tabout or edge wraparound or offset or overhang regions, and this has proven to be successful. But, with the likes of CAZ, where the underlying bedrock adhesion-enhancing and electrically-conducting metal layer comprises an environmentally stable metal material, such as chromium or titanium or nickel or metal alloys or the like, the use of any extra potting or encapsulating material, such as at a tab-out region or at a clip region or wherever electrical connection is being made to the third surface reflector coating or layer outside of its sealed portion, becomes optional.

Figure 22:
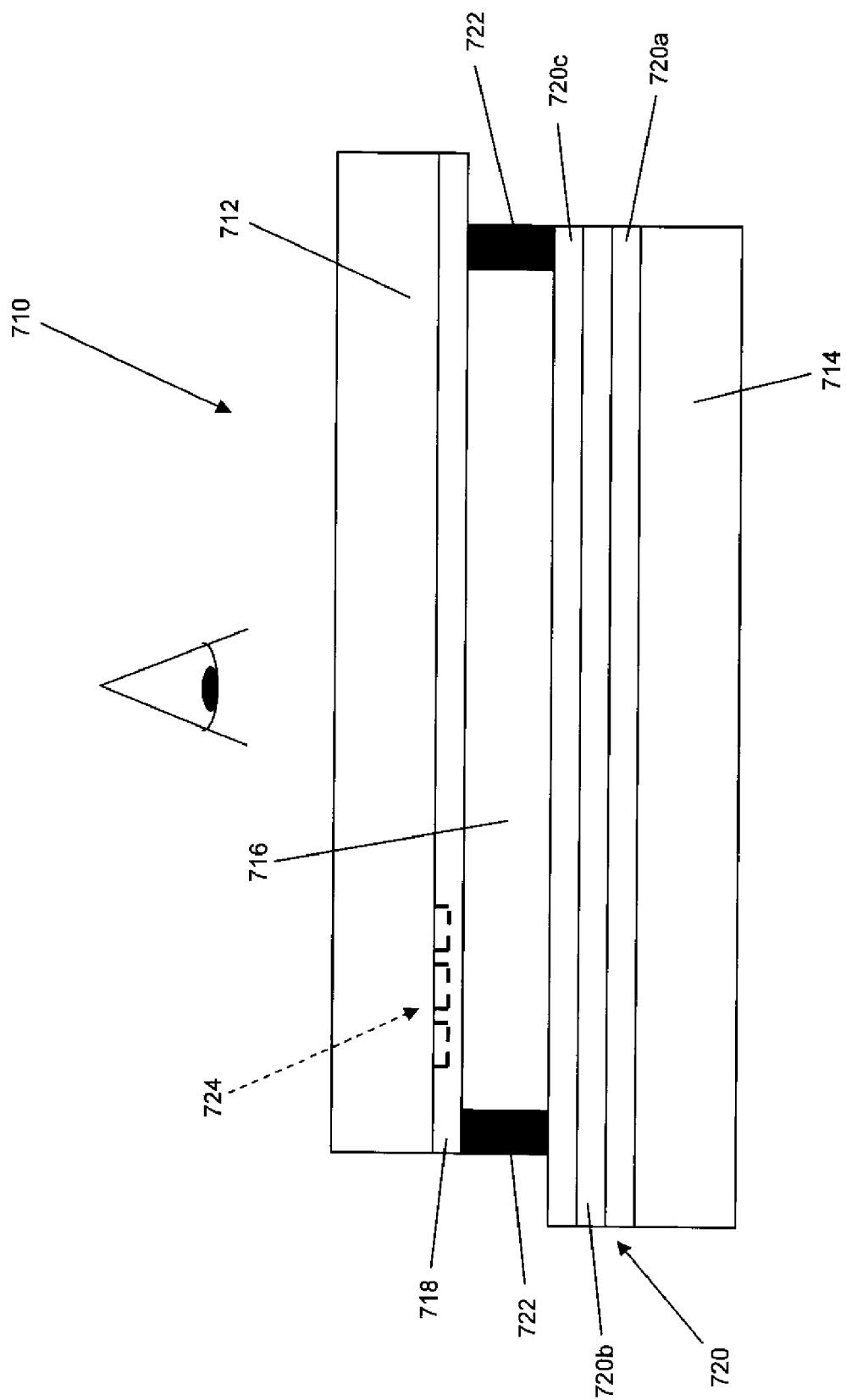
FIG. 22 is a sectional view of another mirror reflective element in accordance with the present invention.

An example of a preferred stack design for an interior rearview mirror reflective element 710 is shown in FIG. 22 and includes a rear glass substrate 714 (such as float glass) and a CAZ layer 720 disposed at the front or third surface of the rear substrate 714. The CAZ layer 720 comprises a layer of chromium 720a (having a thickness of about 800 angstroms) disposed on the front surface of the rear substrate (i.e. the third surface of the electrochromic cell), a layer of silver 720b (having a thickness of about 800 angstroms) over the chromium layer 720a, and a layer 720c of ZnO:Al (such as a layer deposited by sputtering from a sputter target of ZnO:$Al_2O_3$ so as to have a layer thickness of about 80 angstroms) disposed over the silver layer 720b. An electrochromic medium 716, such as an electrochromic solid polymer matrix (SPM) or other suitable electrochromic medium (such as a liquid or solid electrochromic medium), is disposed between the coated rear substrate 714 and a coated front substrate 712 (such as in a 110 µm interpane gap between the substrates and coatings/layers) and sealed within the interpane cavity via a perimeter seal 722 (such as an epoxy seal). The front glass substrate 712 (preferably float glass) has a layer of a transparent electrical conductor 718 (such as ITO, and preferably having a resistivity of about 12 ohms per square) disposed on its rear or second surface. Optionally, and as shown in FIG.

22, the reflective element 710 may include an indicia coating or layer or element 724, which preferably is disposed at the second surface of the front substrate (as shown in FIG. 22), but may be optionally disposed at the third or fourth surface of the rear substrate, such as in the manners described herein. Of course, the FIG. 22 is purely exemplary, and other constructions and materials and thicknesses may be selected and implemented depending on the particular application and desired performance of the interior or exterior vehicular mirror reflective cell, while remaining within the spirit and scope of the present invention.

The CAZ layers may be coated on either the tin side of the float glass substrate or the air side of the float glass substrate. Other environmentally stable electrically conductive materials, such as a layer of titanium or the like, may be disposed at the substrate in place of the layer of chromium. For example, a grade 2 titanium may be used. Although AZO is typically about ⅓ the cost of ITO and thus may be desired, ITO or other transparent conductors can be used. Alternately, however, AZO or other suitable or similar transparent conductors can be used instead of the ITO. Alternately, aluminum, such as Al(6061), or an aluminum alloy or a silver alloy, which has a high reflectivity of light incident thereon, such as a reflectivity of at least about 80 percent of light incident thereon, more preferably at least about 85 percent reflective of light incident thereon, and more preferably at least about 90 percent reflective of light incident thereon, may be used instead of silver.

Preferably, the surface or surfaces of the glass substrates are cleaned and/or treated prior to deposition of the coatings. For example, the surface may be prepared or treated to prepare the surface and/or to dissolve any moisture or water vapor from the surface. For example, the substrate may be heated prior to deposition or the surface may be treated with a plasma or ion beam, such as described in U.S. patent application Ser. No. 11/021,065, filed Dec. 23, 2004 by McCabe et al. for ELECTRO-OPTIC MIRROR CELL, now U.S. Pat. No. 7,255,451, which is hereby incorporated herein by reference in its entirety.

Preferably, the coatings or layers are deposited at the substrate in a multi-cathode (either vertical or horizontal) conveyorized sputter chamber. The chamber may contain an argon atmosphere at the AZO and/or other sputtering target, such as of silver or chromium; at about 3-5 mtorr, and the AZO material may be sputtered at about 300 sccm or more of argon flow. However, other chambers and/or processes may be implemented, depending on the particular coater being used and depending on the particular application. The power density applied to the AZO target (and to other targets) is preferably at least about 3 W/cm$^2$, more preferably at least about 5 W/cm$^2$, and more preferably at least about 8 W/cm$^2$. Due to the relatively inferior electrical specific conductivity of AZO, a dual magnetron sputtering system is desired for long term stable, arc-free operation within the sputter chamber. An example of a suitable AZO sputtering target is a ceramic of ZnO:Al$_2$O$_3$ (e.g., 98%/2% weight), formed from a co-precipitation process, "hip'd" and sintered. The preferred density is greater than about 5.3 g/cc. The AZO tiles may be attached, such as soldered, such as indium soldered, to an OFHC copper backing plate.

One desirable property of AZO is that it can be deposited in a metallizer sputter chamber without the cost/complexity of introducing oxygen gas handling to the vacuum chamber at the sputter station for the AZO. Thus, advantageously, a chromium target and a silver target and an AZO target (in that sequence relative to the direction of travel of the substrates thereunder) may be disposed in the same vacuum chamber and may be commonly exposed to the same sputtering atmosphere, such as the argon atmosphere described above. Thus, the sputtering station and the sputtering of the thin films may be achieved non-reactively and without recourse to introducing additional oxygen. By contrast, but optionally, another transparent conductor, such as ITO, could be used instead of AZO. However, reactive sputtering in a oxygen rich atmosphere is desirable for ITO transparent electrical conductor thin film deposition, and in such a vacuum chamber, steps must be taken to isolate the non-reactive sputtering of the preceding silver and chromium metallic layers from the reactive sputtering of the ITO layer. We find surprisingly good results when AZO is used in the CAZ layer and when the AZO is deposited in an argon sputtering atmosphere.

Figure 23:
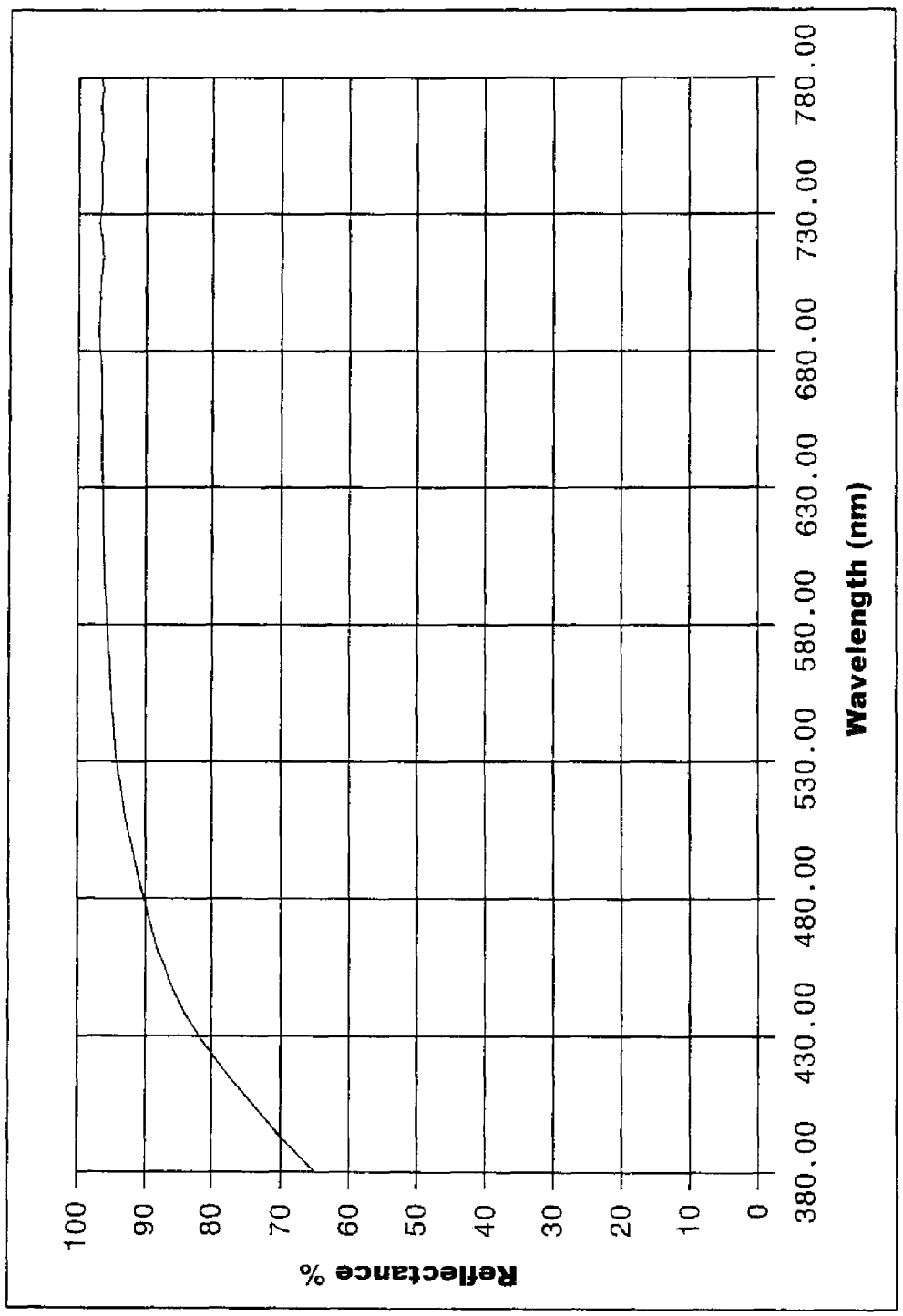
FIG. 23 is a graph depicting optical properties of a coated rear substrate in accordance with the present invention.
Figure 24:
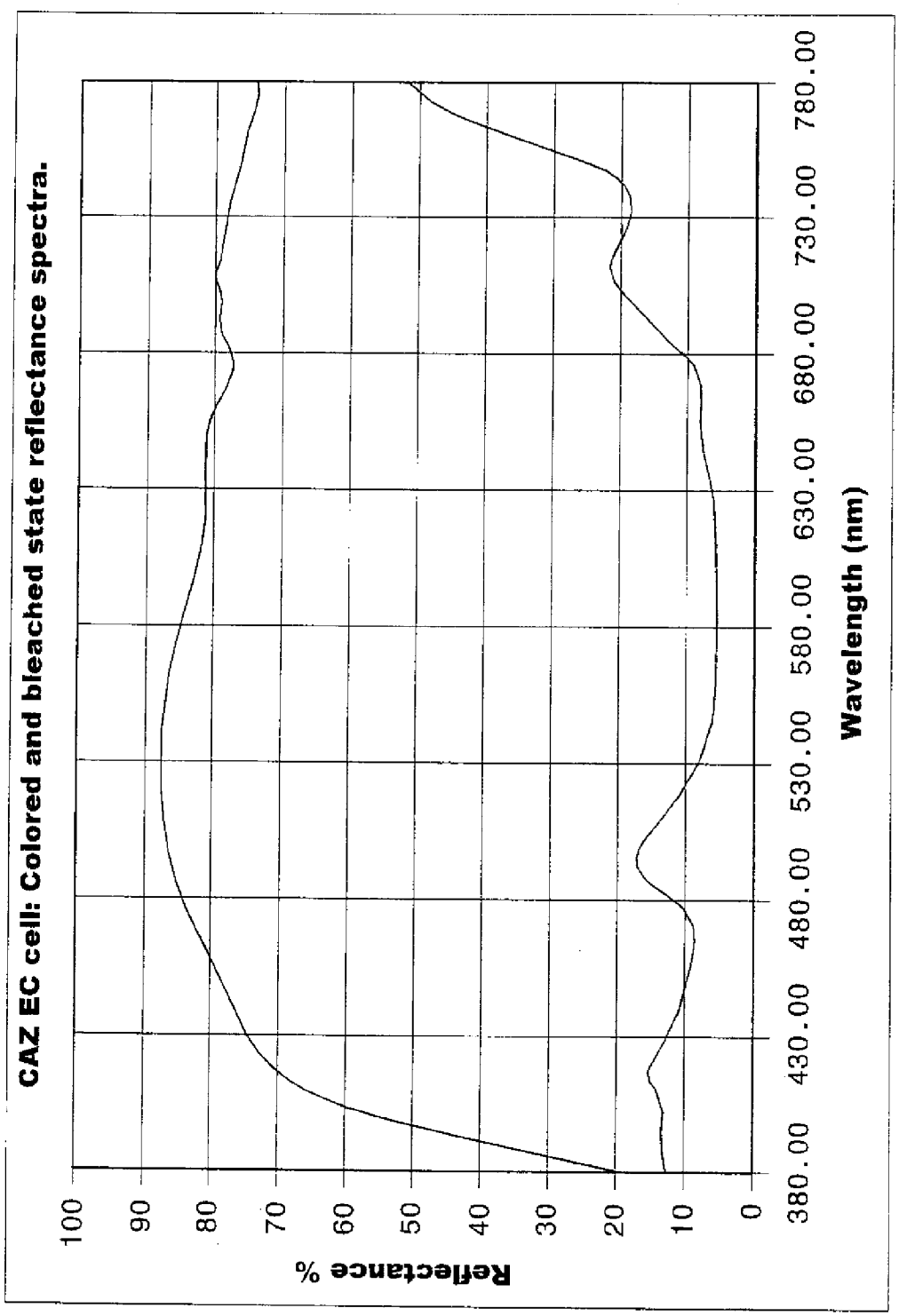
FIG. 24 is a graph depicting optical properties of a mirror cell in accordance with the present invention.

Optical properties of both the coated rear substrate and of the completed CAZ interior EC mirror element are shown in FIGS. 23 and 24, respectively. FIG. 23 shows the reflectance of the stack 720 of FIG. 22 of light incident on the coated rear substrate 714. As shown, the reflectance of visible light incident on the coated rear substrate 714 is about 90 percent or more. When the coated substrate 714 is formed into a cell 710, such as a cell using an electrochromic solid polymer matrix (SPM) (such as described in U.S. Pat. Nos. 5,725,809; 5,910,854; 6,002,511; 6,154,306; 6,245,262; 6,420,036; 6,855,431; and 6,954,300, which are hereby incorporated herein by reference in their entireties), the reflectance of light incident on the cell is as shown in FIG. 24. FIG. 24 shows the reflectance of light incident on the cell when the cell is in its bleached and when the cell is in its darkened or colored state (such as with about 1.2 volts applied across the cell). As can be seen in FIG. 24, visible light reflectance is greater than about 80 percent or thereabouts in the bleached state and around 10 percent or thereabouts in the colored state.

Figure 25:
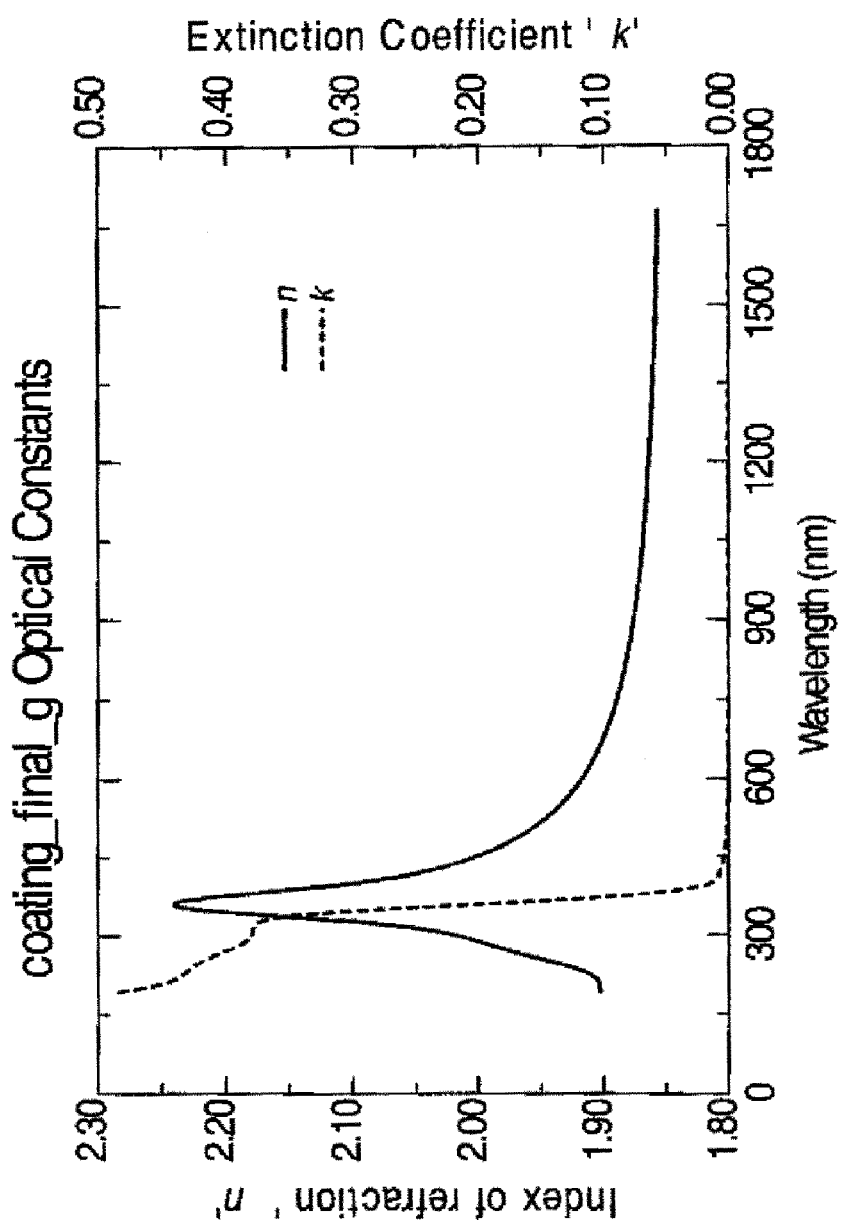
FIG. 25 is a graph depicting optical properties of a coating of the present invention.

The optical constants of the ZnO:Al layer are shown in FIG. 25. More specifically, FIG. 25 shows the optical constants, particularly the index of refraction "n" and the extinction coefficient "k", for the coated substrate. The sheet resistance of the coated rear substrate and of its individual layers was measured to be about 4-5 ohms per square for the 800 angstroms thick chromium layer and less than about 1 ohm per square for the 800 angstroms thick silver layer.

The electrochromic performance (high end/low end reflectivity and color and bleach speeds, etc.) of the CAZ interior EC mirror element is shown in the tables of FIGS. 26 and 27. The tables show the rate to color/bleach of the cells and the maximum and minimum percent reflectance of light incident thereon, and the maximum current draw and steady state current draws of the cells. FIG. 26 shows the initial performance characteristics of various samples at about 23 degrees Celsius and at 1.2 volts when powered, while FIG. 27 shows the final performance characteristics of various samples at the same temperature and voltage, but after the samples have endured about 50,000 cycles at 65 degrees Celsius and 95 percent relative humidity.

The AZO is desirably deposited in an argon sputter atmosphere and without added oxygen in the sputtering gas mix or composition. This may simplify in-line sputter coater designs, since there may be no need for "process isolation" between the chromium sputtering station/cathode, the silver sputtering station/cathode and the AZO sputtering station/cathode.

We find that the optical extinction coefficient "k" of ITO deposited under nearly identical oxygen-free sputtering in argon conditions is over ten times greater than that for AZO that is similarly non-reactively sputtered. Also, ITO exhibits an index grading, whereas AZO does not. We also find reduced formation of surface nodules using the AZO ceramic target when it is non-reactively sputtered as compared to reactive sputtering with ITO targets. Further, AZO sputtered in pure argon has a faster deposition rate than ITO in Ar/O$_2$; such as at least about 30 percent faster rate.

If a display on demand transflective display application is desired, the stack or layers used for the third surface reflector are correspondingly reduced and/or adjusted in thickness. For enhanced transmissivity, a transparent conductor may be used as the adhesion layer in place of the chromium. For example, a transflective TSR rear substrate may comprise: glass/AZO/Ag/AZO or glass/ITO/AZO/Ag/AZO. Due to the K value of AZO, its use in transflective third surface reflector (TSR) constructions can be desirable, given that such a DOD stack has a good T %, R % and neutral appearance.

A chromium layer has excellent adhesion to an ITO base coat and may improve the environmental robustness of the cell and may eliminate any need for surface preparation, such as ion beam cleaning.

AZO exhibits less compressive stress compared to ITO, which may enable more environmentally stable DOD stacks with thicker AZO layers.

AZO also may be used as the second surface transparent conductive coating or oxide (TCO) in the electrochromic cell if sufficiently thick so as to have a sheet resistance of at or about 20 ohms per square or lower. AZO is less inherently conductive than ITO, which has a specific resistivity of about 2×10−4 ohm.cm. With appropriate deposition conditions, including use of an oxygen sputtering atmosphere and heated substrate, a specific resistivity of about 6×10−4 ohm.cm or better of AZO can be achieved. The AZO layer, when deposited on the glass substrate, may provide a transparent conductor having a sheet resistance of about 20 ohms per square or lower if appropriately deposited. An electrochromic cell thus may be constructed using AZO as its second surface transparent electrically conductive layer.

Therefore, the present invention provides an electrochromic mirror element with the rear glass substrate third surface reflector (TSR) coated with an environmentally stable or resilient electrically conductive metal layer, such as chromium or titanium, and with a highly specularly reflective metal layer [such as comprising silver or silver alloy (such as preferably at least 80 percent and more preferably at least 90 percent silver content) or aluminum or aluminum alloy (such as preferably at least 80 percent and more preferably at least 90 percent aluminum content) or the like] disposed over the environmentally stable underlying layer. The highly reflecting mirror reflective layer itself thus has a reflectivity of preferably at least about 80 percent reflectivity (more preferably at least about 85 percent reflectivity, and more preferably at least about 90 percent reflectivity) of light incident thereon, as measured per SAE J964a. The AZO layer or other transparent electrically conductive layer is then disposed over the highly reflecting mirror reflective metal layer and need only have a modest but finite electrical conductivity, since the underlying highly reflecting mirror reflective layer and/or the adhesion promoting environmentally stable metal layer can provide the desired high electrical conductivity across the third surface of the EC cell. The CAZ or similarly coated rear substrate thus provides substantial reflectivity at the third surface of the mirror element, while providing an environmentally stable layer for providing conductive continuity to the third surface of the mirror element and any portions of the third surface reflector such as tabouts or edge wraparounds or offset regions or overhang regions or the like.

Optionally, and as shown in FIG. 28, an electro-optic mirror assembly 710' (such as for an interior or exterior mirror assembly) includes a rear glass substrate 714' and a larger front substrate 712' so that no cross dimension of the smaller rear substrate 714' extends beyond a corresponding cross dimension of the larger front substrate 712'. An electrochromic medium 716', such as an electrochromic solid polymer matrix (SPM) or other suitable electrochromic medium (such as a liquid or solid electrochromic medium), is disposed between the coated rear substrate 714' and a coated front substrate 712' (such as in a 110 μm interpane gap between the substrates and coatings/layers) and sealed within the interpane cavity via a perimeter seal 722' (such as an epoxy seal). Of course other thicknesses or interpane gaps can be used without affecting the scope of the present invention.

Rear substrate 714' includes a third surface mirror reflector 720' (optionally, the third surface mirror reflector may be a third surface transflective minor reflector) disposed at the front or third surface 714a' of the rear substrate 714'. The third surface minor reflector 720' may be any type of suitable third surface mirror reflector, such as a third surface mirror reflector similar to the CAZ reflector described above, or a third surface reflective element consisting of glass/chromium/ruthenium or glass/ITO/silver or silver alloy/ITO or the like. For example, the third surface mirror reflector 710' may include a layer 720a' of environmentally stable metallic material, such as chromium or the like, disposed on the front surface of the rear substrate (i.e. the third surface of the electrochromic cell), and a layer or layers 720b' of metal/transparent conductive material/materials over the chromium layer 720a', such as described above. The third surface mirror reflector 720' includes a wraparound portion or tabout portion 721' that wraps around and overcoats a perimeter edge 714c' of the rear substrate 714' in order to facilitate electrical connection at the fourth surface as discussed below.

As can be seen in FIG. 28, a portion of the third surface minor reflector 720' terminates at the third surface 714a' of the rear substrate 714' before the perimeter edge 714d' and within the seal region so that there is a gap 714e' at the third surface between the perimeter edge region 714d' and the edge of the third surface mirror reflector 720'. For example, the third surface of the rear substrate may be masked at a portion or region along the perimeter edge 714d' of the substrate during the coating or deposition of the third surface mirror reflector 720' so that a portion 714e' of the third surface 714a' is devoid of the third surface mirror reflector. The masked portion or gap portion 714e' may be only a portion or section or length along the perimeter edge 714d', and provides electrical isolation between the third surface mirror reflector and a conductive material or element 719' that provides electrical conductivity between a rear or fourth surface contact 740b' and the second surface transparent conductor 718', as discussed below. The third surface mirror reflector may be disposed over the rest of the third surface 714a' except at the gap portion, leaving an area (such as about 1 to 2 cm long along the edge 714d') along the edge region 714d' that is devoid of the third surface mirror reflector.

The gap portion 714e' electrically isolates or insulates the third surface mirror reflector 720' from the outer perimeter region or edge 714d' of rear substrate 714' at the region or portion along the perimeter edge at which the gap portion is established. The perimeter seal 722' is disposed at and substantially fills in the gap portion 714e' to further electrically isolate or insulate the third surface mirror reflector 720' from the outer perimeter region or edge 714d' of rear substrate 714' and to obviate any electrical contact or shorting with the second surface conductive electrode. The gap 714e' may be formed or established by masking of the perimeter edge region 714d' during the coating/deposition process of the third surface mirror reflector 720', or the third surface mirror reflector may be disposed over substantially the entire third surface and the third surface mirror reflector may be removed at the gap region via deletion or ablation (or sand blasting or other suitable deletion/ablation means, such as laser ablation) of the third surface mirror reflector 720' at or near the perimeter edge region 714d', without affecting the scope of the present invention.

The front glass substrate 712' has a transparent electrical conductor 718' disposed on its rear or second surface 712a'. As shown in FIG. 28, a perimeter band 726' (which may comprise any suitable material, and preferably is a reflective perimeter band comprising a chromium reflective layer or the like) is disposed around the perimeter region of the rear surface of the front substrate 712', with the transparent electrical conductor 718' overlapping the perimeter band 726'. However, the transparent electrical conductor may be disposed over the rear surface of the front substrate and the perimeter band 726' may be disposed over the transparent electrical conductor, without affecting the scope of the present invention.

Reflective element 710' provides fourth surface electrical contacts or connectors 740a', 740b' (such as conductive epoxy or the like) at the rear surface 714b' of the rear substrate 714' for electrical connection to the third surface mirror reflector 720' and second surface transparent conductor 718', respectively. Reflective element 710' includes a fourth surface wraparound coating or coatings or layers 738' that is/are disposed over a portion of the rear surface 714b' of rear substrate 714' and that overlaps the wraparound portion 721' of the third surface mirror reflector 720'. In the illustrated embodiment, the fourth surface wraparound layer 738' comprises an environmentally stable stack of metallic conductive layers, such as a chromium layer 738a' and a ruthenium layer 738b' disposed over chromium layer 738a'. The wraparound portion 721' may extend over substantially the entire edge portion 714c' of the rear substrate 714' or may extend only partially over the edge portion 714c' (such as shown in FIG. 28), with the fourth surface wraparound portion 738' extending partially or entirely over the wraparound portion 721' so as to establish electrical conductivity between the wraparound portions 721' and 738'. The fourth surface wraparound coating 738' thus provides electrical conductivity between the fourth surface busbar or contact 740a' (such as conductive epoxy or the like disposed at the fourth surface of the reflective element and at a portion of the wraparound coating 738' at the fourth surface of the reflective element) and the third surface mirror reflector 720' via the substantial overlap at the perimeter edge region of the rear substrate 714'.

The electrical conductivity between the electrical contact 740b' at the fourth surface of the reflective element 710' and the second surface transparent conductor 718' may be established via a conductive element or material 719' (such as a conductive epoxy) disposed over a portion of the fourth surface 714b' and over the perimeter edge 714d' of the rear substrate and between the front and rear substrates so as to contact and establish electrical conductivity to the second surface transparent conductor 718' at the rear of the front substrate 712'. The conductive element or material 719' is disposed at the reflective element at the area or region that corresponds to the gap portion 714e' at which the third surface 714a' is devoid of the third surface mirror reflector material. Because the third surface mirror reflector 720' is not present at the gap portion 714e' at the third surface 714a' of the rear substrate (and the third surface mirror reflector terminates inboard or perimetally inward of the perimeter edge 714d' at the gap region 714e' and is within the seal region of the reflective element or cell at the gap region 714e'), the third surface mirror reflector 720' is substantially electrically insulated or isolated from the conductive epoxy 719' at the perimeter edge 714d'. The conductive element or material 719' is thus disposed at the portion or region of the reflective element that corresponds to the gap portion 714e' to provide electrical conductivity between the fourth surface contact 740b' and the second surface transparent conductor 718' at that portion, which may be about 1 to 2 cm (or thereabouts or more or less) along the perimeter edge regions of the substrates of the reflective element.

Optionally, and as shown in FIGS. 29 and 30, a reflective element assembly 810 (such as for an interior or exterior mirror assembly) includes a smaller front substrate 812 and a larger rear substrate 814, so that an overhang region 815 is defined or established by the perimeter region or regions of the rear substrate overhanging or extending beyond the perimeter region or regions of the front substrate 812. Similar to rear substrate 714', discussed above, rear substrate 814 include a third surface mirror reflector 820 (which may comprise any suitable third surface mirror reflector, such as a third surface transflective mirror reflector or the like). For example, the third surface mirror reflector 820 may be similar to the CAZ reflector described above, may include a layer 820a of environmentally stable metallic material, such as chromium or the like, disposed on the front surface of the rear substrate (i.e. the third surface of the electrochromic cell), and a layer or layers 820b of metal/transparent conductive material/materials over the chromium layer 820a. The third surface mirror reflector 820 includes a wraparound portion or tabout portion 821 that wraps around and overcoats a perimeter edge 814c of the rear substrate 814 to establish electrical conductivity between the third surface mirror reflector 820 and a fourth surface electrical contact 840a via a fourth surface wraparound portion or coating or layer 838, such as in a similar manner as discussed above (and which may comprise an environmentally stable stack of metallic conductive layers, such as a chromium layer 838a and a ruthenium layer 838b disposed over chromium layer 838a). The wraparound portion 821 may extend over substantially the entire edge portion 814c of the rear substrate 814 or may extend only partially over the edge portion 814c (such as shown in FIG. 29), with the fourth surface wraparound portion 838 extending partially or entirely over the wraparound portion 821 so as to establish electrical conductivity between the wraparound portions 821 and 838.

An electrochromic medium 816, such as an electrochromic solid polymer matrix (SPM) or other suitable electrochromic medium (such as a liquid or solid electrochromic medium), is disposed between the coated rear substrate 814 and a coated front substrate 812 (such as in a 110 μm interpane gap between the substrates and coatings/layers) and sealed within the interpane cavity via a perimeter seal 822 (such as an epoxy seal). The third surface mirror reflector 820 is disposed substantially over the entire third surface 814a except at a gap portion or isolating portion 814e at a portion of the third surface along and inboard or perimetally inward of the perimeter edge 814d (or in other words is disposed over the third surface with the perimeter portion masked during the deposition process) so as to define a gap or isolating portion 814e at the third surface 814a where the third surface mirror reflector is not disposed. The gap or isolating portion 814e may extend along the perimeter edge region about 1 to 2 cm (or thereabouts or more or less) and functions to electrically insulate or isolate the third surface mirror reflector from the perimeter edge-region and overhang region 815 of the reflective element at that portion of the edge region. The perimeter seal 822 is disposed at the gap portion and may overlap an edge portion of the third surface mirror reflector to further electrically insulate or isolate the third surface mirror reflector 820 from the perimeter edge region 814*d* of rear substrate 814. The third surface mirror reflector 820 may extend over substantially the entire third surface 814*a* except at the gap portion (and thus may extend to the perimeter edge 714*d* at other areas at either side of the gap portion), such that the gap portion may be established by masking a relatively small portion of the third surface during the deposition of the third surface mirror reflector materials on the third surface or front surface of the rear substrate.

The front glass substrate 812 has a transparent electrical conductor 818 (such as a coating or layer of ITO or the like) disposed on its rear or second surface 812*a*. As shown in FIG. 29, a perimeter band 826 (which may comprise any suitable material, such as chromium or the like) may be disposed around the perimeter region of the rear surface of the front substrate 812, with the transparent electrical conductor 818 overlapping the perimeter band 826. Optionally, however, the transparent electrical conductor may be disposed over the rear surface of the front substrate and the perimeter band may be disposed over the transparent electrical conductor, without affecting the scope of the present invention. The perimeter band 826 includes a wraparound portion or tabout portion 826*a* disposed over a perimeter edge 812*b* of front substrate 812 (such as about a 1 to 2 cm length or portion along the perimeter edge 812*b*), while the transparent electrical conductor 818 likewise includes a wraparound portion or tabout portion 818*a* that is disposed over (or could be under depending on the particular application) the wraparound portion or tabout portion 826*a* of perimeter band 826 at the perimeter edge 812*b* of front substrate 812. The tabout portions 818*a*, 826*a* are formed along a portion of the perimeter edge 812*b* of front substrate 812 that corresponds to the location of the gap portion 814*e* at the third surface 814*a* of rear substrate 814 when the substrates 812, 814 are juxtaposed, such that the third surface reflector 820 is not coincident with or opposing the tabout portion 818*a*, 826*a* of the second surface transparent conductor of the front substrate.

Thus, the perimeter metallic band 826 may be disposed around the entire perimeter region of the rear surface of the front substrate and the second surface transparent conductor 818 may be disposed over the entire second surface and over the metallic band. The second surface transparent conductor may also be disposed at a wrap around or tab out portion of one edge, such as only about 1 to 2 cm or thereabouts (or more or less) along one of the edges of the front substrate. The third surface mirror reflector may be disposed over the third surface (the front surface of the rear substrate) except at a corresponding portion or region of the front surface of the rear substrate that corresponds with or opposes the second surface transparent conductor tabout/wraparound portion when the substrates are juxtaposed. The third surface mirror reflector thus may be disposed over the front surface of the rear substrate with a mask portion or element only at the portion of the front surface that corresponds to and opposes the second surface transparent conductor tabout/wraparound portion of the front substrate.

A wraparound element or tabout element or portion 842 is disposed at the perimeter edge 814*d* of rear substrate 814 and at the gap portion 814*e* (such as about a 1 to 2 cm length or portion along the perimeter edge) of rear substrate 814 (and thus at a location along the perimeter edge that corresponds to the location of the tabout portion 826*a*, 818*a* at the front substrate 812 when the reflective element assembly is assembled together and the front and rear substrates are juxtaposed as shown in FIG. 29). As can be seen in FIG. 29, the tabout portion 842 may be disposed partially at the rear surface 814*b* of the rear substrate 814 to establish a fourth surface contact or busbar 840*b*, and the tabout portion 842 may be disposed partially at the front or third surface 814*a* of the rear substrate and at the region 814*e* that is devoid of the third surface reflector 820. Thus, electrical conductivity may be established between the fourth surface contact 840*b* at the fourth surface 814*b* of rear substrate 814 via a conductive element or material 819 (such as a conductive epoxy or the like) established or disposed at the overhang region 815 of the reflective element 810 (such as at the perimeter region 814*d* of the rear substrate 814 and the perimeter region 812*b* of the front substrate 812), and generally at a location along the perimeter edge region 814*d* that corresponds with the gap portion 814*e* and that corresponds with the location of the tabout portions 818*a*, 826*a* at the front substrate when the front and rear substrates are juxtapositioned next to one another. In the illustrated embodiment, the electrically conductive tab or wraparound coating or layer or element 842 is disposed over a portion of the rear surface 814*b* and perimeter region 814*d* and also partially over the perimeter gap region 814*e* of the front or third surface 814*a* of the rear substrate 814. The wraparound layer or element 842 is electrically isolated or insulated from the third surface mirror reflector 820 via the gap (or area at the third surface that is devoid of the third surface reflector 820) and the perimeter seal.

Thus, the conductive epoxy 819 disposed at the overhang region 815 contacts and establishes electrical conductivity to the second surface electrical conductor 818 via the wraparound portions 826*a*, 818*a* at perimeter edge 812*b* of front substrate 812, and may provide electrical conductivity to the fourth surface contact 840*b* via the wraparound element or tab or portion 842 at the corresponding location along the perimeter region of the third surface 814*a* of rear substrate 814. The wraparound portion 818*a* (comprising ITO or the like) is desirably disposed between the wraparound chromium portion 826*a* and the conductive epoxy 819 so that the conductive epoxy 819 does not directly contact the chromium perimeter band 826 and wraparound portion 826*a*. Optionally, the electrical conductivity between the wraparound portions 818*a*, 826*a* and the fourth surface contact 840*b* may be established by disposing a conductive material, such as conductive epoxy or the like, at the overhang region and further over the perimeter edge region 814*d* of the rear surface. Optionally, the electrical conductivity between the wraparound portions 818*a*, 826*a* and the fourth surface contact or bus bar 840*b* may be established by disposing a conductive material, such as a conductive epoxy or the like, at the overhang region and providing a metallic clip or element at the corresponding portion of the perimeter region of the rear substrate. For example, the conductive material or epoxy may be disposed at the overhang region 815 and over the perimeter region 814*d* and a metallic clip may be slid over the perimeter region while, the conductive epoxy is wet to establish electrical conductivity between the fourth surface portion of the clip and the conductive epoxy at the overhang region. Other means of establishing such electrical conductivity between the fourth surface of the larger rear substrate and the second surface wraparound portions at the smaller front substrate may be implemented without affecting the scope of the present invention.

As shown in FIGS. 30 and 30A, reflective element assembly 810 may be disposed at a mirror support or casing or housing or bezel 850 of an interior rearview mirror assembly 852. The bezel portion 850 may include a thin, substantially non-structural overlap 850*a* at the front surface of the front substrate 812, while the oversized rear substrate 814 is supported by a supporting portion 850*b* of the bezel portion 850, and thus takes substantially all of the load at the bezel portion 850. Such construction substantially reduces the stresses, such as hoop stresses, applied to the seal 822 and reflective element assembly 810 during assembly and construction of the mirror assembly, because the bezel primarily contacts the larger dimensioned rear substrate and preferably makes little or no contact to the smaller dimensioned front substrate. Further, such construction facilitates the use of a reduced reflective perimeter band 826, since the perimeter seal 822 is partially hidden or concealed by the thin overlap portion 850a of bezel portion 850. The size of the reflective band and the visibility or viewability or discernibility of the reflective band thus may be reduced. The overlap 850a may extend or overlap the front surface of the front substrate enough so as to at least partially and preferably substantially cover or conceal the perimeter seal 822. The electrical connection to the second surface transparent conductor thus may be made via an electrical connection at the fourth or rear surface of the rear substrate and outboard of the perimeter seal and thus hidden from view via the bezel portion 850.

Figure 30B:
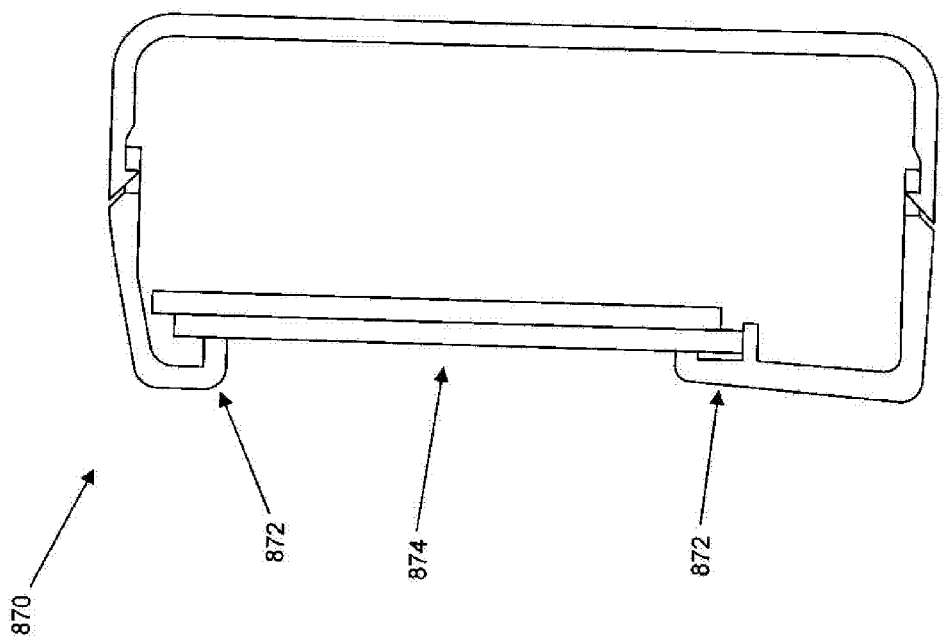
FIG. 30B is a partial sectional view of another mirror assembly in accordance with the present invention.

As can be seen with reference to FIGS. 30, 30A and 30B, the smaller front substrate reflective element construction of FIGS. 30 and 30A allows the bezel to substantially or primarily or entirely engage and support the reflective element at the rear substrate, while primarily not contacting the front substrate. The smaller front substrate reflective element construction thus allows for a smaller bezel overlap portion at the front of the reflective element, as compared to an offset reflective element construction as shown at 870 in FIG. 30B. In the mirror construction of FIG. 30B, a larger bezel 872 is used to contain the cell 874 and to cover up or conceal the perimeter seal of the cell. As shown in FIG. 30B, the reflective element may include a backing plate or structural support and the bezel portion may attach to or snap to a rear casing portion or cap portion or the like to assemble the mirror assembly, such as utilizing aspects described in PCT Application No. PCT/US2004/015424, filed May 18, 2004, and published Dec. 2, 2004 as PCT Publication No. WO 2004/103772 A3 (our file DON01 FP-1150 (PCT)), which is hereby incorporated herein by reference in its entirety.

For example, and as shown in FIG. 30A, the bezel overlap portion 850a may extend only about 1 mm over the front surface of the reflective element. As shown in FIG. 30A, the bezel 850 may include the overlap portion 850a that extends about 2 mm (such as about 2.33 mm as shown in FIG. 30A) from the rear substrate contact or support portion 850b so as to extend over the front surface of the reflective element about 1 mm or thereabouts (i.e., the 2.33 mm overlap portion extends over or across the overhang region 815 of the reflective element (which is illustrated as being about 1.33 mm) and further over the front surface of the reflective element about 1 mm). Although the dimensions described above are shown in FIG. 30A as being relative to the lower chin portion of the bezel portion, similar dimensioned bezel portions may be provided at the upper portion of the bezel. A backing plate or attachment plate 854 may be provided at the rear of the rear substrate 814 and may extend to the bezel portion 850, such as for securing the reflective element to or within the mirror assembly and/or for providing user inputs, such as buttons or switches or the like, or display elements or illumination sources or the like, at the bezel portion for viewing and/or access by a user or occupant of the vehicle.

The smaller front substrate reflective element construction of the present invention thus allows for a smaller or reduced bezel portion around the perimeter of the front surface of the front substrate, while providing substantial support and retention of the reflective element at the bezel. The electrical conductive connection to the transparent conductor at the rear of the front or first substrate may be made via wraparound elements and/or conductive elements or materials (such as conductive epoxy or the like), such as described above. Thus, the reflective element may be supported at the bezel with a reduced overlap bezel portion around the front perimeter of the reflective element, and while providing for electrical connection to the reflective element or cell at the fourth surface of the reflective element or cell. Electrical connection or conductive continuity may be made to the second surface transparent conductor on the smaller front substrate via the wraparound or tab out portion at the portion of the perimeter edge of the front substrate.

Figure 31:
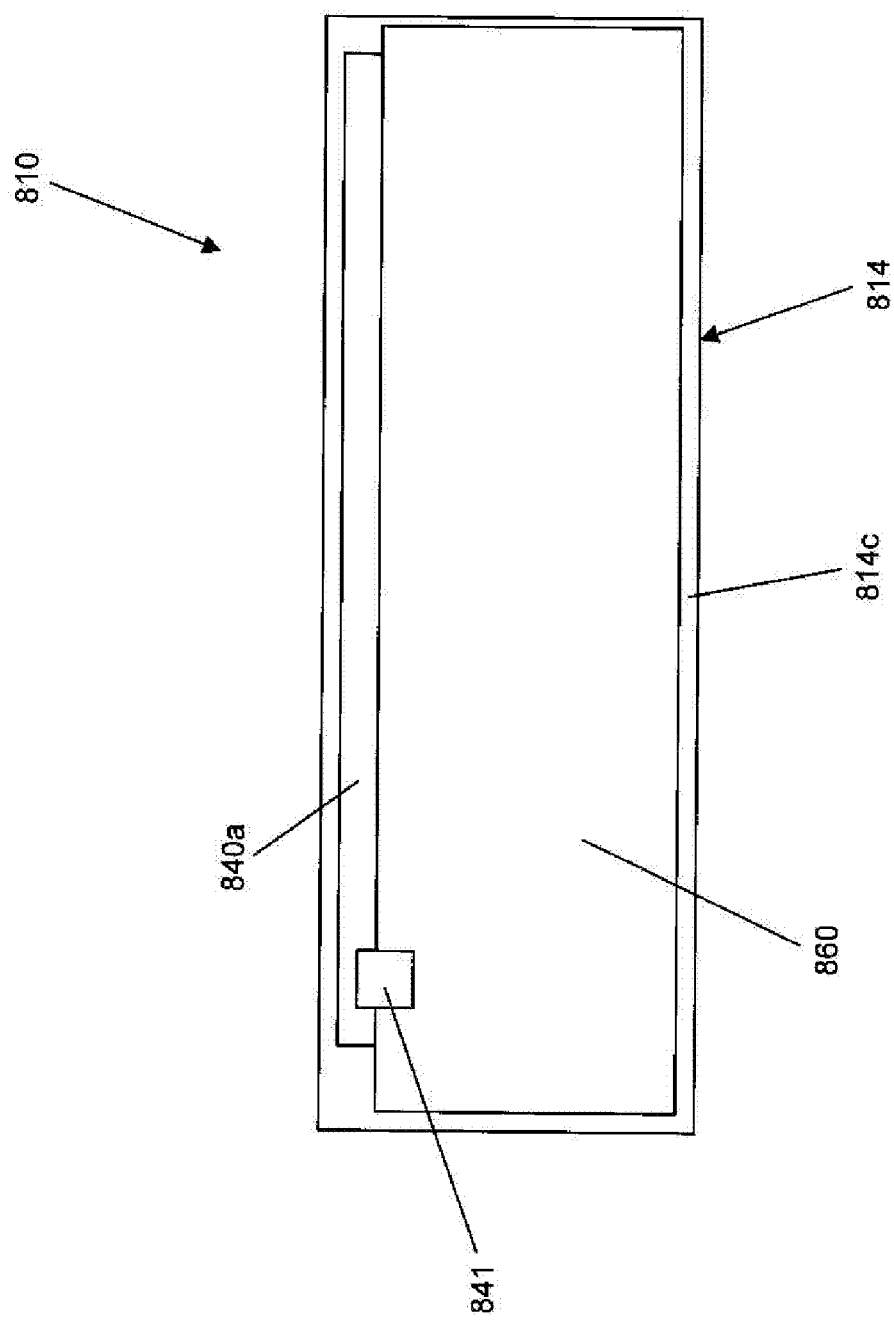
FIG. 31 is a rear plan view of a reflective element assembly of the present invention.

Optionally, and as shown in FIG. 31, an opaque paint or coating or layer 860 may be established or disposed at the rear surface 814b of the rear substrate 814 of the reflective element 810. In applications where the reflective element 810 is a transflective reflective element, the electrical contacts or tabs 841 at the rear of the reflective element may be viewable through the reflective element if they are positioned inboard of the perimeter seal and bezel portion. Thus, it is desirable to establish an opaque coating/layer 860, such as via printing or painting an opaque material or paint or ink or the like, onto the rear or fourth surface to substantially conceal the electrical contact or tab. The opaque coating/layer 860 may be screen printed or laser jet printed or ink jet printed or transfer printed, such as via booby printing or the like, or otherwise established across the fourth surface (or may be an opaque tape applied to the fourth surface) and partially over the fourth surface conductor or bus bar 840a (optionally, the opaque coating/layer 860 may be disposed onto the rear surface of the substrate and the fourth surface conductor 840a may be disposed partially over the opaque coating/layer). The electrical contact or tab 841 thus may be disposed at the fourth surface and partially over the opaque coating 860 and over or to or in conductive continuity with the fourth surface bus bar 840a, so that the tab 841 can extend into the viewing area for electrical connection without becoming visible through the reflective element. Optionally, the opaque layer may comprise a conductive material, whereby the tab may not be necessary that is formed or established in and through (or at least partially through) the opaque layer.

Optionally, the layer may be partially transmissive (so its mostly opaque (may be 3-5% T)) at least at a portion of the opaque or substantially opaque layer, and the mirror reflective element assembly could have an icon behind the layer, such as an opaque icon or the like. Thus, an illumination source may be located at the rear of the reflective element and may be activatable or energizable to backlight the logo or message or icon so it is viewable through the reflective element. The backlit logo or message or icon thus may be readily viewable or discernible by a person viewing the mirror reflective element.

For the third surface metallic reflectors, second surface metallic reflectors, second surface metallic reflective bands, second surface indicia reflective bands/indicia and/or fourth surface wrap-around metallic conductor layers (such as are described herein and/or disclosed in U.S. patent application Ser. No. 11/226,628, filed Sep. 14, 2005; Ser. No. 11/021,065, filed Dec. 23, 2004 by McCabe et al. for ELECTRO-OPTIC MIRROR CELL, now U.S. Pat. No. 7,255,451; and/or Ser. No. 11/334,139, filed Jan. 18, 2006 by Byers et al. for MIRROR ASSEMBLY WITH HEATER ELEMENT, now U.S. Pat. No. 7,400,435; and/or U.S. provisional application Ser. No. 60/644,903, filed Jan. 19, 2005 by Byers et al. for MIRROR ASSEMBLY WITH HEATER ELEMENT; Ser. No. 60/667,049, filed Mar. 31, 2005 by Byers et al. for MIRROR ASSEMBLY WITH HEATER ELEMENT; and/or Ser. No. 60/692,113, filed Jun. 20, 2005, which are hereby incorporated herein by reference in their entireties), thin film coatings formed preferably by sputtering of nickel-alloys or iron-alloys can be used.

For example, Inconel (a nickel-based superalloy such as Inconel alloy 600 which is 72 percent nickel, 16 percent chromium, and 8 percent iron) can be used. Other forms of Inconel can be used depending on the property required for a particular mirror construction/coating. For example, Inconel alloy 750, which has a small percentage of titanium and aluminum added for hardenability, can be used. Another example of a suitable material is Inconel 625, which contains molybdenum and columbium.

Another suitable nickel-alloy choice is HASTELLOY, which is a registered trademark name of Haynes International, Inc. The predominant alloying ingredient is typically nickel. Other alloying metals may be added to the nickel, including varying percentages of the elements molybdenum, chromium, cobalt, iron, copper, manganese, titanium, zirconium, aluminum, carbon, and tungsten. For example, for the third surface metallic reflectors, second surface metallic reflective bands and/or fourth surface wrap-around metallic conductor layers of the electrochromic mirrors described herein, thin film coatings may be deposited on the substrates involved by sputtering in a vacuum chamber from a Hastelloy C 276 or a Hastelloy X alloy planar magnetron or rotary magnetron sputtering target.

Another suitable choice is Nichrome, which is an alloy of nickel and chromium. Typically, the alloy is 80 percent nickel and 20 percent chromium. Nichrome, when sputter deposited as a conductive, metallic, reflective thin film of at least about 300 angstroms thickness has a specular reflectivity greater than about 60 percent reflectivity; and depending on the vacuum deposition conditions greater than about 65 percent reflectivity (as measured using SAE J964a). For example, good results can be achieved using a thin film of Nichrome [typically about 400-600 angstroms thick sputter-deposited onto the inward-facing surface (third surface) of the rear substrate in a laminate-type electrochromic mirror cell construction], and then overcoating this thin layer of Nichrome with a thinner layer (typically about 100-200 angstroms thick or thereabouts) of Rhodium to form a Nichrome/Rhodium third surface reflector. If Nichrome is also used as a wrap-around fourth surface conductor [or for the perimetal reflector band around the edge perimeter of the inward-facing surface (second surface) of the front substrate of the EC cell construction], contact resistance challenges sometimes experienced when a chromium thin film conductor layer is contacted to by some silver-loaded conductive epoxies are reduced/mitigated.

Another alloy choice for these third surface metal reflector, second surface indicia reflective bands/indicia and/or fourth surface conductor layers is a coating of Nickel Silver, which is an alloy of copper with nickel and often, but not always, zinc. Nickel-silver alloys are commonly named by listing their percentages of copper and nickel, thus "Nickel Silver 55-18" would contain 55 percent copper, 18 percent nickel, and 27 percent other elements, most probably entirely zinc. For example, a NS-12 Nickel-silver alloy, which is 88 percent copper and 12 percent nickel, may be used.

Another alloy choice for these third surface metal reflector, second surface indicia reflective bands/indicia and/or fourth surface conductor layers is a coating of Cupronickel which is an alloy of copper, nickel and strengthening impurities. A typical mix is 75 percent copper, 25 percent nickel, and a trace amount of manganese. A 55 percent copper/45 percent nickel alloy may also be used.

Another alloy choice for these third surface metal reflector, second surface indicia reflective bands/indicia and/or fourth surface conductor layers is a coating of Monel metal, which is a copper-nickel alloy. Monel is a metal alloy, primarily composed of nickel and copper, with some iron and other trace elements. Also, bronze (copper alloyed with tin), brass (copper alloyed with zinc), and nickel silver (another group of copper-nickel alloys) may be used.

Another alloy choice for these third surface metal reflector, second surface indicia reflective bands/indicia and/or fourth surface conductor layers is a coating of stainless steel which is a ferrous alloy with a minimum of 10.5 percent chromium, preferably with additions of more than 12 percent (by weight) chromium. For example, a thin film coating sputtered off a AL-6XN alloy target, which is a superaustenitic stainless steel which was developed by Allegheny Ludlum Corporation (www.alleghenyludlum.com), can be used. It exhibits far greater resistance to chloride pitting, crevice corrosion and stress-corrosion cracking than exhibited by the standard 300 series stainless steels, and is less costly than traditional nickel-base corrosion resistant alloys. The UNS Designation of the AL-6XN® alloy is N08367.

The high nickel (24 percent) and molybdenum (6.3 percent) contents of the AL-6XN® alloy give it good resistance to chloride stress-corrosion cracking. The molybdenum confers resistance to chloride pitting. The nitrogen content of AL-6XN® alloy serves to further increase pitting resistance and also gives it higher strength than typical 300 series austenitic stainless steels, and thereby often allows it to be used in thinner sections. The high levels of chromium, molybdenum and nitrogen in AL-6XN® alloy all serve to produce exceptional corrosion resistance for this formable and weldable stainless steel.

Another alloy choice for these third surface metal reflector, second surface indicia reflective bands/indicia and/or fourth surface conductor layers is a coating of Chinese silver, which is an alloy made of silver, nickel and bronze, such as used for jewelry or a coating of a Ferroalloy that constitutes various alloys of less than 50 percent iron and one or more other element, manganese or silicon for example. The main Ferroalloys are: ferromanganese, ferrochromium, ferromolybdenum, ferrotitanium, ferrovanadium, ferrosilicon, ferroboron, and ferrophosphorus.

Another alloy choice for these third surface metal reflector, second surface indicia reflective bands/indicia and/or fourth surface conductor layer is a coating of German silver that is an alloy of 45-70 percent copper, 5-30 percent nickel, and 8-45 percent zinc—sometimes small amounts of tin or lead are added. It has a color resembling silver. Other names are Nickel silver, Pakfong (also Paktong) and Alpacca (originally a trademark of Berndorf AG).

Another alloy choice for these third surface metal reflector, second surface indicia reflective bands/indicia and/or fourth surface conductor layer is a coating of a titanium alloy such as a Grade F-5 titanium alloy (6 percent aluminum, 4 percent vanadium); Grade F-6 titanium alloy (5 percent aluminum, 2.5 percent tin); a titanium/palladium alloy; Grade F-12 titanium alloy (0.3 percent molybdenum, 0.8 percent nickel).

Another alloy choice for these third surface metal reflector, second surface indicia reflective bands/indicia and/or fourth surface conductor layer is a coating of a manganese alloy, such as a manganese-copper or a manganese-iron or a manganese-gold alloy. Another alloy choice for these metal reflector and/or conductor layers is a coating of a molybdenum alloy, such as a 52 percent molybdenum/48 percent rhenium alloy or a 99 percent Mo, 0.5 percent Ti and 0.08 percent Zr alloy (commonly known as a TZM alloy).

Another alloy choice for these third surface metal reflector, second surface indicia reflective bands/indicia and/or fourth surface conductor layer is Sterling silver, which is an alloy of silver containing least 92.5 percent pure silver and 7.5 percent other metals, usually copper. In Sterling silver, the silver is usually alloyed with copper to give strength. Other metals can replace the copper. For example, a thin film coating formed by sputter deposition from a Silver/Germanium alloy target can be used.

Another alloy choice for these third surface metal reflector, second surface indicia reflective bands/indicia and/or fourth surface conductor layer is an aluminum alloy, such as Duralumin which is an alloy of aluminum (about 95 percent), copper (about 4 percent), and small amounts of magnesium (0.5 percent to 1 percent) and manganese (less than 1 percent). When sputter deposited to form a thin film metallic conductor reflector/electrode layer, such aluminum alloy thin films may optionally be overcoated with a thin film of a transparent conductor (such as of indium tin oxide) that is thus disposed between the aluminum-based reflector layer and the electrochromic medium in the electrochromic cell construction (and thus protecting the aluminum-based reflector layer from direct contact with the electrochromic medium).

Another alloy choice for these third surface metal reflector, second surface indicia reflective bands/indicia and/or fourth surface conductor layer is Stellite, which is a range of cobalt-chromium alloys designed for wear resistance. It may also contain tungsten and a small but important amount of carbon.

Another alloy choice for these third surface metal reflector, second surface indicia reflective bands/indicia and/or fourth surface conductor layer is Billon, which is an alloy of silver (sometimes gold) with a high base metal content (such as copper) or a silver alloy such as a silver-palladium alloy.

Another alloy choice for these third surface metal reflector, second surface indicia reflective bands/indicia and/or fourth surface conductor layer are copper-zinc-aluminium alloys or nickel-titanium (NiTi) alloys, such as the nickel-titanium alloy available under the trade name Nitinol (an acronym for Nickel Titanium Naval Ordnance Laboratories).

Another alloy choice for these third surface metal reflector, second surface indicia reflective bands/indicia and/or fourth surface conductor layer are tungsten alloys with tungsten content ranging from 40 to 97 percent featuring varying degrees of physical and mechanical properties; examples include W—Fe, W—Cu and W—Co alloys.

Another alloy choice for these third surface metal reflector, second surface indicia reflective bands/indicia and/or fourth surface conductor layer are palladium alloys, such as palladium-rhodium alloys.

Another alloy choice for these third surface metal reflector, second surface indicia reflective bands/indicia and/or fourth surface conductor layer are indium alloys, such as indium-bismuth-tin alloys or lead-indium alloys or tin-indium alloys.

Another alloy choice for these third surface metal reflector, second surface indicia reflective bands/indicia and/or fourth surface conductor layer are zinc alloys, such as with copper or magnesium or nickel.

Another alloy choice for these third surface metal reflector, second surface indicia reflective bands/indicia and/or fourth surface conductor layer is Brass, which is an alloy of copper and zinc. Some types of brass are called bronzes, despite their high zinc content. Alpha brasses (with less than 40 percent zinc) or Beta brasses, with a higher zinc content, can be used, depending on the circumstance involved. White brass, with more than 45 percent zinc, can also be used when it delivers the desired property.

Another alloy choice for these third surface metal reflector, second surface indicia reflective bands/indicia and/or fourth surface conductor layer is a rhenium alloy, such as a molybdenum-rhenium or a tungsten-rhenium alloy.

Another alloy choice for these third surface metal reflector, second surface indicia reflective bands/indicia and/or fourth surface conductor layer is a gold alloy such as an ELKONIUM® 76 gold-copper alloy or an ELKONIUM® 70 gold-silver-nickel alloy or a gold-palladium-nickel alloy or a gold-copper alloy or a gold-copper-nickel alloy or a gold-indium alloy or gold-nickel alloy or a gold-tin alloy.

Another alloy choice for these third surface metal reflector, second surface indicia reflective bands/indicia and/or fourth surface conductor layer is a platinum alloy, such as with cobalt, or with copper or with iridium (for example, Pt70/Ir30) or with palladium or with rhodium or with gallium or with ruthenium or with tungsten or with indium.

Another alloy choice for these third surface metal reflector, second surface indicia reflective bands/indicia and/or fourth surface conductor layer is a rhodium alloy, such as with iron or platinum (for example, Pt90/Rh10 or Pt87/Rh13).

Another alloy choice for these third surface metal reflector, second surface indicia reflective bands/indicia and/or fourth surface conductor layer is a cobalt alloy, such as with iron or nickel.

Another alloy choice for these third surface metal reflector, second surface indicia reflective bands/indicia and/or fourth surface conductor layer is a copper alloy, such as with tin or nickel or lead. Examples include Phosphor Bronze, Gun Metal, Tin Bronze, Leaded Bronze and Nickel Bronze.

Another alloy choice for these third surface metal reflector, second surface indicia reflective bands/indicia and/or fourth surface conductor layer are superalloys, such as PM200 available from Plansee AG of Reutte, Austria, and having a composition in weight percentage: 20 Cr, 5.5 Al, 0.5 Ti, 0.3 Al, 0.5 $Y_2O_3$, remainder Fe. The Plansee PM 2000 is a highly oxidation resistant and extremely creep resistant ferritic iron-chromium based alloy, due to its high content of aluminum and chromium.

Another alloy choice for these third surface metal reflector layers, second surface indicia reflective bands/indicia layers and/or fourth surface conductor layers are tantalum alloys, such as tantalum-tungsten alloys and tantalum-niobium alloys. Another alloy choice for these metal reflector and/or conductor layers are niobium alloys or zirconium or iridium alloys or osmium alloys or ruthenium alloys or lead alloys or beryllium alloys or tin alloys.

Alloys formed of tin and lead with other metal elements and non-metal elements (such as phosphorous or silicon or carbon) may be used where the coating properties suit the particular electrochromic cell structure/performance desired.

Another alloy choice for these third surface metal reflector, second surface indicia reflective bands/indicia and/or fourth surface conductor layer is a magnesium alloy, such as Magnesium-manganese; Magnesium-aluminum-manganese; Magnesium-aluminum-zinc-manganese; Magnesium-zirconium; Magnesium-zinc-zirconium; Magnesium-rare earth metal-zirconium; Magnesium-silver-rare earth metal-zirconium; and/or Magnesium-yttrium-rare earth metal-zirconium.

Metal reflector layers and/or indicia layers and/or conductor layers may also be sputter (or otherwise) deposited from metal targets such as from a chromium metal target, or from a nickel metal target or from a tungsten metal target or from a ruthenium metal target or from a titanium metal target or from a molybdenum metal target or from a cobalt metal target or from a manganese metal target or from a silver metal target or from an aluminum metal target or from a platinum metal target or from a palladium metal target or from a gold metal target or from a rhenium metal target or from a rhodium metal target or from a tantalum metal target or from a niobium target or from a zirconium target or from an iridium target or from an osmium target or from a lead target or from a beryllium target or from a zinc target or from a tin target or from an indium target or from a target that is a mixture of one or more of these metals (optionally with other metallic and/or non-metallic elements included). In general, improved results in terms of making contact thereto, such as via a conductive epoxy (such as lower, stabler contact resistances), are obtained for metal reflector and/or conductor layers by using metals or alloys that have a low Gibbs Energy of formation of metal oxides as the sputter target (or evaporation material) for vacuum deposition of thin metallic layers. For example, deposited thin films of palladium or nickel or tungsten or molybdenum or rhodium have a low Gibbs Energy of formation of metal oxides compared to, for example, thin films of aluminum or chromium.

The choice of alloy or metal reflector and/or conductor layer to use is dependent on the reflectivity level and spectral content desired (for example, whether a silvery reflectivity is desired or whether a more copper-toned reflectivity is desired) and by the electrical properties (such as specific conductivity of the deposited thin film) and/or optical properties (such as the optical constants such as refractive index and k-value) desired for the deposited thin metallic film and/or by the sputtering rate/evaporation rate desired in the production process and/or by the cost bearable by the construction involved.

Also, when sputtering or otherwise vacuum depositing the metal reflector and/or conductor layers of the present invention from an alloy or mixed-metal target or source, the elemental composition/structure of the target/source is preferably substantially replicated in the deposited metallic thin film coating or layer but need not be exactly replicated.

Also, and as described previously above and optionally, the third surface metal reflector on the third surface of the rear substrate of the cell, the perimeter reflective border band around the edge border of the second surface of the front substrate and any indicia on the second surface but inward of the border band (if present) may be substantially the same material so that all three have substantially the same optical properties such as reflectivity level and refractive index/k-value. By so choosing, the optical contrast between the third surface reflector coating and the second surface perimeter border is substantially reduced and essentially eliminated such that the viewer barely sees or notices the presence of the second surface border band when the electrochromic cell is not powered (i.e. is undimmed and is in its bleached state). For example, the third surface reflector coating and the second surface perimetal border reflector band may both comprise chromium thin films or both may comprise ruthenium thin films or both may comprise rhodium thin films or both may comprise Hastelloy C-276 thin films or both may comprise molybdenum thin films or both may comprise aluminum (or aluminum alloy) thin films or both may comprise aluminum/palladium alloy thin films or both may comprise silver (or silver alloy) thin films or both may comprise an ITO/thick Ag (preferably greater than about 200 angstroms physical thickness; more preferably greater than about 250 angstroms thickness and most preferably greater than about 300 angstrom thickness)/ITO stack or a ZnAlO/thick Al/ZnAlO stack or a ZnAlO/thick Ag/ZnAlO stack or an SnO2/Ag/SnO2 stack or the like.

Figure 32:
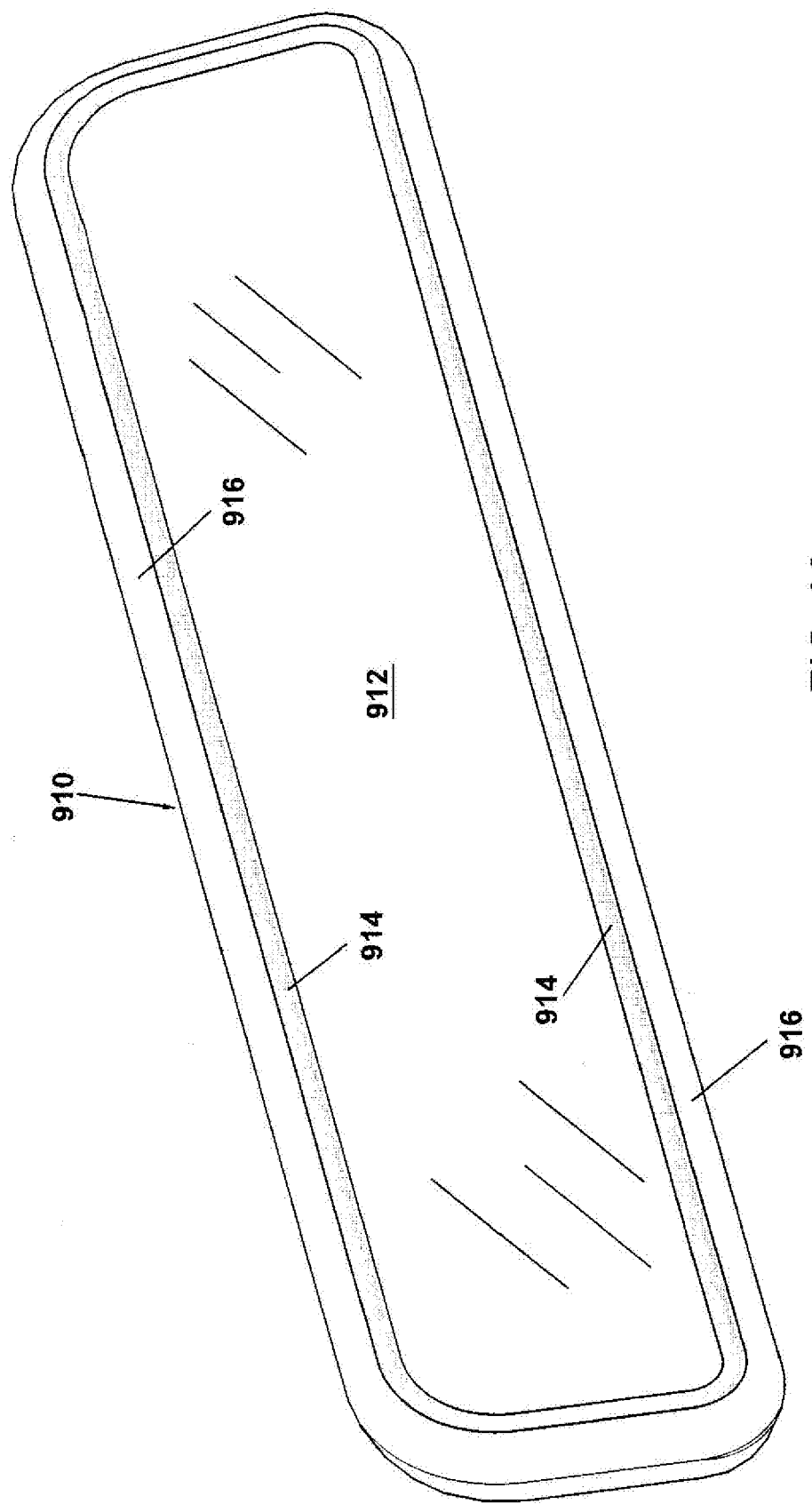
FIG. 32 is a perspective view of another mirror reflective element assembly in accordance with the present invention.

Optionally, it may be desirable to select a bezel for a mirror assembly that has a material or color or appearance or construction or reflectance character that matches or accentuates or complements the reflective surface of the interior mirror (or exterior minor) reflector, and particularly for an interior EC mirror element that uses a reflecting perimeter border band or coating (such as disclosed in U.S. patent application Ser. No. 11/021,065, filed Dec. 23, 2004 by McCabe et al. for ELECTRO-OPTIC MIRROR CELL, now U.S. Pat. No. 7,255,451; Ser. No. 10/528,269, filed Mar. 17, 2005, now U.S. Pat. No. 7,274,501; Ser. No. 10/533,762, filed May 4, 2005, now U.S. Pat. No. 7,184,190; Ser. No. 11/226,628, filed Sep. 14, 2005; and/or Ser. No. 11/021,065, filed Dec. 23, 2004 by McCabe et al. for ELECTRO-OPTIC MIRROR CELL, now U.S. Pat. No. 7,255,451, which are hereby incorporated herein by reference in their entireties) in a flush or frameless EC mirror cell construction. The bezel of the mirror casing and the perimeter metal band around the perimeter of the reflective element are preferably selected so as to mutually pick up on or complement each other so as to enhance the appearance and utility of the mirror assembly. The mirror assembly thus may include the use of a metal (or metal-like or metal-coated) bezel that can pick up on or complement the frameless character of the mirror element, and give the minor assembly a metal-look functionality. For example, and as shown in FIG. 32, a mirror assembly 910 includes a mirror reflective element 912 having a perimeter metallic band 914 (with a metallic or silvery appearance or color). The minor assembly 910 includes a bezel portion 916 that is selected to substantially match or contrast the color or appearance or reflectance of the perimeter metallic band 914. In the illustrated embodiment, the perimeter band has a silvery appearance or color, and the bezel portion 916 is selected to have a silver or chrome appearance or color or reflectance. Thus, for reflective elements with metallic perimeter bands (or other mirror reflector types), the bezel portion may comprise a metallic material (such as a silvery or brass-like metal stamping or forming or a chromed or metal-coated plastic molding) so as to have a metallic or metal-like appearance. The bezel portion thus picks up or complements the perimeter band of the mirror reflective element (or the mirror reflector itself) so as to provide an aesthetically pleasing mirror assembly. Although shown in FIG. 32 as an interior rearview mirror assembly, the mirror assembly may comprise an exterior rearview mirror assembly utilizing similar principles. Thus, a retro-look or high-tech look can be imparted to the mirror assembly and the look to the driver or occupants of the vehicle of the bezel can blend in with the look of the mirror reflective element itself.

Optionally, the mirror assembly may include one or more displays, such as for the accessories or circuitry described herein. The display or displays may be similar to those described above, or may be of the types described in U.S. Pat. Nos. 5,530,240 and/or 6,329,925, which are hereby incorporated herein by reference in their entireties, or may be display-on-demand or transflective type displays or other displays, such as the types disclosed in U.S. Pat. Nos. 6,690,268; 5,668, 663 and/or 5,724,187, and/or in U.S. patent application Ser. No. 10/054,633, filed Jan. 22, 2002 by Lynam et al. for VEHICULAR LIGHTING SYSTEM, now U.S. Pat. No. 7,195,381; Ser. No. 11/021,065, filed Dec. 23, 2004 by McCabe et al. for ELECTRO-OPTIC MIRROR CELL, now U.S. Pat. No. 7,255,451; Ser. No. 10/528,269, filed Mar. 17, 2005, now U.S. Pat. No. 7,274,501; Ser. No. 10/533,762, filed May 4, 2005, now U.S. Pat. No. 7,184,190; Ser. No. 10/538, 724, filed Jun. 13, 2005 by Hutzel et al. for ACCESSORY SYSTEM FOR VEHICLE; Ser. No. 11/226,628, filed Sep. 14, 2005 by Karner et al.; Ser. No. 10/993,302, filed Nov. 19, 2004, now U.S. Pat. No. 7,338,177; and/or Ser. No. 11/284,543, filed Nov. 22, 2005, now U.S. Pat. No. 7,370,983, and/or PCT Application No. PCT/US03/29776, filed Sep. 9, 2003 by Donnelly Corp. et al. for MIRROR REFLECTIVE ELEMENT ASSEMBLY; and/or PCT Application No. PCT/US03/35381, filed Nov. 5, 2003 by Donnelly Corp. et al. for ELECTRO-OPTIC REFLECTIVE ELEMENT ASSEMBLY; and/or U.S. provisional application Ser. No. 60/630,061, filed Nov. 22, 2004 by Lynam et al. for MIRROR ASSEMBLY WITH VIDEO DISPLAY; Ser. No. 60/667,048, filed Mar. 31, 2005 by Lynam et al. for MIRROR ASSEMBLY WITH VIDEO DISPLAY; Ser. No. 60/629,926, filed Nov. 22, 2004 by McCabe et al. for METHOD OF MANUFACTURING ELECTRO-OPTIC MIRROR CELL; Ser. No. 60/531,838, filed Dec. 23, 2003; Ser. No. 60/553,842, filed Mar. 17, 2004; Ser. No. 60/563,342, filed Apr. 19, 2004; Ser. No. 60/681,250, filed May 16, 2005; Ser. No. 60/690,400, filed Jun. 14, 2005; Ser. No. 60/695,149, filed Jun. 29, 2005; Ser. No. 60/717,093, filed Sep. 14, 2005 by Lynam; Ser. No. 60/730,334, filed Oct. 26, 2005 by Baur for VEHICLE MIRROR ASSEMBLY WITH INDICIA AT REFLECTIVE ELEMENT; Ser. No. 60/732,245, filed Nov. 1, 2005; and/or Ser. No. 60/759,992, filed Jan. 18, 2006 by Weller et al. for INTERIOR REARVIEW MIRROR ASSEMBLY WITH DISPLAY, and/or PCT Application No. PCT/US03/40611, filed Dec. 19, 2003 by Donnelly Corp. et al. for ACCESSORY SYSTEM FOR VEHICLE, which are all hereby incorporated herein by reference in their entireties, or may include or incorporate video displays or the like, such as the types described in PCT Application No. PCT/US03/40611, filed Dec. 19, 2003 by Donnelly Corp. et al. for ACCESSORY SYSTEM FOR VEHICLE, U.S. patent application Ser. No. 10/538,724, filed Jun. 13, 2005; and/or Ser. No. 11/284,543, filed Nov. 22, 2005, now U.S. Pat. No. 7,370,983, and/or U.S. provisional application Ser. No. 60/630,061, filed Nov. 22, 2004 by Lynam et al. for MIRROR ASSEMBLY WITH VIDEO DISPLAY; and Ser. No. 60/667,048, filed Mar. 31, 2005 by Lynam et al. for MIRROR ASSEMBLY WITH VIDEO DISPLAY, which are hereby incorporated herein by reference in their entireties.

Optionally, the mirror assembly and/or reflective element assembly (such as a transflective electro-optic or non-electro-optic mirror reflective element) may include or may be associated with a rearwardly facing video display screen, such as a video display screen positioned at and behind the fourth surface of the reflective element and operable to emit light through the reflective element so as to be viewable to a driver of the vehicle when actuated. Typically, the intensity of the display is maximized during daytime operation (such as bright ambient light conditions) to reduce or limit washout of the display. However, at night, the intensity may be reduced, such as via photo-sensor control or by applying a reduced voltage when vehicle logic adapts an instrument panel dimmed illumination state. Accordingly, visibility of the display at night (i.e., during low or reduced ambient light conditions) is readily accomplished for such displays as the intensity of the display emission can be readily reduced by applying a reduced voltage compared to that applied when the display intensity is maximized during daytime driving. However, when an electro-optic (such as electrochromic) reflective element is dimmed or darkened at night in response to a detected glaring headlight condition, it may be desirable to re-brighten the intensity of the display (such as a navigation display or the like) to compensate for the reduced transmission through the electro-optic medium and thus enhance visibility and discernibility of the display through the darkened or dimmed reflective element, such as by utilizing aspects of the system described in U.S. Pat. Nos. 5,285,060 and 5,416,313, which are hereby incorporated herein by reference in their entireties. Also, when the electro-optic medium is dimmed, such dimming may introduce a spectral characteristic or tint at the display and/or may impact the color rendition and/or color balance of a displayed color video image. Thus, and as described below, it may be desirable to avoid actuation and hence darkening/dimming of the electro-optic medium local to and in front of where the video display is disposed behind the reflective element.

Figure 33:
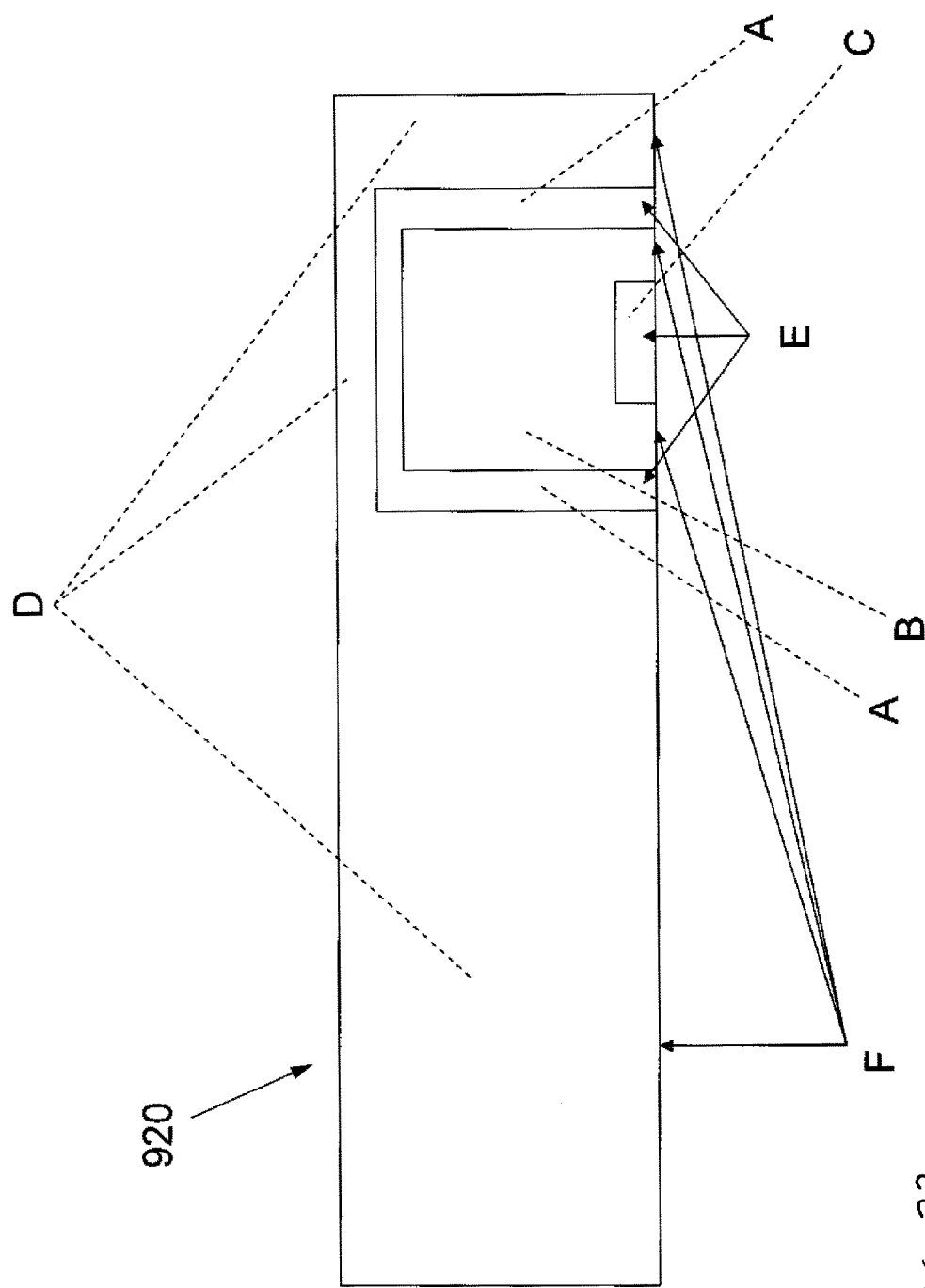
FIG. 33 is front plan view of another mirror reflective element assembly in accordance with the present invention.

For backup applications, such as a display that displays a rearward view at the rear of the vehicle, such as in conjunction with reverse aid or backup systems, such as a display that emits a video image of the rearward scene in response to a rearward facing video camera, the electro-optic mirror element may function in association with a reverse inhibit function (where the dimming of the electro-optic reflective element is inhibited when the reverse gear of the vehicle is engaged, such as described in U.S. Pat. Nos. 6,992,573; 6,590,193; 6,547,404; 6,305,807; 6,089,721; and 5,812,321, which are hereby incorporated herein by reference in their entireties), whereby the mirror reflective element is forced to and maintained in its day state when the vehicle is shifted into its reverse gear. In such backup or rear vision system applications, it may be desirable to locally dim the electro-optic medium in front of where the display is located behind the reflective element. Alternatively, and in particular applications, preferably, an electro-optically dimmed or darkened frame may be electro-optically created adjacent to and around where the video display is disposed (behind the reflective element) so as to frame the display for enhance viewability and discernibility of the display at and behind the reflective element. For example, and with reference to FIG. 33, a reflective element assembly 920 may be segmented into a primary reflective element viewing area or region D and a video display viewing area or region B, with the video display viewing area B at least partially surrounded or framed by a framing area or portion or region A.

Optionally, a lower frame portion or area or region C may be provided along the lower portion of the video display viewing area B, with a pair of leg portions of the video display viewing area B extending to the perimeter of the reflective element 920 at opposite sides of lower frame portion C and between lower frame portion C and frame portion A. The size or length of frame portion or region C may be selected depending on the desired or appropriate size or width of the legs of display area B, since the legs provide the conductive path to display area B and the electric flow to display area B may be reduced as the legs are made more narrow. Optionally, the reflective element may have a perimeter border band (such as described above), and the lower frame portion may not be readily viewable at the lower perimeter band, such that the reflective element may not include such a lower frame portion.

The different portions or areas or regions A, B, C, D are defined by demarcation lines or deletion lines through at least one or some of the conductive coating or coatings of the reflective element 920 so as to electrically isolate one region from another and so as to enable electrical powering, and hence local actuation and dimming, of the electro-optic medium at each particular segment or region separate from the others. The demarcation lines are formed to electrically isolate the adjacent regions, while being sufficiently thin so as to be largely unnoticeable to the viewer of the mirror element.

Preferably, the deletion lines are formed through the transparent conductive layer (such as ITO or the like) disposed on the second surface or rear surface of the front substrate of an electro-optic reflective element, such as by laser ablating or deleting thin lines along the second surface to define the desired viewing portions. Optionally, the deletion lines may be formed in and through the third surface reflector coatings or layers, but such deletion lines in the third surface reflector may be more readily visible or discernible than deletion lines formed through the second surface transparent conductive coating or layer.

Thus, during normal dimming or anti-glare operation of the reflective element 920, all of the regions A, B, C, D are powered to dim the viewable area of the reflective element. Optionally, the reflective element may be selectively dimmed, such as by dimming or darkening regions A and C (such as by powering contacts or electrodes at E and grounding or shorting contacts or electrodes at F) so as to provide a darkened frame around the video display and display area B. Such selective dimming may occur in response to the vehicle being shifted into its reverse gear. Such a frame enhances the viewability of the display by drawing the driver's eyes to the display area B when the frame is dimmed and the other viewing regions are not. Optionally, either the main or principle viewing/reflecting area D or the display area B may be dimmed while the other is un-dimmed or unpowered, in order to provide the desired reflectivity and viewability of the reflective element and display, depending on the particular application and desired appearance and function of the reflective element assembly.

In this manner, the presence and viewability of a video image displayed on such a video display/screen disposed behind a transflective electrochromic mirror element may be enhanced even during usage by day under higher ambient lighting (sunny) conditions where display wash-out can be a problem. The localized darkening of the EC medium local to and at least partially framing (preferably, substantially or wholly framing) the portion of the EC mirror element where the video screen is disposed during daylight operation as described above helps draw the driver's attention and focus to the potentially faint/washed-out video image (such as a reversing back-up scene) and helps the driver distinguish this from the much brighter reflected image from the mirror reflector at other than where the video display is disposed.

This discrimination can be further augmented by increasing the intensity of display backlighting and or provision of additional lighting at but just beyond the border peripheral edges of the display element so that a ring or at least a partial frame of intense light can be seen by the driver that at least partially frames where the video screen is located (and so draws his/her attention and eye-focus to that location). Such an intense-light created frame or the like can be also used with a conventional fixed reflectance transflective mirror element (such as a transflective day/night prismatic mirror element)/video display as described above [with or without demarcation lines being ablated, such as by laser ablation, into the mirror reflector's coating(s)]. Such a ring or frame of intense light may be created, for example, by disposing behind the mirror element a number of intense light sources (such as LEDs or diode lasers or cold cathode tubes) that at least partially circumscribe the video display element at the rear of the mirror reflector, but that are located close to but just outside the display element itself so that the light emitted by such, for example, LEDs does not pass through (and so be attenuated by) the display element itself (typically, an LCD video display element). For example, a linear row of a plurality of LEDs, such as 3-6 LEDs or more, can be positioned along (but just outside) the top edge, along the bottom edge, along the right edge and/or along the left edge, so as to frame the location of the video display via emitting intense light through the transflective reflector of such a DOD transflective, electrochromic or non-electrochromic (conventional) through-the-reflector video mirror.

Optionally, the likes of light pipes/light conduits and light distributors/diffusers (such as are common in the art) can be used in conjunction with an LED or a couple of LEDs or a plurality of LEDs in creating such a frame of intense light that at least partially frames the video display image so that its visibility and viewability to the driver is enhanced during daylight operation and so that the driver can better discern and focus on the video image being displayed, even under wash-out conditions. Optionally, the likes of photosensors can be used to adjust the intensity of such framing light sources (that preferably are LEDs but that alternatively can be a cold-cathode tubular light source, such as light sources of the types described in U.S. provisional application Ser. No. 60/732, 245, filed Nov. 1, 2005; and Ser. No. 60/759,992, filed Jan. 18, 2006, which are hereby incorporated herein by reference in their entireties, or can be any other suitable intense light source, such as a diode laser light source or a high-intensity incandescent light source) in accordance with prevailing ambient light conditions (and so that at night, intensity is reduced but by day, intensity is increased in accordance with an increase in ambient lighting detected). Note that it may be preferable to use a red or any other selected spectral intensity/color for the ring or frame of intense light created around the video image so that the demarcation creates both spectral demarcation and light intensity demarcation relative to the light intensity and spectral character of the video image itself.

Typically, it is desirable to substantially render unnoticeable or camouflage the presence of the video display (such as a liquid crystal display (LCD) video display or the like) that is disposed behind a transflective mirror element, such as a transflective mirror element that is at least about 10 percent transmissive of light therethrough and preferably about 20 percent transmissive. It is known to use a dark or black tape (or other suitable darkening or opacifying materials or layers, such as dark paint or ink or the like) to black out or opacify the areas where the display is not present, so that the presence of the display is not readily discernible to a person viewing the reflective element. However, this may lead to the joint lines between the tape and the display being visible or discernible, and even with such opacifying means, the outline of the display or display area may be noticeable to the driver, particularly during high ambient lighting conditions, such as during daytime driving conditions.

Optionally, a video display framing element or pocket may be provided as follows that is surprisingly effective in rendering the presence behind a transflective mirror element (and an interior prismatic transflective mirror element in particular) of the un-illuminated video screen non-noticeable. A piece of metal shim stock, such as stainless steel (such as a sheet or shim of stainless steel having a thickness of about 0.01 inches to about 0.02 inches or thereabouts) or the like, may be laser cut to match the shape of the prism or reflective element. The shim stock stainless steel substrate may have a window formed or laser cut therefrom that matches or substantially matches the size and shape of the active area of the display screen. Desirably, the color, reflectance and gloss of the shim stock substrate is selected to substantially match the OFF condition of the video display screen. The video display screen may be located at and behind the window of the shim stock substrate, and may be secured or adhered or glued or fastened in place at the window. The display element and shim stock substrate assembly may be located at or attached to the reflective element and behind the display on demand (DOD) reflective element.

The presence and location of the video display is thus substantially camouflaged or hidden or non-discernible so that it may be difficult to identify or discern the location of the video display when viewing the reflective element. The display assembly (including the shim stock plate or substrate and display element attached thereto) may be attached or adhered to the rear of the reflective element, such as to the rear of a backing plate of the reflective element or to the rear surface of a prismatic reflective element substrate or prism. Optionally, the display assembly may be attached or adhered to the rear surface of a prismatic reflective element substrate, such as an aluminum and silicon layered transflective prism, such as a prismatic substrate or element utilizing aspects of the mirrors described in U.S. Pat. Nos. 6,286,965; 6,196,688; 5,535,056; 5,751,489; and 6,065,840, and/or in U.S. patent application Ser. No. 10/993,302, filed Nov. 19, 2004 by Lynam for MIRROR REFLECTIVE ELEMENT FOR A VEHICLE, now U.S. Pat. No. 7,338,177, which are all hereby incorporated herein by reference in their entireties.

Optionally, a non-electro-optic transflective or display-on-demand (DOD) mirror element, such as a transflective prismatic mirror element, may be formed using a transflective DOD coating or coating stack on its second surface. Preferably, the coating or coating stack may comprise a coating comprising silicon or doped-silicon, such as silicon-aluminum mirror stack (with high silicon content) deposited onto the substrate surface. Such a silicon or doped-silicon coating may provide about 70 percent or more reflectivity of light incident thereon, while providing at least about 10 percent or more transmission of light therethrough, typically at least 20 percent or more transmission. The reflectivity from such a silicon-based coating may provide a silvery appearance and may provide enhanced durability to the substrate surface. Such a silicon-based mirror stack may be suitable for a transflective display on demand (DOD) prismatic substrate, such as for an interior or exterior rearview mirror assembly. Such a transflective silicon-based mirror element is suitable for use with a video display located behind the mirror so as to display video images at the mirror element for viewing by the driver of the vehicle. Alternately, similar silicon-based transflective mirror elements can be formed for exterior or outside mirror elements, such as flat, convex or aspheric elements (optionally, with the transflective layers on the front or first surface or on the rear or second surfaces, such as is known in the exterior mirror arts).

Optionally, a mirror reflective element may comprise a transflective display-on-demand (DOD) reflective element having suitable transflective coatings or layers on the third surface or fourth surface of an electro-optic reflective element, or on the first surface or second surface of a single substrate conventional fixed reflectance reflective element. Desirably, a mirror substrate may have a silicon or doped-silicon coating or other suitable coating on its transflective surface. For example, minor reflective elements for use in automobiles may utilize, in forming their substrates, transflective reflector-coated glass sheets having silicon-based transflective coatings or other suitable material, such as transflective reflector-coated glass sheets of the type that is commercially available from Pilkington of Toledo, Ohio and marketed under the trade name Mirropane T.M.™ Transparent Mirror Glass. Such silicon-based transflective coated glass sheets may have a reflectivity of at least about 70 percent of light incident thereon and a transmissivity, even in grey, of at least about 11 percent, and if clear glass, its transmissivity may be higher, such as up to about 20 percent or more. To manufacture an interior mirror prismatic element from such commercially available transflective reflector-coated glass sheets or substrates or panels, large, thick (such as about 6 mm to 6.6 mm thick or thereabouts) silicon-based transflective mirror glass sheets (preferably with the transflective reflector coating(s) coated onto non-tinted, highly light transmitting clear glass) may be purchased from Pilkington or another manufacturer. The transflective reflector-coated glass sheets may then be cut to interior mirror sized shapes or dimensions, which in turn may be ground to a prism wedge and edge finished to form the desired silicon-based transflective interior prismatic mirror elements suitable for use in interior automotive rearview mirror assemblies as a flip or manually-operated day/night mirror, as is known in the art. Such a process benefits from advantages such as its superior durability and chemical inertness of the silicon-based reflector during the prism manufacturing operations(s). Optionally however, a transparent tape or coating may be disposed over the reflector of the transflective reflector-coated glass as a protectorant prior to and during the prism fabrication process. Note that the silicon-based transflective mirror reflector coating is on the second surface opposite to the ground prism's slanted front surface of the mirror shape.

For a transflective interior mirror element behind which a video screen will be disposed as part of a display-through-the-mirror element video mirror/reversing camera system or the like, a clear, light transmitting layer or film may be used to environmentally and/or physically protect or encapsulate the mirror reflector coating or coatings at the second surface of the prismatic glass element. Suitable materials to use include encapsulants and conformal coatings commonly used in the electronics industry, and such as are available for CDs and DVDs, such as SK3200 and similar materials from Sony Chemicals or Shinetsu moisture cure silicone or Dymax 3095 or Loctite 3493 or Emerson & Curring UV 7993. Such coatings can be applied by screen printing, dipping, spraying, roller coating, pad printing, ink-jet printing and the like, and may be cured chemically or by heating or by UV exposure or the like. It is desirable to avoid any voids or bubbles or inclusions in the applied optically clear coating/film and that the applied coating/film be clear and highly light transmitting and be uniform in thickness. Optionally, a flexible sheet of plasticized PVB or of silicone or similar optically clear and transparent flexible film sheet may be laid over the second surface coating, and then vacuum-assisted/heating means (such as are described in U.S. provisional application Ser. No. 60/732,245, filed Nov. 1, 2005; and Ser. No. 60/759,992, filed Jan. 18, 2006, which are hereby incorporated herein by reference in their entireties) can be used to conform and attach to the coated second surface of the prism shape and so encapsulate/protect.

Even for the likes of a silicon-based second surface reflector, but particularly if a more environmentally fragile transflective reflector, such as of ITO/Ag/ITO, is used, it is desirable and preferred to protect well the exposed edges at the border edges around second surface of the prism part or substrate. In this regard, it is desirable either to mask close to the edges so that the reflector coating is not formed right out to the very edge and so that any encapsulant or conformal coating or sheet or means used can extend out to the very edge and/or to ensure that any encapsulant or conformal coating or sheet or means used actually wraps around the cut edge to form a wrap-around encapsulant/protectorant that mitigates or prevents edge corrosion.

If a metal oxide/metal/metal oxide transflective stack, such as ITO/Ag/ITO (ISI), is used as the mirror transflector, clear optical conformal coatings, such as acrylics or silicones or epoxies (that may be chemically cured or thermally cured or UV cured or microwave cured) or the like, can beneficially have the effect of flattening any spectral character of the thin film stack by acting as a massive layer (the physical thickness of the conformal coating or similar polymeric encapsulating layer may be many microns in thickness whereas the thin film ISI coatings are only several nanometers in thickness). For example, and for a typical ISI transflective mirror reflector coated onto the second surface of a cut glass prism shape, photopic reflection rose by about 6% R when a typical clear conformal polymeric coating was sprayed and cured thereon, and the percent transmission correspondingly decreased. Thus, if an ISI stack is to be used as a second surface reflector on a prism shape and then in turn is to be conformal coated for protection as described above, then the layer thicknesses of the ISI stack should be adjusted, as known in the optical modeling arts, to compensate for the addition of the clear optical protecting massive film (massive relative to the thickness of the ISI stack layers).

As an alternative to directly coating the likes of a silicon-based transflector or an ISI transflector directly onto the second surface of a ground, clear-glass prismatic shape, the transflector coating or coatings can be deposited onto a flat thin glass shape that is then adhered to/laminated to the glass second surface of the prism shape, such as is disclosed in U.S. patent application Ser. No. 10/993,302, filed Nov. 19, 2004 by Lynam for MIRROR REFLECTIVE ELEMENT FOR A VEHICLE, now U.S. Pat. No. 7,338,177, which is hereby incorporated herein by reference in its entirety (and with the transflector coating(s) sandwiched between the two glass substrates). This has the advantage that the transflector coating(s) are protected against physical damage and/or environmental degradation (including edge attack) by the extra glass substrate, and that large stock sheets of thin glass can be coated from which interior mirror shapes can be cut later to match the particular prism part to be laminated to.

The likes of an autoclave or a vacuum/heat-assisted technique may be used to adhere the flat transflector-coated shape to the second surface of the clear prism part [such as by placing the uncoated prism shape onto a hotplate with its second surface up, placing a flexible sheet of PVB or silicone onto the second surface, juxtaposing the cut flat transflector-coated glass shape onto the flexible polymeric sheet with the coated surface downward, pulling a rubber flexible cover over this sandwich (or placing the sandwich in a vacuum bag), drawing down a vacuum so as to remove air and compress the parts together, and heating to laminate and secure permanently]. Alternatively, the rear flat second transflector-coated shape may be adhered to the second-surface of the front prism-shaped element via a seal as is used in EC cell constructions, and the interpane gap may be left unfilled or filled with the likes of a solvent, such as propylene carbonate or a solid film such as a plasticized urethane or the like.

Also, large sheets of, for example, about 2 mm thick or thereabouts, coated flat transflective reflector-coated mirror panes can be purchased. Such sheets or shapes can be bent or cut to the desired shape or form to suit the exterior mirror shape desired, and may be heated and bent to the desired curvature or form so that the shapes may be suitable for use in exterior mirror assemblies. The glass sheets may be purchased as coated sheets such as those described above. The mirror elements may comprise prismatic DOD substrates, and may utilize aspects described in U.S. patent application Ser. No. 10/993,302, filed Nov. 19, 2004 by Lynam for MIRROR REFLECTIVE ELEMENT FOR A VEHICLE, now U.S. Pat. No. 7,338,177, which is hereby incorporated herein by reference in its entirety. Optionally, a transflective CAZ coating stack or a transflective ISI coating stack or the like may be used as a fourth surface transflective reflector in an electrochromic mirror element or as a first or second surface of a single substrate exterior mirror assembly.

Optionally, the transflective mirror reflector, such as for a silicon-based transflective prismatic interior mirror element or a flat or bent silicon-based exterior transflective mirror element, may be sputter coated in a vacuum deposition process using an aluminum-doped silicon target or the like (such as utilizing aspects described in U.S. patent application Ser. No. 11/021,065, filed Dec. 23, 2004, now U.S. Pat. No. 7,255,451, which is hereby incorporated herein by reference in its entirety). Alternatively, the mirror reflector may be formed by chemical deposition or chemical vapor deposition or pyrolitic deposition on the glass surface. Optionally, the silicon-based transflective mirror reflector may be formed by deposition onto the glass surface at the glass float-line itself when the glass ribbon is first being formed from the molten glass raw materials (where the red-hot molten glass exiting the glass furnace is floated onto a tin bath and where the coating materials or gasses or precursors are blown onto the red hot glass ribbon as it first forms while it exits the tin bath and while it is still in a very hot condition to form the transflective coatings on the glass surface).

Optionally, for example, a driver-side minor may comprise an electro-optic mirror element (such as a driver-side flat electrochromic electrically variable reflectance mirror element, preferably a transflective, display-on-demand flat electrochromic electrically variable reflectance mirror element, and most preferably of flush or frameless construction and utilizing a reflective border band), and the passenger-side mirror may comprise a non-electro-optic mirror element (such as a passenger-side convex conventional fixed reflectance mirror element, preferably a transflective, display-on-demand fixed reflectance mirror element, and most preferably utilizing a reflective border band to match that used on the corresponding driver-side mirror element, as described herein). The driver-side electro-optic mirror element (that preferably comprises an electro-optic medium disposed between and sandwiched by a front transparent glass or plastic substrate and a rear, mirror reflector-coated transparent glass or plastic substrate) may have the second surface of its front transparent substrate coated with a transparent electrically conductive coating (such as ITO or the like) and may have its third surface (the inward surface of its rear transparent substrate) also coated with a transparent conductive coating (such as ITO or the like) so that light passes therethrough, and may have a significantly visible light reflecting (preferably at least about 60% R specularly reflecting there off; more preferably at least about 65% R there off and most preferably at least about 70% R there off) and substantially visible light transmitting (preferably at least about 10% T there through; more preferably at least about 15% T there through and most preferably at least about 20% T there through) transflective mirror reflector on its fourth surface (the rearmost substrate of the EC cell) that, preferably, comprises a high optical refractive index elemental semiconductor mirror coating, such as of silicon or doped-silicon (or germanium or doped germanium), and most preferably comprises sputter coated silicon or doped-silicon such as silicon-aluminum or the like, such as described above. Suitable high optical refractive index elemental semiconductor mirror coatings such as of silicon or doped-silicon (or germanium or doped germanium) and preferably having an index of refraction of at least 3 and an optical thickness of at least about 275 angstroms are disclosed in U.S. Pat. Nos. 6,286,965; 5,751,489; and 5,535,056, the entire disclosures of which are hereby incorporated by reference herein. The passenger-side non-electro-optic mirror element may comprise a bent glass shape or substrate with a transflective mirror reflector on its first or second surface that, preferably, comprises a high index semiconductor coating such as of silicon or doped-silicon (or germanium or doped germanium), and more preferably comprises sputter coated silicon or doped-silicon such as silicon-aluminum or the like, and most preferably is selected to match the reflectance characteristic and visual appearance of the driver-side mirror element's reflector. Optionally, both the driver-side electro-optic mirror element and the passenger-side non-electro-optic mirror element may include a metallic specularly reflecting perimeter border band, such as a neutral reflecting perimeter band as described above, such as described above. Preferably, the driver-side mirror element has the perimeter band disposed on its second surface with the ITO coating disposed over the second surface and over the perimeter band, and the passenger-side mirror element has the perimeter band disposed on its second surface with the silicon or doped-silicon or silicon-aluminum disposed over the second surface and over the perimeter band. Thus, the reflective perimeter bands of the driver and passenger-side mirror elements may provide a generally cosmetic or visual appearance match between the two mirrors as both might be viewed, for example, at a car dealership or in use on the road or in a parking lot or the like.

Optionally, the interior mirror of the vehicle may comprise a transflective prismatic mirror element (such as with a transflective mirror reflector comprising silicon coating or doped-silicon coating, such as a silicon-aluminum coating, disposed thereon) and a display operable to emit illumination or video images through the transflective interior mirror element. The driver-side and/or passenger-side mirror element/assembly may include an independent EC controller or control circuit system (such as is disclosed in U.S. Pat. No. 5,659,423, the entire disclosure of which is hereby incorporated by reference herein) for independently controlling the driver-side (and/or passenger-side) electro-optic mirror element or, for example, the driver-side independent EC controller outboard at the exterior mirror element/assembly may also control an interior electro-optic mirror element if applicable. Optionally, the vehicle may have an interior electro-optic mirror that includes EC driver/circuitry/controllers for controlling the interior electro-optic mirror element and the driver-side electro-optic mirror element (and even a passenger-side electro-optic mirror element if applicable). Also, compass-on-a-chip circuitry as disclosed herein may be included in either or both of the exterior mirror assemblies, and the microprocessor or allied circuitry of such an exterior mirror-located compass-on-a-chip may also function to control the reflectivity of an electro-optic mirror element, such as an independent exterior electrochromic side view mirror element or an interior electrochromic rear view mirror element.

Where a video display screen is disposed behind a transflective interior prismatic mirror element (for use as, for example, the video screen in a video mirror/reversing or back-up camera application), the video screen or monitor (typically an LCD or OLED flat panel of about 2.5 inches to about 3.5 inches diagonal dimension) may attach directly to the flat second surface of the interior prism mirror element, or preferably, may be mounted at an angle thereto so as to compensate for the prism wedge angle (typically about 4 degrees to about 4.75 degrees or thereabout—about 4.5 degrees being common) so as to mitigate any potential double imaging/ghosting due to the angling of the first surface of the prism wedge from its second surface. For example, a clear optical plastic block can be attached to the second surface of the prism and with its rear surface at an about 4.5 degree angle to its front (that contacts the second surface of the prism) and slanted so that the rear surface of the optical plastic block runs generally parallel to the front, first surface of the prism shape. Then, when the flat video screen element attaches to the rear surface of the block, it is orientated generally parallel with the front, first surface of the prism element, and video images emitted by the video screen are generally incident perpendicular to the prism's first surface and so video image double-imaging and ghosting is reduced. As an alternative to a clear optical block, a slanted mount can be used to hold the video screen at an angle to the second surface of the prism in order to achieve similar benefit. Also, and optionally, a light control film such as 3M's Vikuiti™ Light Control Film can be placed in front of the video screen between it and the rear of the mirror element so as to mitigate washout in high ambient viewing conditions such as a sunny day. Such light control films or louver films comprise a continuous matrix of parallel black louvers embedded in the likes of a polycarbonate film/thin (typically less than 0.04 inches thick) plastic sheet that limits viewing off axis of the direction of the louvers. For example, and taking an example where the louvers are at a 0.00 degrees angle to a vertical axis to the horizontal plane of the sheet (i.e., the louvers are vertical to the horizontal plane of the sheet), light transmission of light that impinges generally vertically to the horizontal plane of the sheet has an about 75% T transmission through the light control sheet, whereas light that impinges at about 15 degrees to vertical has only about a 35% T transmission due to the vertical orientation of the louvers, and light impinging or incident at an angle of about 30 degrees and above is largely cut-off by the louvers. 3M Vikuiti™ ALCF-P light control film can be used, having a louver angle of about 0 degrees (plus or minus 2 degrees), a viewing angle of about 60 degrees (plus or minus 4 degrees) and a sheet thickness of about 0.021 inches (plus or minus 0.003 inches). Alternately, 3M Vikuiti™ LCF-P light control film can be used, having a louver angle of about 0 degrees (plus or minus 8 degrees), a viewing angle of about 60 degrees (plus or minus 8 degrees) and a sheet thickness of about 0.021 inches (plus or minus 0.003 inches). Alternately, 3M Vikuiti™ LCF-P light control film can be used, having a louver angle of about 0 degrees (plus or minus 8 degrees), a viewing angle of about 60 degrees (plus or minus 8 degrees) and a sheet thickness of about 0.032 inches (plus or minus 0.005 inches). Should an angled block or mechanical angling of the video screen to the plane of the rear of the mirror element be used, then the light control film may be similarly angled if the louver angle is at about 0 degrees (such as by placing it between the video screen and the angled rear surface of the optical block attached to the rear, second surface of the prismatic mirror element). If no angling is used for the video screen with respect to the back of the transflective mirror element (such as a prismatic transflective mirror element or an electrochromic transflective mirror element), then the Vikuiti™ Light Control Film can be placed between the video screen and the second surface of the prism to which it is mounted. Note that if moiré patterns are seen with such light control films, the film may be slightly angled to mitigate this.

Optionally, an exterior mirror reflective element of the present invention may be used in a vehicle equipped with a transflective interior prismatic mirror element such as is disclosed in U.S. patent application Ser. No. 10/993,302, filed Nov. 19, 2004 by Lynam for MIRROR REFLECTIVE ELEMENT FOR A VEHICLE, and published Jun. 23, 2005 as U.S. Publication No. US 2005/0134983, now U.S. Pat. No. 7,338,177, the entire disclosure of which is hereby incorporated by reference herein. A transflective prismatic mirror element may be made by first grinding clear glass prisms from about 6 mm to about 6.5 mm or so thick flat glass shapes, and then coating the non-ground surface of these clear glass shapes with a transflective mirror reflector, such as for example, with a sputter-coater deposited ITO/silver or silver-alloy/ITO transflective mirror reflector coating stack. Similarly, conventional transflective non-electro-optic transflective exterior mirror elements can be made by first cutting clear glass shapes from about 2 mm or so thick glass sheets, bending if desired, edge finishing and then sputter coating the second surface (or less preferably the first surface) with a transflective doped-silicon mirror reflector or with a transflective metal oxide/metal/metal oxide transflective mirror reflector (such as ITO/silver/ITO or AZO/Ag-alloy/AZO) or with a transflective silver or silver alloy coating or with a transflective aluminum or aluminum alloy coating [and optionally environmentally protecting the second surface coating with a clear, light transmitting protectorant such as a lacquer or coating (although in regions behind the second surface of the transflective prism element where display may not be likely located, a non-light transmitting protecting means may be used)].

Optionally, the mirror assembly and/or reflective element assembly (such as a transflective mirror reflective element) may include a photodiode or phototransistor or a silicon-based photosensor or the like for sensing ambient light and/or glare at the reflective element. Optionally, the photosensor may comprise a silicon-based photosensor, such as the types available from Microsemi of Irvine, Calif., such as a Microsemi 1973B photosensor, such as a LX 1973A or 1973B photosensor that has a maximum dark current (at 50 degrees Centigrade) of less than about 7500 microLux, preferably less than about 5000 microLux, and more preferably less than about 4000 microLux. Preferably, such a photosensor (which is arranged so as to be looking through the transflective mirror reflector of the reflective element) operates in a closed loop control, such as is known in the art and such as is described in U.S. Pat. No. 4,917,477, which is hereby incorporated herein by reference in its entirety.

Optionally, the mirror assembly may accommodate other accessories or circuitry or the like as well, such as a rain sensor or imaging device or the like. For example, the mirror assembly may include a mounting portion (such as the types described in U.S. patent application Ser. No. 11/226,628, filed Sep. 14, 2005; and/or U.S. provisional applications, Ser. No. 60/692,113, filed Jun. 20, 2005; Ser. No. 60/677,990, filed May 5, 2005; Ser. No. 60/653,787, filed Feb. 17, 2005; Ser. No. 60/642,227, filed Jan. 7, 2005; Ser. No. 60/638,250, filed Dec. 21, 2004; Ser. No. 60/624,091, filed Nov. 1, 2004, and Ser. No. 60/609,642, filed Sep. 14, 2004, which are all hereby incorporated herein by reference in their entireties), and may include a rain sensor or the like and may position the rain sensor against the windshield, such as described in U.S. Pat. Nos. 6,250,148; 6,341,523; 6,516,664; 6,968,736; and 6,824,281, and in U.S. patent application Ser. No. 10/958,087, filed Oct. 4, 2004 by Schofield et al. for VEHICLE ACCESSORY MODULE, now U.S. Pat. No. 7,188,963, which are all hereby incorporated herein by reference in their entireties. Optionally, the mirror assembly may include an imaging device, such as an imaging array sensor for imaging systems of the types described in U.S. Pat. Nos. 6,757,109; 6,717,610; 6,396,397; 6,201,642; 6,353,392; 6,313,454; 6,396,397; 5,550,677; 5,670,935; 5,796,094; 5,877,897; 6,097,023; and 6,498,620, and U.S. patent application Ser. No. 09/441,341, filed Nov. 16, 1999 by Schofield et al. for VEHICLE HEADLIGHT CONTROL USING IMAGING SENSOR, now U.S. Pat. No. 7,339,149; Ser. No. 10/427,051, filed Apr. 30, 2003 by Pawlicki et al. for OBJECT DETECTION SYSTEM FOR VEHICLE, now U.S. Pat. No. 7,038,577; and/or Ser. No. 11/315,675, filed Dec. 22, 2005, now U.S. Pat. No. 7,720,580, and/or U.S. provisional application Ser. No. 60/638,687, filed Dec. 23, 2004, which are all hereby incorporated herein by reference in their entireties.

Optionally, the mirror assembly may be associated with various accessories or systems, such as, for example, a tire pressure monitoring system or a passenger air bag status or a garage door opening system or a telematics system or any other accessory or system of the mirror assembly or of the vehicle or of an accessory module or console of the vehicle, such as an accessory module or console of the types described in U.S. Pat. Nos. 6,690,268; 6,672,744; 6,386,742; and 6,124,886, and/or U.S. patent application Ser. No. 10/739,766, filed Dec. 18, 2003 by DeLine et al. for MODULAR REARVIEW MIRROR ASSEMBLY, now U.S. Pat. No. 6,877,888; and/or Ser. No. 10/355,454, filed Jan. 31, 2003 by Schofield et al. for VEHICLE ACCESSORY MODULE, now U.S. Pat. No. 6,824,281, and/or PCT Application No. PCT/US03/03012, filed Jan. 31, 2003 by Donnelly Corporation for VEHICLE ACCESSORY MODULE, and/or PCT Application No. PCT/US03/40611, filed Dec. 19, 2003 by Donnelly Corporation for ACCESSORY SYSTEM FOR VEHICLE, and/or PCT Application No. PCT/US04/15424, filed May 18, 2004 by Donnelly Corporation et al. for MIRROR ASSEMBLY FOR VEHICLE, which are hereby incorporated herein by reference in their entireties.

Optionally, the mirror assembly may support one or more other accessories or features, such as one or more electrical or electronic devices or accessories. For example, illumination sources or lights, such as map reading lights or one or more other lights or illumination sources, such as illumination sources of the types disclosed in U.S. Pat. Nos. 6,690,268; 5,938,321; 5,813,745; 5,820,245; 5,673,994; 5,649,756; 5,178,448; 5,671,996; 4,646,210; 4,733,336; 4,807,096; 6,042,253; 6,971,775; and/or 5,669,698, and/or U.S. patent application Ser. No. 10/054,633, filed Jan. 22, 2002, now U.S. Pat. No. 7,195,381; and/or Ser. No. 10/933,842, filed Sep. 3, 2004 by Kulas et al. for INTERIOR REARVIEW MIRROR ASSEMBLY, now U.S. Pat. No. 7,249,860, which are hereby incorporated herein by reference in their entireties, may be included in the mirror assembly. The illumination sources and/or the circuit board may be connected to one or more buttons or inputs for activating and deactivating the illumination sources. Optionally, the mirror assembly may also or otherwise include other accessories, such as microphones, such as analog microphones or digital microphones or the like, such as microphones of the types disclosed in U.S. Pat. Nos. 6,243,003; 6,278,377; and/or 6,420,975, and/or in U.S. patent application Ser. No. 10/529,715, filed Mar. 30, 2005, and in PCT Application No. PCT/US03/308877, filed Oct. 1, 2003 by Donnelly Corp. et al. for MICROPHONE SYSTEM FOR VEHICLE. Optionally, the mirror assembly may also or otherwise include other accessories, such as a telematics system, speakers, antennas, including global positioning system (GPS) or cellular phone antennas, such as disclosed in U.S. Pat. No. 5,971,552, a communication module, such as disclosed in U.S. Pat. No. 5,798,688, a voice recorder, a blind spot detection and/or indication system, such as disclosed in U.S. Pat. Nos. 5,929,786 and/or 5,786,772, and/or U.S. patent application Ser. No. 10/427,051, filed Apr. 30, 2003, now U.S. Pat. No. 7,038,577; and/or Ser. No. 11/315,675, filed Dec. 22, 2005; and/or Ser. No. 10/209,173, filed Jul. 31, 2002, now U.S. Pat. No. 6,882,287; and/or U.S. provisional application Ser. No. 60/638,687, filed Dec. 23, 2004; Ser. No.

60/696,953, filed Jul. 6, 2006; and/or Ser. No. 60/784,570, filed Mar. 22, 2006, transmitters and/or receivers, such as for a garage door opener or a vehicle door unlocking system or the like (such as a remote keyless entry system), a digital network, such as described in U.S. Pat. No. 5,798,575, a high/low headlamp controller, such as a camera-based headlamp control, such as disclosed in U.S. Pat. Nos. 5,796,094 and/or 5,715,093, a memory mirror system, such as disclosed in U.S. Pat. No. 5,796,176, a hands-free phone attachment, an imaging system or components or circuitry or display thereof, such as an imaging and/or display system of the types described in U.S. Pat. Nos. 6,690,268 and 6,847,487; and/or U.S. provisional application Ser. No. 60/614,644, filed Sep. 30, 2004; Ser. No. 60/618,686, filed Oct. 14, 2004; Ser. No. 60/628,709, filed Nov. 17, 2004; Ser. No. 60/644,903, filed Jan. 11, 2005; Ser. No. 60/667,049, filed Mar. 31, 2005; and/or U.S. patent application Ser. No. 11/105,757, filed Apr. 14, 2005, now U.S. Pat. No. 7,526,103; and/or Ser. No. 11/239,980, filed Sep. 30, 2005, a slide out or extendable/retractable video device or module, such as described in U.S. patent application Ser. No. 10/538,724, filed Jun. 13, 2005; and/or Ser. No. 11/284,543, filed Nov. 22, 2005, now U.S. Pat. No. 7,370,983, U.S. provisional application Ser. No. 60/630,061, filed Nov. 22, 2004; and/or Ser. No. 60/667,048, filed Mar. 31, 2005; and/or PCT Application No. PCT/US03/40611, filed Dec. 19, 2003, a video device for internal cabin surveillance (such as for sleep detection or driver drowsiness detection or the like) and/or video telephone function, such as disclosed in U.S. Pat. Nos. 5,760,962 and/or 5,877,897, a remote keyless entry receiver, a seat occupancy detector, a remote starter control, a yaw sensor, a clock, a carbon monoxide detector, status displays, such as displays that display a status of a door of the vehicle, a transmission selection (4wd/2wd or traction control (TCS) or the like), an antilock braking system, a road condition (that may warn the driver of icy road conditions) and/or the like, a trip computer, a tire pressure monitoring system (TPMS) receiver. (such as described in U.S. Pat. Nos. 6,124,647; 6,294,989; 6,445,287; 6,472,979; and/or 6,731,205; and/or U.S. patent application Ser. No. 11/232,324, filed Sep. 21, 2005 by O'Brien et al. for TIRE PRESSURE ALERT SYSTEM, now U.S. Pat. No. 7,423,522; and/or U.S. provisional application Ser. No. 60/611,796, filed Sep. 21, 2004), and/or an ONSTAR® system and/or any other accessory or circuitry or the like (with all of the above-referenced patents and PCT and U.S. patent applications being commonly assigned to Donnelly Corporation, and with the disclosures of the referenced patents and patent applications being hereby incorporated herein by reference in their entireties).

Optionally, the accessory module and/or mirror assembly may accommodate other accessories or circuitry or the like as well, such as a rain sensor or imaging device or the like. For example, the mirror assembly may include a mounting portion (such as the types described in U.S. patent application Ser. No. 11/226,628, filed Sep. 14, 2005; and/or U.S. provisional applications, Ser. No. 60/692,113, filed Jun. 20, 2005; Ser. No. 60/677,990, filed May 5, 2005; Ser. No. 60/653,787, filed Feb. 17, 2005; Ser. No. 60/642,227, filed Jan. 7, 2005; Ser. No. 60/638,250, filed Dec. 21, 2004; Ser. No. 60/624,091, filed Nov. 1, 2004; Ser. No. 60/609,642, filed Sep. 14, 2004; and/or Ser. No. 60/729,430, filed Oct. 21, 2005, which are all hereby incorporated herein by reference in their entireties), and may include a rain sensor or the like and may position the rain sensor against the windshield, such as described in U.S. Pat. Nos. 6,250,148; 6,341,523; 6,516,664; 6,968,736; and 6,824,281, and in U.S. patent application Ser. No. 10/958,087, filed Oct. 4, 2004 by Schofield et al. for VEHICLE ACCESSORY MODULE, now U.S. Pat. No. 7,188,963, which are all hereby incorporated herein by reference in their entireties. Optionally, the mirror assembly may include an imaging device, such as an imaging array sensor for imaging systems of the types described in U.S. Pat. Nos. 6,757,109; 6,717,610; 6,396,397; 6,201,642; 6,353,392; 6,313,454; 6,396,397; 5,550,677; 5,670,935; 5,796,094; 5,877,897; 6,097,023; and 6,498,620, and U.S. patent application Ser. No. 09/441,341, filed Nov. 16, 1999 by Schofield et al. for VEHICLE HEADLIGHT CONTROL USING IMAGING SENSOR, now U.S. Pat. No. 7,339,149; Ser. No. 10/427,051, filed Apr. 30, 2003 by Pawlicki et al. for OBJECT DETECTION SYSTEM FOR VEHICLE, now U.S. Pat. No. 7,038,577; and/or Ser. No. 11/315,675, filed Dec. 22, 2005, now U.S. Pat. No. 7,720,580, and/or U.S. provisional application Ser. No. 60/638,687, filed Dec. 23, 2004, which are all hereby incorporated herein by reference in their entireties.

Optionally, the mirror assembly may include one or more other accessories at or within the mirror casing, such as one or more electrical or electronic devices or accessories, such as antennas, including global positioning system (GPS) or cellular phone antennas, such as disclosed in U.S. Pat. No. 5,971,552, a communication module, such as disclosed in U.S. Pat. No. 5,798,688, a blind spot detection system, such as disclosed in U.S. Pat. Nos. 5,929,786 and/or 5,786,772, transmitters and/or receivers, such as a garage door opener or the like, a digital network, such as described in U.S. Pat. No. 5,798,575, a high/low headlamp controller, such as disclosed in U.S. Pat. Nos. 5,796,094 and/or 5,715,093, a memory mirror system, such as disclosed in U.S. Pat. No. 5,796,176, a hands-free phone attachment, a video device for internal cabin surveillance and/or video telephone function, such as disclosed in U.S. Pat. Nos. 5,760,962 and/or 5,877,897, a remote keyless entry receiver, lights, such as map reading lights or one or more other lights or illumination sources, such as disclosed in U.S. Pat. Nos. 6,690,268; 5,938,321; 5,813,745; 5,820,245; 5,673,994; 5,649,756; 5,178,448; 5,671,996; 4,646,210; 4,733,336; 4,807,096; 6,042,253; and/or 5,669,698, and/or U.S. patent application Ser. No. 10/054,633, filed Jan. 22, 2002 by Lynam et al. for VEHICULAR LIGHTING SYSTEM, now U.S. Pat. No. 7,195,381; Ser. No. 10/745,056, filed. Dec. 22, 2003 by Lynam et al. for LIGHT MODULE FOR INTERIOR REARVIEW MIRROR ASSEMBLY, now U.S. Pat. No. 6,971,775; and/or Ser. No. 10/933,842, filed Sep. 3, 2004 by Kulas et al. for INTERIOR REARVIEW MIRROR ASSEMBLY, now U.S. Pat. No. 7,249,860, microphones, such as disclosed in U.S. Pat. Nos. 6,243,003; 6,278,377; and/or 6,420,975; and/or U.S. patent application Ser. No. 10/529,715, filed Mar. 30, 2005; and/or PCT Application No. PCT/US03/30877, filed Oct. 1, 2003, speakers, antennas, including global positioning system (GPS) or cellular phone antennas, such as disclosed in U.S. Pat. No. 5,971,552, a communication module, such as disclosed in U.S. Pat. No. 5,798,688, a voice recorder, a blind spot detection system, such as disclosed in U.S. Pat. Nos. 5,929,786 and/or 5,786,772, and/or U.S. patent application Ser. No. 10/427,051, filed Apr. 30, 2003, now U.S. Pat. No. 7,038,577; Ser. No. 11/315,675, filed Dec. 22, 2005; and Ser. No. 10/209,173, filed Jul. 31, 2002, now U.S. Pat. No. 6,882,287; and/or U.S. provisional application Ser. No. 60/638,687, filed Dec. 23, 2004, transmitters and/or receivers, such as for a garage door opener or a vehicle door unlocking system or the like (such as a remote keyless entry system), a digital network, such as described in U.S. Pat. No. 5,798,575, a high/low headlamp controller, such as a camera-based headlamp control, such as disclosed in U.S. Pat. Nos. 5,796,094 and/or 5,715,093, a memory mirror system, such as disclosed in U.S. Pat. No.

5,796,176, a hands-free phone attachment, an imaging system or components or circuitry or display thereof, such as an imaging and/or display system of the types described in U.S. Pat. Nos. 6,690,268 and 6,847,487; and/or U.S. provisional application Ser. No. 60/614,644, filed Sep. 30, 2004; Ser. No. 60/618,686, filed Oct. 14, 2004; Ser. No. 60/628,709, filed Nov. 17, 2004; Ser. No. 60/644,903, filed Jan. 11, 2005; Ser. No. 60/667,049, filed Mar. 31, 2005; and/or U.S. patent application Ser. No. 11/105,757, filed Apr. 14, 2005, now U.S. Pat. No. 7,526,103, a video device for internal cabin surveillance (such as for sleep detection or driver drowsiness detection or the like) and/or video telephone function, such as disclosed in U.S. Pat. Nos. 5,760,962 and/or 5,877,897, a remote keyless entry receiver, a seat occupancy detector, a remote starter control, a yaw sensor, a clock, a carbon monoxide detector, status displays, such as displays that display a status of a door of the vehicle, a transmission selection (4wd/2wd or traction control (TCS) or the like), an antilock braking system, a road condition (that may warn the driver of icy road conditions) and/or the like, a trip computer, a tire pressure monitoring system (TPMS) receiver (such as described in U.S. Pat. Nos. 6,124,647; 6,294,989; 6,445,287; 6,472,979; and/or 6,731,205; and/or U.S. patent application Ser. No. 11/232,324, filed Sep. 21, 2005 by O'Brien et al. for TIRE PRESSURE ALERT SYSTEM, now U.S. Pat. No. 7,423,522; and/or U.S. provisional application Ser. No. 60/611,796, filed Sep. 21, 2004), and/or an ONSTAR® system, a compass, such as disclosed in U.S. Pat. Nos. 5,924,212; 4,862,594; 4,937,945; 5,131,154; 5,255,442; and/or 5,632,092, and/or U.S. patent application Ser. No. 10/456,599, filed Jun. 6, 2003 by Weller et al. for INTERIOR REARVIEW MIRROR SYSTEM WITH COMPASS, now U.S. Pat. No. 7,004,593; and/or Ser. No. 11/305,637, filed Dec. 16, 2005, now U.S. Pat. No. 7,329,013, and/or any other accessory or circuitry or the like (with all of the above-referenced patents and PCT and U.S. patent applications being commonly assigned to Donnelly Corporation, and with the disclosures of the referenced patents and patent applications being hereby incorporated herein by reference in their entireties).

Optionally, a display of driver performance or aggressiveness or the like can be included at the interior mirror assembly or at a windshield electronics module that utilizes data from the likes of the SmartCenter developed by and available from Drive Diagnostics Ltd of Tel Aviv, Israel (see www.drivediagnostics.com). DriveDiagnostics' SafetyCenter comprises sensors that monitor moves and maneuvers the vehicle makes by measuring the forces on the car and software that identifies the maneuvers and produces a 'driver behavior' report. The system also can have a GPS location device that measures the speed at which the car is being driven, rather than hooking up to the car's own speedometer. As disclosed in U.S. Pat. Publication No. 20050131597 (published Jun. 16, 2005 based on an U.S. patent application Ser. No. 10/894,345, filed Jul. 20, 2004, the entire disclosure of which is hereby incorporated by reference herein), the system and method analyzes and evaluates the performance and attitude of a motor vehicle driver. A raw data stream from a set of vehicle sensors is filtered to eliminate extraneous noise, and then parsed to convert the stream into a string of driving event primitives. The string of driving events is then processed by a pattern-recognition system to derive a sequence of higher-level driving maneuvers.

Driving maneuvers include such familiar procedures as lane changing, passing, and turning and braking. Driving events and maneuvers are quantified by parameters developed from the sensor data. The parameters and timing of the maneuvers can be analyzed to determine skill and attitude factors for evaluating the driver's abilities and safety ratings. The rendering of the data into common driving-related concepts allows more accurate and meaningful analysis and evaluation than is possible with ordinary statistical threshold-based analysis.

As soon as aggressive or dangerous driving is detected, real time alerts are presented to the driver in the car (such as by a transflective display at the interior mirror or by another mirror-located display) and optionally, a parent can be notified via SMS messaging, mail or voice mail or a report can be sent to the car owner via a regular report (for example, for General Motors vehicles equipped with an ONSTAR® telematics systems, the monthly ONSTAR® e-mail report sent to subscribers can include a report on driver safety/"aggressiveness" and on the impact such has on fuel economy. SafetyCenter builds driver specific profiles and points directly at attitude and skill deficiencies that have to be corrected. Using user-friendly web interface, and as an example, both a parent and a young driver can get a better understanding of a driver's behavior and what has to be done in order to turn a young driver into a skilled and responsible driver.

To achieve this, a compact unit can be installed, for example, in the interior mirror housing or on a pod attaching to the interior mirror mount (so it is fixedly mounted) that may link into an in-car data logging/analysis system and/or can link into the on-board ONSTAR® or similar system so that GPS data and driver behavior data may be regularly broadcast to the external ONSTAR® or similar telematics server for recording/compilation/analysis and reporting back to the driver/owner/subscriber/insurance agency. The unit mounted at or in the interior mirror assembly/windshield electronics module may comprise its own set of sensors, UPS modem and GPS unit. The sensors in such a unit can measure the forces impacting the vehicle and provide precise information about each maneuver the driver performs. Each maneuver can be evaluated on both attitude and skill parameters. This high resolution detection enables full visibility of driver behavior. Once aggressive or dangerous driving is detected, the information is sent real-time to an external server (such as the ONSTAR® server) or can be processed in-car; the data is analyzed and driver specific reports describing the driver's behavior are generated and can be reported/displayed to the driver such as via a transflective video interior mirror display. The displayed data can provide information and prescriptive guidance to driver while he/she is driving and can alert if the driving pattern suggest risky/aggressive/unsafe driving and/or a driving pattern (fast starts/heavy stops) likely to reduce fuel efficiency.

Typically, such a system utilizes a PCB or similar circuit element equipped with a 3-axis accelerometer or the like. Such a PCB could by accommodated in the interior mirror assembly (or in an attachment thereto) or in a windshield electronics module. Thus, a display may be placed at or about the interior mirror of the vehicle mirror that feeds back to the driver his/her driver "aggressiveness" performance and ties this to fuel economy and/or safety, and preferably is a thru-the-mirror-reflector "display-on-demand" mirror display. Also, information from a forward facing video sensor (such as a lane departure warning video sensor or the likes of MobilEye's EyeQ video-based object detection sensing system) or of a video camera monitoring the driver's face/eyes to detect driver drowsiness can be combined/fused with DriveDiagnostic's "see how you drive" capability, thus making the assessment of aggressiveness tie into road type/conditions and weather conditions (what might not be aggressive driving on a clear day might be hazardous if it is snowing or foggy or at night or on a crowded road compared to a road with little traffic or on a wide road versus a narrow road) and make the diagnosis dynamic to road/weather conditions, and if a driver drowsiness is included, to how alert the driver appears to be. Packaging the electronics and/or the display (preferably a dynamic display and most preferably a display that ties in fuel economy to driver aggressiveness/behavior) in a windshield electronics module (WEM) or in (or at) an interior mirror assembly has several benefits, and particularly in a vehicle equipped with a telematics system (such as ONSTAR®) where the likes of GPS and 3-axis accelerometers may already be on board and where the interior mirror already serves as a human-machine interface or HMI (for example, microphone and button actuation) for the telematics system. Also, the mirror-mounted or WEM-mounted display may alert the driver if his or her driving habits are being reported unfavorably to the driver's insurance company and thus possibly degrading the ranking and reduction in premium awarded by the insurer in order to entice less-aggressive and hence safer driving. For example, a "green-yellow-red" background or indicia may be utilized on the display to convey to the driver the ranking being reported.

Optionally, the mirror assembly of the present invention comprise an interior or exterior rearview mirror assembly and may include a compass-on-a-chip with electrochromic circuitry, such as described in U.S. patent application Ser. No. 11/226,628, filed Sep. 14, 2005; and/or Ser. No. 11/201,661, filed Aug. 11, 2005, now U.S. Pat. No. 7,480,149, which are hereby incorporated herein by reference in their entireties. For example, an exterior mirror assembly may include a compass-on-a-chip, preferably with electrochromic circuitry, such as for an independent outside electrochromic mirror drive, such as by utilizing aspects described in U.S. Pat. No. 5,659,423, which is hereby incorporated herein by reference in its entirety. Optionally, the driver-side exterior mirror may comprise an electro-optic mirror element (such as an electrochromic mirror element) and the passenger-side exterior mirror may comprise a non-electro-optic mirror element, with the driver-side mirror having an independent electrochromic mirror drive and a compass-on-a-chip and electrochromic circuitry. Optionally, the interior rearview mirror assembly may comprise an electro-optic mirror element and may have an independent electrochromic mirror drive or may be driven by the electrochromic minor drive of the driver-side electro-optic mirror.

Optionally, the mirror assembly may be utilized with a video slide-out mirror, such as the types described in PCT Application No. PCT/US03/40611, filed Dec. 19, 2003 by Donnelly Corp. et al. for ACCESSORY SYSTEM FOR VEHICLE, and/or U.S. patent application Ser. No. 10/538,724, filed Jun. 13, 2005; and/or Ser. No. 11/284,543, filed Nov. 22, 2005, now U.S. Pat. No. 7,370,983, and/or U.S. provisional applications, Ser. No. 60/630,061, filed Nov. 22, 2004 by Lynam et al. for MIRROR ASSEMBLY WITH VIDEO DISPLAY; and Ser. No. 60/667,048, filed Mar. 31, 2005 by Lynam et al. for MIRROR ASSEMBLY WITH VIDEO DISPLAY, which are hereby incorporated herein by reference in their entireties. Further, when such a vehicle equipped with such a video mirror is also equipped with a side viewing or front viewing or rear viewing sensor vision system (such as by utilizing a radar sensor or an ultrasonic sensor or a camera sensor (such as described in U.S. patent application Ser. No. 10/534,632, filed May 11, 2005; Ser. No. 11/239,980, filed Sep. 30, 2005; and/or Ser. No. 11/315,675, filed Dec. 22, 2005, now U.S. Pat. No. 7,720,580, and/or U.S. provisional applications, Ser. No. 60/628,709, filed Nov. 17, 2004 by Camilleri et al. for IMAGING AND DISPLAY SYSTEM FOR VEHICLE; Ser. No. 60/614,644, filed Sep. 30, 2004; Ser. No. 60/618,686, filed Oct. 14, 2004 by Laubinger for VEHICLE IMAGING SYSTEM; Ser. No. 60/731,183, filed Oct. 28, 2005; Ser. No. 60/765,797, filed Feb. 7, 2006; and/or Ser. No. 60/638,687, filed Dec. 23, 2004 by Higgins-Luthman for OBJECT DETECTION SYSTEM FOR VEHICLE, which are hereby incorporated herein by reference in their entireties) to monitor an area adjacent the vehicle), the video screen may automatically extend when such a sensor system detects the presence of an obstacle and/or a human adjacent to the vehicle. Also, the video display screen may extend in conjunction with a trailer-hitch monitoring system (such as the types described in U.S. patent application Ser. No. 10/418,486, filed Apr. 18, 2003 by McMahon et al. for VEHICLE IMAGING SYSTEM, now U.S. Pat. No. 7,005,974, which is hereby incorporated herein by reference in their entireties) and icons and/or indicia and/or instructions may be created on the video image displayed on the extended video screen of the video mirror to assist or guide the driver to hitch a trailer to the trailer hitch of the vehicle.

Optionally, the mirror assembly may include one or more user actuatable inputs or input devices or human machine interfaces. For example, the inputs or user interfaces may include buttons, such as are described in U.S. Pat. No. 6,501,387, which is hereby incorporated herein by reference in its entirety, or that include touch/proximity sensors such as are disclosed in U.S. Pat. Nos. 6,001,486; 6,310,611; 6,320,282; and 6,627,918, and U.S. patent application Ser. No. 09/817,874, filed Mar. 26, 2001 by Quist et al. for INTERACTIVE AUTOMOTIVE REARVISION SYSTEM, now U.S. Pat. No. 7,224,324, and PCT Application No. PCT/US03/40611, filed Dec. 19, 2003, which are hereby incorporated herein by reference in their entireties, or that include other types of buttons or switches, such as those described in U.S. patent application Ser. No. 11/029,695, filed Jan. 5, 2005 by Lindahl et al. for MIRROR ASSEMBLY, now U.S. Pat. No. 7,253,723; and/or U.S. provisional application Ser. No. 60/556,259, filed Mar. 25, 2004; Ser. No. 60/553,517, filed Mar. 16, 2004; and Ser. No. 60/535,559, filed Jan. 9, 2004; and/or PCT Application No. PCT/US2004/015424, filed May 18, 2004 by Donnelly Corp. et al. for MIRROR ASSEMBLY FOR VEHICLE, which are hereby incorporated herein by reference in their entireties, or that include fabric-made position detectors, such as are disclosed in U.S. Pat. Nos. 6,504,531; 6,501,465; 6,492,980; 6,452,479; 6,437,258; and 6,369,804, which are hereby incorporated herein by reference in their entireties. The mirror assembly may comprise any other type of switches or buttons, such as touch or proximity sensing switches, such as touch or proximity switches of the types described in U.S. patent application Ser. No. 11/021,065, filed Dec. 23, 2004, now U.S. Pat. No. 7,255,451; Ser. No. 10/956,749, filed Oct. 1, 2004 by Schofield et al. for MIRROR REFLECTIVE ELEMENT ASSEMBLY INCLUDING ELECTRONIC COMPONENT, now U.S. Pat. No. 7,446,924; Ser. No. 10/933,842, filed Sep. 3, 2004 by Kulas et al. for INTERIOR REARVIEW MIRROR ASSEMBLY, now U.S. Pat. No. 7,249,860; Ser. No. 11/021,065, filed Dec. 23, 2004, now U.S. Pat. No. 7,255,451; and/or Ser. No. 11/140,396, filed May 27, 2005, now U.S. Pat. No. 7,360,932; and/or U.S. provisional application Ser. No. 60/563,342, filed Apr. 19, 2004 by Bareman et al. for METHOD OF MANUFACTURING ELECTRO-OPTIC MIRROR CELL, which are hereby incorporated herein by reference in their entireties; or the inputs may comprise other types of buttons or switches, such as those described in U.S. patent application Ser. No. 11/029,695, filed Jan. 5, 2005, now U.S. Pat. No. 7,253,723; and/or U.S. provisional application Ser. No. 60/553,517, filed Mar. 16, 2004; Ser. No. 60/535,559, filed Jan. 9, 2004; Ser.

No. 60/690,401, filed Jun. 14, 2005; Ser. No. 60/719,482, filed Sep. 22, 2005; and Ser. No. 60/749,423, filed Dec. 12, 2005, which are hereby incorporated herein by reference in their entireties, or such as fabric-made position detectors, such as those described in U.S. Pat. Nos. 6,504,531; 6,501,465; 6,492,980; 6,452,479; 6,437,258; and 6,369,804, which are hereby incorporated herein by reference in their entireties. Other types of switches or buttons or inputs or sensors may be incorporated to provide the desired function, without affecting the scope of the present invention. The manual inputs or user actuatable inputs or actuators may control or adjust or activate/deactivate one or more accessories or elements or features. For touch sensitive inputs or applications or switches, the mirror assembly or accessory module or input may, when activated, provide a positive feedback (such as activation of an illumination source or the like, or such as via an audible signal, such as a chime or the like, or a tactile or haptic signal, or a rumble device or signal or the like) to the user so that the user is made aware that the input was successfully activated.

Optionally, the user inputs or buttons may comprise user inputs for a garage door opening system, such as a vehicle based garage door opening system of the types described in U.S. Pat. Nos. 6,396,408; 6,362,771; and 5,798,688, and/or U.S. patent application Ser. No. 10/770,736, filed Feb. 3, 2004, now U.S. Pat. No. 7,023,322; and/or U.S. provisional application Ser. No. 60/502,806, filed Sep. 12, 2003 by Taylor et al. for GARAGE DOOR OPENING SYSTEM FOR VEHICLE; and Ser. No. 60/444,726, filed Feb. 4, 2003 by Baumgardner et al, for GARAGE DOOR OPENING SYSTEM FOR VEHICLE, which are hereby incorporated herein by reference in their entireties. The user inputs may also or otherwise function to activate and deactivate a display or function or accessory, and/or may activate/deactivate and/or commence a calibration of a compass system of the mirror assembly and/or vehicle. The compass system may include compass sensors and circuitry within the mirror assembly or within a compass pod or module at or near or associated with the mirror assembly. Optionally, the user inputs may also or otherwise comprise user inputs for a telematics system of the vehicle, such as, for example, an ONSTAR® system as found in General Motors vehicles and/or such as described in U.S. Pat. Nos. 4,862,594; 4,937,945; 5,131,154; 5,255,442; 5,632,092; 5,798,688; 5,971,552; 5,924,212; 6,243,003; 6,278,377; 6,420,975; 6,946,978; and 6,477,464; and/or 6,678,614; and/or U.S. patent application Ser. No. 10/456,599, filed Jun. 6, 2003 by Weller et al. for INTERIOR REARVIEW MIRROR SYSTEM WITH COMPASS, now U.S. Pat. No. 7,004,593; Ser. No. 10/645,762, filed Aug. 20, 2003 by Taylor et al. for VEHICLE NAVIGATION SYSTEM FOR USE WITH A TELEMATICS SYSTEM, now U.S. Pat. No. 7,167,796; and Ser. No. 10/964,512, filed Oct. 13, 2004, now U.S. Pat. No. 7,308,341; and/or PCT Application No. PCT/US03/40611, filed Dec. 19, 2003 by Donnelly. Corporation et al. for ACCESSORY SYSTEM FOR VEHICLE, and/or PCT Application No. PCT/US03/308877, filed Oct. 1, 2003 by Donnelly Corp. for MICROPHONE SYSTEM FOR VEHICLE, which are all hereby incorporated herein by reference in their entireties.

Optionally, the accessory module may utilize aspects of other accessory modules or windshield electronics modules or the like, such as the types described in U.S. patent application Ser. No. 10/958,087, filed Oct. 4, 2004 by Schofield et al. for VEHICLE ACCESSORY MODULE, now U.S. Pat. No. 7,188,963; Ser. No. 10/456,599, filed Jun. 6, 2003 by Weller et al. for INTERIOR REARVIEW MIRROR SYSTEM WITH COMPASS, now U.S. Pat. No. 7,004,593; and/ or Ser. No. 11/201,661, filed Aug. 11, 2005, now U.S. Pat. No. 7,480,149, and/or U.S. Pat. Nos. 6,824,281; 6,690,268; 6,250,148; 6,341,523; 6,593,565; 6,428,172; 6,501,387; 6,329,925; and 6,326,613, and/or in PCT Application No. PCT/US03/40611, filed Dec. 19, 2003 by Donnelly Corp. et al. for ACCESSORY SYSTEM FOR VEHICLE, and/or Ireland patent application Ser. No. S2004/0614, filed Sep. 15, 2004; Ser. No. S2004/0838, filed Dec. 14, 2004; and Ser. No. S2004/0840, filed Dec. 15, 2004, which are all hereby incorporated herein by reference in their entireties.

Changes and modifications to the specifically described embodiments may be carried out without departing from the principles of the present invention, which is intended to be limited only by the scope of the appended claims as interpreted according to the principles of patent law.

The embodiments of the invention in which an exclusive property or privilege is claimed are defined as follows:

1. A rearview mirror system for a vehicle comprising:
   a rearview mirror assembly comprising an electrochromic mirror reflective element having electrically variable reflectivity between a high reflectance state and a dimmed reflectance state;
   said electrochromic mirror reflective element comprising a front substrate having a first surface and a second surface;
   said electrochromic mirror reflective element comprising a rear substrate having a third surface and a fourth surface;
   said second surface of said front substrate and said third surface of said rear substrate opposing each other in said electrochromic mirror reflective element and with an electrochromic medium disposed therebetween;
   a specularly reflecting mirror reflector established at said third surface of said rear substrate, said specularly reflecting mirror reflector having a reflectance value of at least about 70 percent of light incident thereon;
   a specularly reflecting indicia reflector locally established at said second surface of said front substrate to form indicia at said reflective element, said specularly reflecting indicia reflector having a reflectance value of light that passes through said front substrate to be incident thereon that is at least about 5 percent less than that of said specularly reflecting mirror reflector; and
   the indicia providing a visible contrast between light incident at said mirror reflector and light incident at said indicia reflector so that when said electrochromic mirror reflective element is in its high reflectance state, indicia information is subtly viewable by a person viewing said reflective element of said mirror assembly.

2. The rearview mirror system of claim 1, wherein said third surface specularly reflecting mirror reflector comprises a ruthenium coating.

3. The rearview mirror system of claim 2, wherein said specularly reflecting indicia reflector comprises a chromium coating.

4. A rearview mirror system for a vehicle comprising:
   an interior rearview mirror assembly comprising an electro-optic mirror reflective element having electrically variable reflectivity between a high reflectance state and a dimmed reflectance state;
   said electro-optic mirror reflective element comprising a front substrate having a first surface and a second surface;
   said electro-optic mirror reflective element comprising a rear substrate having a third surface and a fourth surface;
   said second surface of said front substrate and said third surface of said rear substrate opposing each other in said electro-optic mirror reflective element and with an electro-optic medium disposed therebetween;

a specularly reflecting mirror reflector established at said third surface of said rear substrate, said specularly reflecting mirror reflector having a reflectance value of at least about 70 percent of light incident thereon;

a specularly reflecting indicia reflector locally established at said second surface of said front substrate to form indicia at said reflective element, said specularly reflecting indicia reflector having a reflectance value of light that passes through said front substrate to be incident thereon that is one of (a) higher by at least five percent reflectivity than that of said specularly reflecting mirror reflector, (b) generally the same as that of said specularly reflecting mirror reflector, and (c) lower by at least five percent reflectivity than that of said specularly reflecting mirror reflector;

the indicia providing a visible contrast between light incident at said mirror reflector and light incident at said indicia reflector so that when said electro-optic mirror reflective element is in its high reflectance state, indicia information is subtly viewable by a person viewing said reflective element of said mirror assembly; and wherein the indicia conveys information that least one of: (a) informs that the rearview mirror assembly is an automatic dimming type, (b) informs of a brand logo and (c) informs of a personalization logo.

5. The rearview mirror system of claim 4, wherein the indicia conveys information that informs that the rearview mirror assembly is an automatic dimming type.

6. The rearview mirror system of claim 4, wherein the indicia conveys information that informs of a brand logo.

7. The rearview mirror system of claim 4, wherein the indicia conveys information that informs of a personalization logo.

8. The rearview mirror system of claim 4, wherein said specularly reflecting mirror reflector comprises one of a silver coating and a silver alloy coating.

9. The rearview mirror system of claim 8, wherein said third surface specularly reflecting mirror reflector comprises a conducting metal oxide coating.

10. The rearview mirror system of claim 9, wherein said conducting metal oxide coating comprises indium tin oxide.

11. The rearview mirror system of claim 9, wherein said conducting metal oxide coating comprises doped zinc oxide.

12. The rearview mirror system of claim 11, wherein said doped zinc oxide comprises aluminum-doped zinc oxide.

13. An exterior rearview mirror assembly for a vehicle, said exterior rearview mirror assembly comprising:

an electrochromic reflective element having a rear surface and a front surface;

an indicating device at and to the rear of said reflective element, said indicating device comprising at least one of (a) a turn signal indicator, wherein said turn signal indicator is operable to indicate, by display through said reflective element when actuated, activation of a turn signal of the vehicle by a driver of the vehicle, and (b) a blind spot system alert indicator, wherein said blind spot system alert indicator is operable to indicate, by display through said reflective element when actuated, detection of another vehicle in a side lane by an object detection device of the vehicle; and wherein said indicating device comprises a transparent block to the rear of said reflective element, said block having light-transmitting pipeways formed at least partially therethrough for passage of light therethrough, and wherein said pipeways are angled relative to the rear surface of said reflective element.

14. An exterior rearview mirror system for a vehicle, said exterior rearview mirror system comprising:

a driver-side exterior rearview mirror assembly, said driver-side exterior rearview mirror assembly comprising a driver-side electrochromic reflective element having electrically variable reflectivity between a high reflectance state and a dimmed reflectance state;

said driver-side electrochromic reflective element comprising a front substrate having a first surface and a second surface;

said driver-side electrochromic reflective element comprising a rear substrate having a third surface and a fourth surface;

said second surface of said front substrate and said third surface of said rear substrate opposing each other in said driver-side electrochromic reflective element and with an electrochromic medium disposed therebetween;

a driver-side specularly reflecting mirror reflector established at a surface of said rear substrate;

a reflective driver-side perimeter band established around a perimeter border region of said driver-side electrochromic reflective element and visible through said front substrate to a viewer when viewing said driver-side electrochromic reflective element;

a passenger-side exterior rearview mirror assembly, said passenger-side exterior rearview mirror assembly comprising a passenger-side non-electrochromic reflective element comprising a mirror substrate;

a passenger-side specularly reflecting mirror reflector established at a surface of said mirror substrate of said passenger-side non-electrochromic reflective element;

a reflective passenger-side perimeter band established around a perimeter border region of said mirror substrate of said passenger-side non-electrochromic reflective element and visible to a viewer when viewing said passenger-side non-electrochromic reflective element; and said passenger-side non-electrochromic reflective element exhibiting an appearance of said passenger-side perimeter band that generally matches the appearance of said driver-side perimeter band of said driver-side electrochromic reflective element when both are mounted on the vehicle and viewed by a person viewing the respective reflective elements of said passenger-side exterior rearview mirror assembly and said driver-side exterior rearview mirror assembly.

15. The exterior rearview mirror system of claim 14, wherein said passenger-side non-electrochromic reflective element comprises a silicon-based mirror reflector coated at a surface of said mirror substrate, and wherein said mirror substrate comprises a bent glass mirror substrate.

16. The exterior rearview mirror system of claim 14, wherein said passenger-side specularly reflecting mirror reflector and said reflective passenger-side perimeter band comprise the same thin film coating layer or stack of thin film coating layers, and wherein said reflective passenger-side perimeter band is demarcated by laser ablating a demarcation line along and through said thin film coating layer of or stack of thin film coating layers and inboard of a peripheral edge of said mirror substrate, said demarcation line being inboard of said peripheral edge by a dimension that substantially matches a width dimension of said driver-side perimeter band of said driver-side electrochromic reflective element.

17. A rearview mirror assembly for a vehicle, said rearview mirror assembly comprising:

a transflective mirror element having a front surface and a rear surface;

a video display screen disposed behind said transflective mirror element, wherein said video display screen is operable to emit light when actuated and wherein the light emitted by said video display screen is visible through said transflective mirror element when said rearview mirror assembly is viewed by a person viewing said rearview mirror assembly;

contrast enhancement means for enhancing the viewability of said video display screen when said rearview mirror assembly is operated in high ambient lighting conditions; and wherein said rearview mirror assembly comprises an interior rearview mirror assembly, and wherein said transflective mirror element comprises a wedge-shaped prismatic mirror element, and wherein said video display screen is mounted at an angle relative to said rear surface so as to reduce potential ghosting due to the angle of said front surface of said wedge-shaped prismatic mirror element relative to said rear surface of said wedge-shaped prismatic mirror element.

18. The rearview mirror assembly of claim 17, wherein said contrast enhancement means is disposed in front of said video display screen and between said video display screen and said rear surface of said transflective mirror element.

19. A driver attitude detection system for a vehicle said driver attitude detection system comprising:

a sensing device for sensing at least one driver characteristic;

a vehicle monitoring device for monitoring at least one vehicle characteristic, said at least one vehicle characteristic, said vehicle characteristic comprising at least one of (a) vehicle seed (b) a vehicle acceleration, (c) a vehicle orientation and (c) a vehicle maneuver;

a control responsive to said sensing device and said vehicle monitoring device, said control determining a driver performance in response to said sensing device and said vehicle monitoring device, said control generating an output indicative of said driver performance;

a display at or near an interior rearview mirror assembly of the vehicle, said display being responsive to said control output to display information indicative of said driver performance; and a forward facing imaging sensor for capturing images of the scene occurring forwardly of the vehicle, said driver attitude detection system processing captured images to determine at least one of (i) a driving condition, (ii) a road condition and (iii) a weather condition, said control further responsive to said image processing.

20. A driver attitude detection system for a vehicle, said driver attitude detection system comprising:

a sensing device for sensing at least one driver characteristic;

a vehicle monitoring device for monitoring at least one vehicle characteristic, said at least one vehicle characteristic, said vehicle characteristic comprising at least one of (a) vehicle speed, (b) a vehicle acceleration, (c) a vehicle orientation and (c) a vehicle maneuver;

a control responsive to said sensing device and said vehicle monitoring device said control determining a driver performance in response to said sensing device and said vehicle monitoring device, said control generating an output indicative of said driver performance;

a display at or near an interior rearview mirror assembly of the vehicle, said display being responsive to said control output to display information indicative of said driver performance; and wherein an alert device is operable in response to said control output, said alert device comprising at least one of (a) a display device for displaying said driver performance, (b) a communication signal indicative of said driver performance being communicated to a device remote from the vehicle, and (c) a report generator for generating a report indicative of said driver performance.

* * * * *

UNITED STATES PATENT AND TRADEMARK OFFICE
CERTIFICATE OF CORRECTION

| | | |
|---|---|---|
| PATENT NO. | : 7,859,738 B2 | Page 1 of 3 |
| APPLICATION NO. | : 12/617833 | |
| DATED | : December 28, 2010 | |
| INVENTOR(S) | : Michael J. Baur et al. | |

It is certified that error appears in the above-identified patent and that said Letters Patent is hereby corrected as shown below:

Column 13
Line 14, "minor" should be --mirror--
Line 24, "minor" should be --mirror--

Column 16
Line 4, "minor" should be --mirror--
Line 7, "minor" should be --mirror--

Column 25
Line 48, Delete "," after "about"

Column 30
Lines 38-40, "minor" should be --mirror-- in both instances
Line 64, "minor" should be --mirror--
Line 67, "minor" should be --mirror--

Column 35
Line 8, "minor" should be --mirror--
Lines 19-20, "minor" should be --mirror-- in both instances
Line 31, "minor" should be --mirror--
Line 38, "minor" should be --mirror--
Line 41, "minor" should be --mirror--
Line 41, "minors" should be --mirrors--

Column 36
Line 59, "minor" should be --mirror--

Column 38
Line 64, "faint" should be --form--

Signed and Sealed this
Twenty-ninth Day of November, 2011

David J. Kappos
*Director of the United States Patent and Trademark Office*

Column 42
Line 12, "minor" should be --mirror--

Column 43
Line 13, Delete "," after "to"

Column 50
Line 14, "minor" should be --mirror--
Line 16, "minor" should be --mirror--
Line 33, "minor" should be --mirror--

Column 56
Line 40, Insert --. Optionally, the mirror assembly may
include a logo or message or iconistic display-- after "necessary"

Column 62
Line 7, "minor" should be --mirror--
Line 26, "minor" should be --mirror--
Line 30, "minor" should be --mirror--

Column 67
Line 57, "minor" should be --mirror--

Column 68
Line 36, "Curring" should be --Cuming--

Column 70
Line 6, "minor" should be --mirror--
Line 26, "minor" should be --mirror--

Column 75
Line 37, Delete "." after "receiver"

Column 78
Line 31, "UPS" should be --GPS--

Column 79
Line 42, "minor" should be --mirror--

Column 82
Claim 2, Line 50, Delete "third surface" before "specularly"

Column 83
Claim 9, Line 40, Delete "third surface" before "specularly"

CERTIFICATE OF CORRECTION (continued)
U.S. Pat. No. 7,859,738 B2

Column 84
Claim 16, Line 59, Delete "of" after "layer"

Column 85
Claim 19, Line 35, "seed" should be --speed--